(12) United States Patent
Yamasaki et al.

(10) Patent No.: US 7,420,897 B2
(45) Date of Patent: Sep. 2, 2008

(54) OPTICAL HEAD, AN OPTICAL DISK DEVICE AND AN INTEGRATED CIRCUIT

(75) Inventors: Fumitomo Yamasaki, Nara (JP); Shin-ichi Kadowaki, Sanda (JP); Kousei Sano, Osaka (JP); Akihiro Arai, Kizu-cho (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 635 days.

(21) Appl. No.: 11/176,207

(22) Filed: Jul. 8, 2005

(65) Prior Publication Data
US 2006/0077810 A1 Apr. 13, 2006

(30) Foreign Application Priority Data
Aug. 31, 2004 (JP) ............... 2004-251556

(51) Int. Cl.
*G11B 7/00* (2006.01)
(52) U.S. Cl. .................. 369/44.32; 369/44.42
(58) Field of Classification Search ............. 369/44.41, 369/44.42, 44.32, 53.13, 53.14
See application file for complete search history.

(56) References Cited

U.S. PATENT DOCUMENTS

| 6,275,463 | B1 | 8/2001 | Nagata et al. |
| 6,314,068 | B1 | 11/2001 | Sano et al. |
| 6,418,107 | B1 | 7/2002 | Sano et al. |
| 6,700,841 | B1 | 3/2004 | Shimizu et al. |
| 6,744,707 | B1 | 6/2004 | Sano et al. |
| 7,203,138 | B2* | 4/2007 | Sano et al. ............. 369/44.26 |
| 2001/0033528 | A1 | 10/2001 | Sano et al. |
| 2001/0055248 | A1 | 12/2001 | Nagata et al. |
| 2001/0055255 | A1 | 12/2001 | Ma et al. |

FOREIGN PATENT DOCUMENTS

JP 2003-45058 2/2003
WO 97/15923 5/1997

OTHER PUBLICATIONS

European Search Report issued Sep. 11, 2007 in the International (PCT) Application of which the present application is the U.S. National Stage.

* cited by examiner

*Primary Examiner*—Nabil Z Hindi
(74) *Attorney, Agent, or Firm*—Wenderoth, Lind & Ponack, L.L.P.

(57) ABSTRACT

A light sensing area of a light sensing element is comprised of A1 region, A2 region, B1 region, B2 region and N region. A tilt detector carries out a tilt detection in accordance with a first difference signal, which is a difference signal between a signal obtained from the A1 region and a signal obtained from the B1 region, and a second difference signal, which is difference signal between a signal obtained from the A2 region and a signal obtained from the B2 region.

Accordingly, an optical-disk tilt detecting signal having a little influence of defocusing can be obtained even at boundaries between recorded information tracks and non-recorded information tracks.

46 Claims, 26 Drawing Sheets

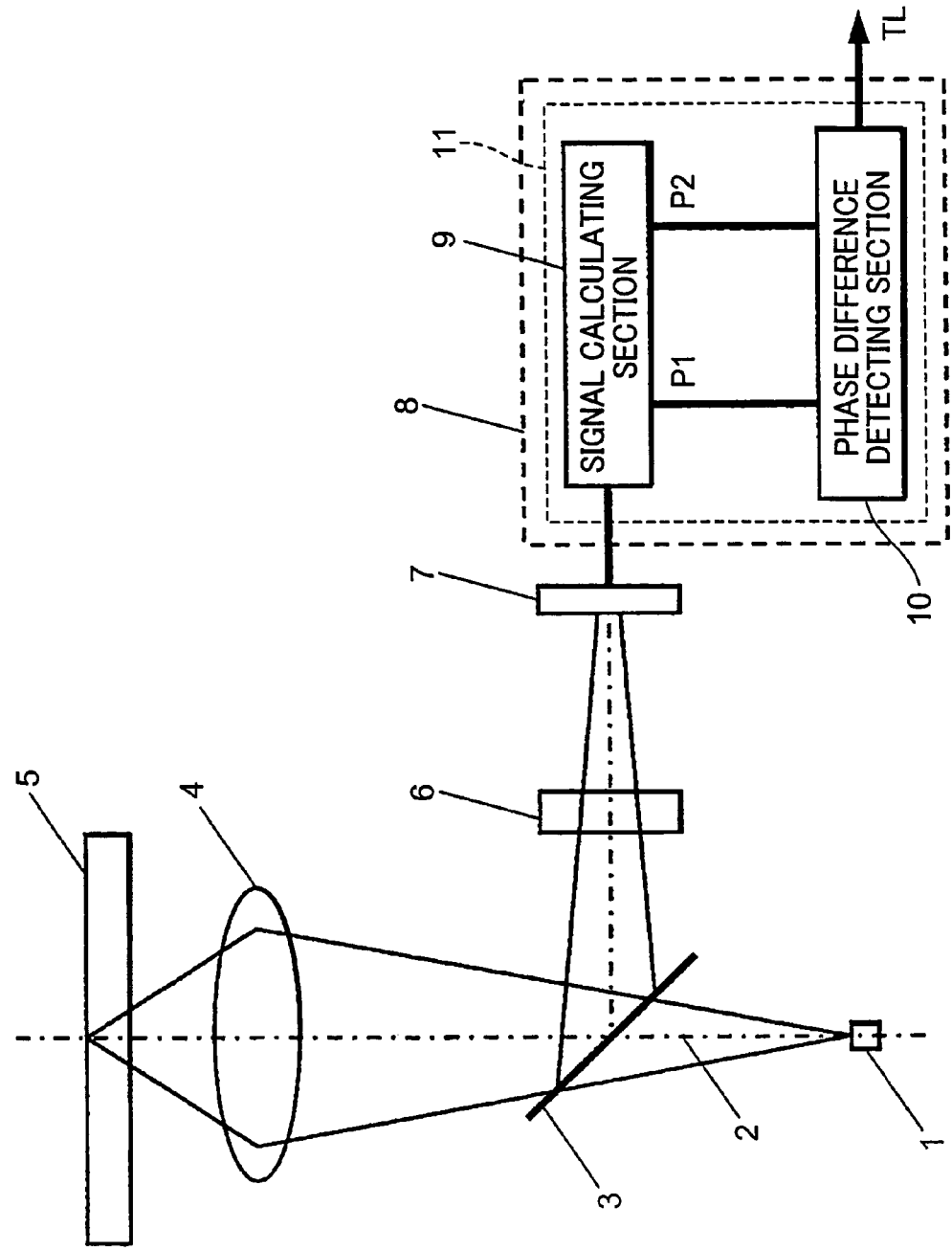

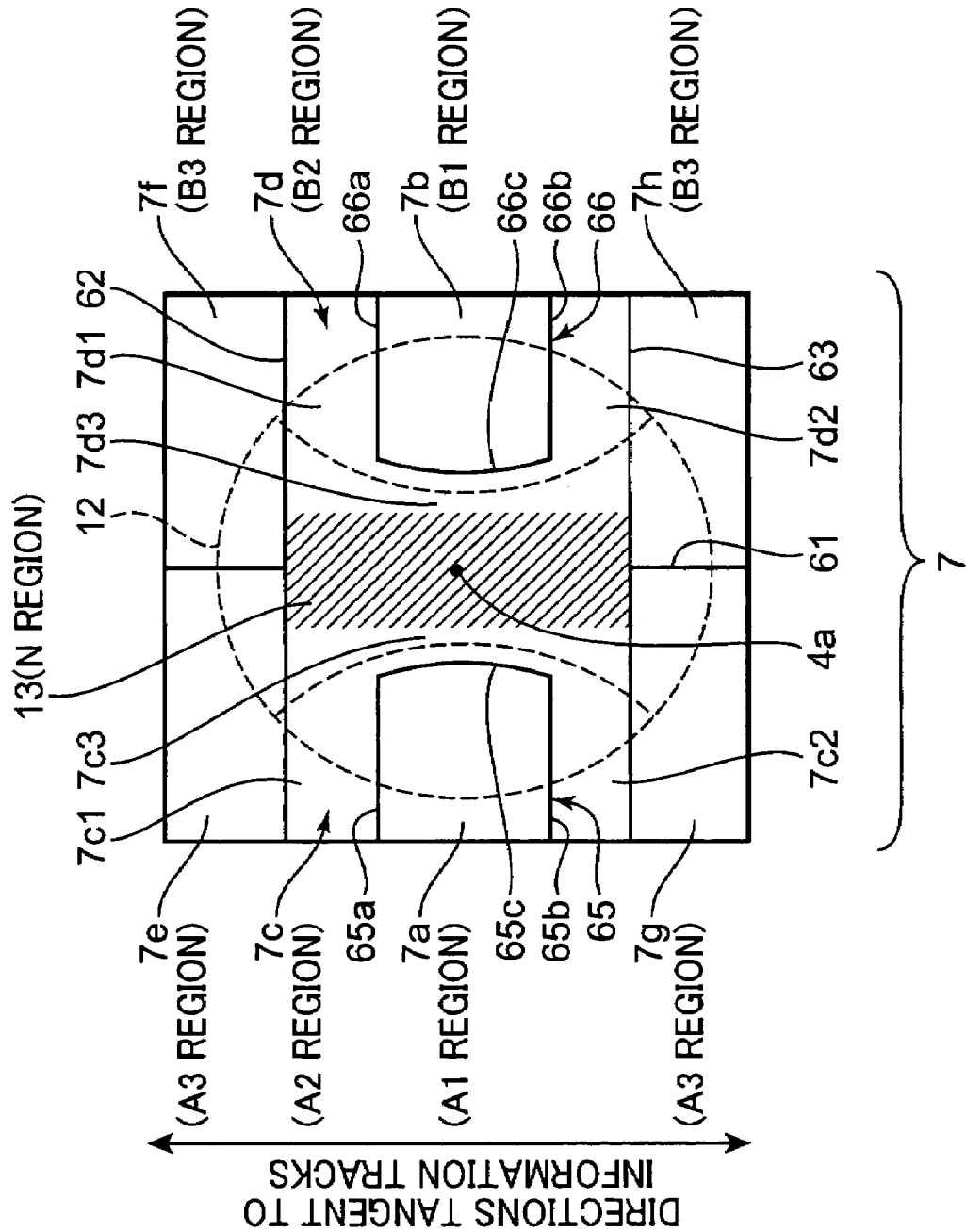

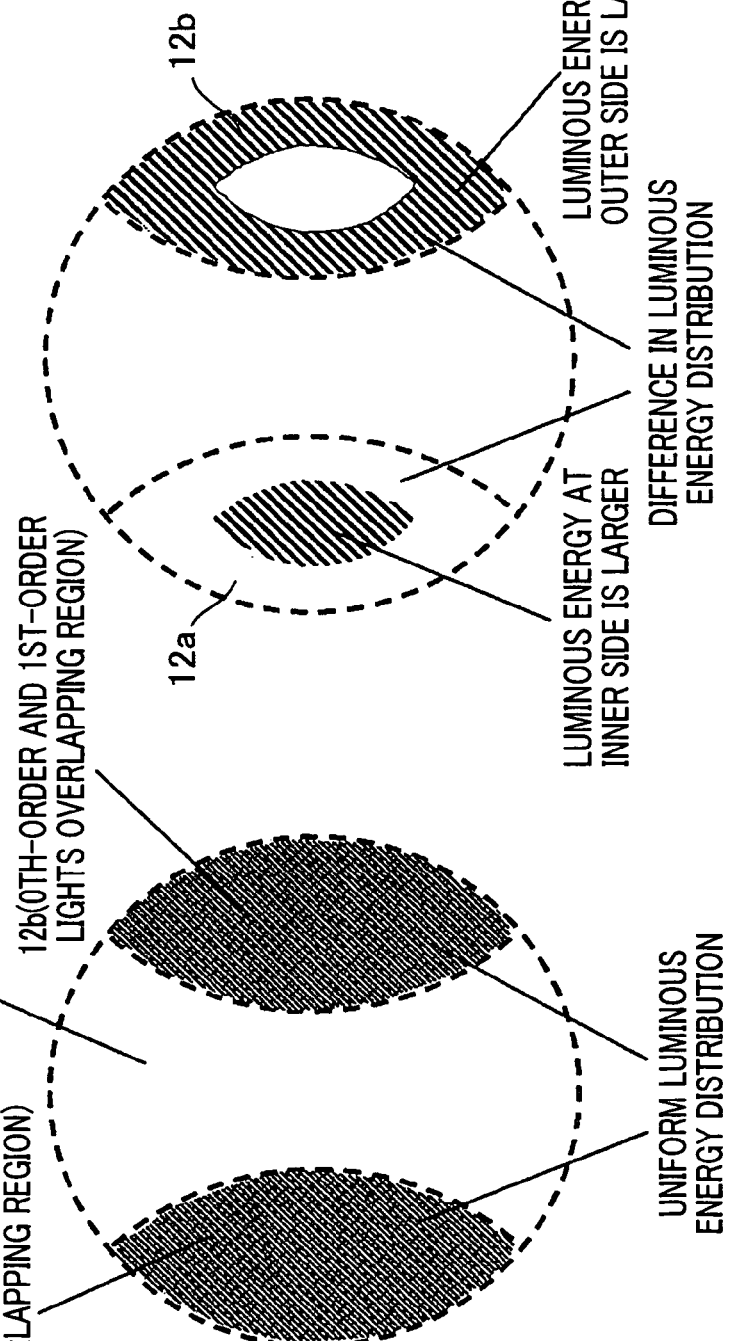

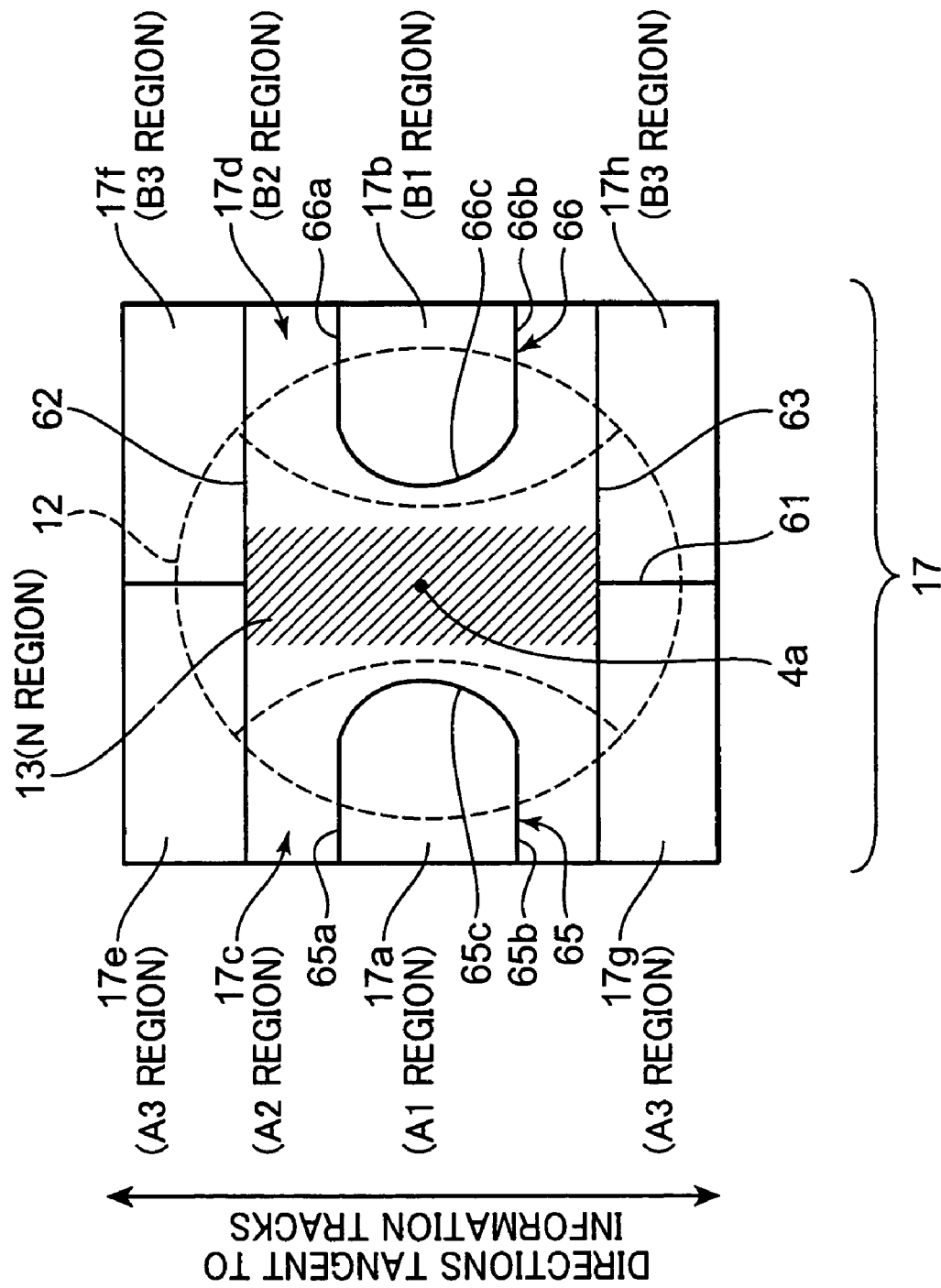

OPTICAL HEAD, AN OPTICAL DISK DEVICE AND AN INTEGRATED CIRCUIT

TECHNICAL FIELD

The present invention relates to an optical head for optically recording or reproducing information in or from a information recording medium such as an optical disk, an optical disk device including the optical head and an integrated circuit.

BACKGROUND TECHNOLOGY

Some of conventional optical heads for optical disks are provided with a function of detecting a relative tilt of optical axes of the optical disk and the optical head as disclosed in Japanese Unexamined Patent Publication No. 2003-45058.

FIG. 22 is a diagram showing the construction of the conventional optical head disclosed in the above publication. Identified by 101 is a light source, by 102 an optical axis of the optical head, by 103 a beam splitter, by 104 an objective lens, by 105 an optical disk, by 106 a detecting optical system, by 107 a light sensing means, by 108 a tilt detecting means for detecting the tilt of the optical disk, by 109 a signal calculating section, by 110 an amplifier for amplifying an input signal by a factor of k0, by 111 a differential amplifier, by PP1, PP2 two difference signals detected by the signal calculating section 109, and by TILT a tilt detecting signal generated by the tilt detecting means 108.

FIG. 23 is a diagram showing a light sensing area of the light sensing means 107 and a luminous flux incident thereon. As shown in FIG. 23, the light sensing area 107 is comprised of six regions 107a to 107f for detecting luminous energies corresponding to a luminous flux 112 incident thereon. Two regions 112a, 112b encircled by arcs at the left and right sides of the luminous flux 112 represent overlapping regions of $0^{th}$-order components and $\pm 1^{st}$-order components of the light diffracted by grooves of information tracks of the optical disk 105. Arrows in FIG. 23 show directions tangent to the information tracks.

As shown in FIG. 22, a laser beam emitted from the light source 101 passes through the beam splitter 103, and is gathered onto an information recording surface of the optical disk 105 by the objective lens 104. The beam reflected by the optical disk 105 passes through the objective lens 104 again and is reflected by the beam splitter 103. This beam is introduced to the light sensing means 107 by the detecting optical system 106.

As shown in FIG. 23, the luminous flux 112 incident on the light sensing means 107 is sensed in the respective light sensing regions 107a to 107f, and the difference signals PP1 and PP2 are detected by the signal calculating section 109. These two difference signals PP1, PP2 can be expressed as follows using electrical signals outputted from the respective light sensing regions 107a to 107f:

$PP1=107c+107e-(107d+107f)$ $PP2=107a-107b$.

It should be noted that 107a to 107f in the above equations mean the electrical signals outputted from the respective light sensing regions.

In the tilt detecting means 108, after being amplified by a factor of k0 in the amplifier 110, the difference signal PP1 is subtracted from the difference signal PP2 by the differential amplifier 111, with the result that the signal TILT is outputted. Specifically, the signal TILT is expressed as follows:

$TILT=PP2-k0*PP1$ (where * denotes multiplication throughout the specification).

Here, a factor k0 is so determined as to correct an offset of the difference signal PP2 caused by a relative displacement of the optical axis of the objective lens 104 and the optical axis 102 of the optical head using an offset produced in the difference signal PP1. Thus, the signal TILT is a signal free from an offset caused by the displacement of the objective lens 104.

In the case that the optical disk 105 is inclined with respect to the optical axis 102 of the optical head, a coma aberration occurs when the light passes through a transparent substrate of the optical disk 105. This coma aberration mainly deforms the wavefront of the sections where the aforementioned $0^{th}$-order components and $\pm 1^{st}$-order components of the diffracted light from the information track overlap. The deformation of the wavefront differs in the regions for detecting the difference signal PP1 and in the region for detecting the difference signal PP2, and the signals detected in these regions are differently modulated by the information tracks. Thus, this difference in modulation represents the tilt of the optical disk and appears in the signal TILT. Accordingly, the detection of the tilt of the optical disk unlikely influenced by the displacement of the objective lens 104 can be made possible by detecting the signal TILT while a light spot is tracing the center of the information tracks.

However, with the construction of the aforementioned conventional optical head, reflectivity differs at the information tracks having information recorded thereon and at those having no information recorded thereon. For example, in an optical disk of the phase changing type or the like, the symmetry of a light intensity distribution in a middle part of the luminous flux largely changes, thereby presenting a problem that an optical-disk tilt detecting signal has a detection error.

It is known that the influence of the change in the symmetry of the difference signals PP1 and PP2 can be reduced by arranging a light blocking portion 113 (N region) in a region (region containing only or mainly the $0^{th}$-order components of the diffracted light) in the middle part of the luminous flux 112 where the symmetry of the light intensity distribution largely changes as shown in FIG. 24.

FIG. 25 diagrammatically shows the section of the information tracks of the optical disk 105. The respective information tracks are affixed with information track numbers 1 to 9.

Out of the information tracks 1 to 9, the tracks 4 to 6 are those having information recorded thereon and the tracks 1 to 3, 7 to 9 are those having no information recorded thereon. FIG. 25 shows that recording is made only to the hatched information tracks 4 to 6 to thereby reduce the reflectivity.

FIGS. 26A, 26B show a simulation result of the level of the signal TILT produced when a light spot crosses these information tracks 1 to 9, assuming that the pattern of the information tracks shown in FIG. 25 are cyclically repeated.

Calculation conditions were as follows. Specifically, the wavelength of the light source was 405 mm; NA of the objective lens 0.85; the thickness of the transparent substrate of the optical disk 100 µm; the pitches of the information tracks 0.32 µm; the width of the grooves of the information tracks 0.2 µm; the depth of the information tracks $\frac{1}{12}$ of the wavelength; the reflectivity of the recorded information tracks 0.6; the reflectivity of the non-recorded information tracks 1.0; and the tilt of the optical disk 0 deg. Further, the width of the light sensing regions 107a, 107b for detecting the signal PP2 along the direction of the information tracks was 0.3 times the diameter of the luminous flux, that of the light sensing regions 107c, 107d, 107e, 107f for detecting the signal PP1 along the same direction was 0.6 times the diameter of the luminous flux, and the outside region was not considered as the calculation condition. Further, the width of the light blocking portion 113 (N region) along a direction normal to the information tracks was 0.35 times the diameter of the luminous flux, and a value of the factor k0 was so determined as to correct an offset produced when the aforementioned displacement of the objective lens is ±100 μm and was 1.20 this time.

The calculation results are shown in FIGS. 26A, 26B. Three sequential lines of FIG. 26A were calculated when the displacement of the objective lens was 0 μm and ±100 μm with a defocusing amount fixed at 0 μm. Five sequential lines of FIG. 26B were calculated when the defocusing amount was 0 μm, ±0.1 μm and ±0.2 μm with the displacement of the objective lens fixed at 0 μm. In FIGS. 26A, 26B, horizontal axis corresponds to the information track numbers of FIG. 25 and vertical axis represents an optical-disk tilted amount (unit: deg) converted from the optical-disk tilt detecting signal TILT.

The following can be understood from FIGS. 26A and 26B. Specifically, in the case of determining the factor k0 to suppress a variation of the optical-disk tilt detecting signal caused by the displacement of the objective lens, the optical-disk tilt detecting signal, i.e. the tilt detecting signal can be suppressed to a sufficiently small level regardless of the track number even if the optical axis of the objective lens is displaced from that of the optical head as shown in FIG. 26A. On the other hand, in the case of defocusing, the level of the optical-disk tilt detecting signal changes particularly near the tracks 3, 4, 6, 7 as boundaries between the recorded information tracks and the non-recorded information tracks as shown in FIG. 26B. Therefore, an error is produced at the boundaries between the recorded information tracks and the non-recorded information tracks as if the tilt of the optical disk were detected.

In view of the problems residing in the prior art, an object of the present invention is to provide an optical head, an integrated circuit and an optical disk device capable of obtaining an optical-disk tilt detecting signal having a little influence of defocusing even at boundaries between recorded information tracks and non-recorded information tracks.

To accomplish the above object, an aspect of the invention is directed to an optical head, comprising a light source, an objective lens for concentrating a laser beam emitted from the light source onto information tracks of an optical disk, and a light sensing device for sensing a luminous flux reflected by information tracks, wherein: the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a first and a second partition lines symmetrically arranged between the two horizontal dividing lines with respect to the vertical dividing line while being distanced from the vertical dividing line and the two horizontal dividing lines; each of the first and second partition lines includes a pair of horizontal lines parallel with the two horizontal dividing lines, and an inner line connecting ends of the horizontal lines toward the vertical dividing line; the luminous flux incident area further includes an N region crossing over the vertical dividing line between the two horizontal dividing lines, one region partitioned between the two horizontal dividing lines by the vertical dividing line being divided into an A2 region at a side toward the optical axis and a remaining A1 region by the first partition line, and the other region partitioned between the two horizontal dividing lines by the vertical dividing line being divided into a B2 region at a side toward the optical axis and a remaining B1 region by the second partition line; the A1 region and the B1 region are symmetrically arranged with respect to the vertical dividing line; the A2 region and the B2 region are symmetrically arranged with respect to the vertical dividing line; and the optical head further comprises a tilt detector for detecting a relative tilt of the objective lens and the optical disk in accordance with a luminous energy incident on the luminous flux incident area of the light sensing device.

Another aspect of the invention is directed to an optical head, comprising a light source, an objective lens for concentrating a laser beam emitted from the light source onto information tracks of an optical disk, and a light sensing device for sensing a luminous flux reflected by information tracks, wherein: the light sensing device includes a luminous flux incident area divided into a plurality of regions by a straight vertical dividing line passing an optical axis of the objective lens and parallel with a direction tangent to the information tracks, a first and a second partition lines symmetrically arranged with respect to the vertical dividing line while being distanced from the vertical dividing line, a third partition line arranged between the vertical dividing line and the first partition line, a fourth partition line symmetrically arranged with the third partition line with respect to the optical axis between the vertical dividing line and the second partition line; each of the first and second partition lines includes a pair of horizontal lines normal to the vertical dividing line, and an inner line connecting ends of the horizontal lines toward the vertical dividing line; each of the third and fourth partition lines includes a pair of horizontal lines normal to the vertical dividing line, and an inner line connecting ends of the horizontal lines toward the vertical dividing line; the luminous flux incident area further includes an N region crossing over the vertical dividing line, a region at a side of the optical axis opposite from the third partition line being divided into an A5 region at a side toward the third partition line and a remaining A1 region by the first partition line, and a region at a side of the optical axis opposite from the fourth partition line being divided into a B5 region at a side toward the fourth partition line and a remaining B1 region by the second partition line; the A1 region and the B1 region are symmetrically arranged with respect to the vertical dividing line; the A5 region and the B5 region are symmetrically arranged with respect to the vertical dividing line; and the optical head further comprises a tilt detector for detecting a relative tilt of the objective lens and the optical disk in accordance with a luminous energy incident on the luminous flux incident area of the light sensing device.

A further aspect of the invention is directed to an optical head, comprising a light source, an objective lens for concentrating a laser beam emitted from the light source onto information tracks of an optical disk, and a light sensing device for sensing a luminous flux reflected by information tracks, wherein: the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a third and a fourth horizontal dividing lines at a distance to and parallel with the horizontal dividing lines in one region partitioned by the vertical dividing line between the first and second horizontal dividing lines, a fifth and a sixth horizontal dividing lines at a distance to and parallel with the horizontal dividing lines in the other region partitioned by the vertical dividing line, a seventh and an eighth horizontal dividing lines arranged at sides of the first and second horizontal dividing lines opposite from the optical axis, in parallel with the first and second horizontal dividing lines and symmetrically with respect to the optical axis; the luminous flux incident area further includes an N region crossing over the vertical dividing line between the first and second horizontal dividing lines; a region between the first and second horizontal dividing lines in the one region partitioned by the vertical dividing line is divided into an A1 region between the third and fourth horizontal dividing lines and remaining A7 regions; a region between the first and second horizontal dividing lines in the other region partitioned by the vertical dividing line is divided into a B1 region between the fifth and sixth horizontal dividing lines and remaining B7 regions; regions at sides of the seventh and eighth horizontal dividing lines opposite from the optical axis are defined as N2 regions; the A1 region and the B1 region are symmetrically arranged with respect to the vertical dividing line; the A7 region and the B7 region are symmetrically arranged with respect to the vertical dividing line; and the optical head further comprises a tilt detector for detecting a relative tilt of the objective lens and the optical disk in accordance with a luminous energy incident on the luminous flux incident area of the light sensing device.

A further aspect of the invention is directed to an optical head, comprising a light source, an objective lens for concentrating a laser beam emitted from the light source onto information tracks of an optical disk, and a light sensing device for sensing a luminous flux reflected by information tracks, wherein: the light sensing device includes a luminous flux incident area divided into a plurality of regions by a straight vertical dividing line passing an optical axis of the objective lens and parallel with a direction tangent to the information tracks; a pair of first horizontal dividing lines normal to the vertical dividing line and symmetrically arranged with respect to the vertical dividing line; a pair of second horizontal dividing lines parallel with the pair of first horizontal dividing lines and symmetrically arranged with respect to the vertical dividing line; a third and a fourth horizontal dividing lines at a distance to and parallel with the first and second horizontal dividing lines in one region partitioned by the vertical dividing line between the first and second horizontal dividing lines; a fifth and a sixth horizontal dividing lines at a distance to and parallel with the first and second horizontal dividing lines in the other region partitioned by the vertical dividing line between the first and second horizontal dividing lines; a first inner line extending in parallel with the vertical dividing line and connecting inner ends of the first horizontal dividing line at one side, the third horizontal dividing line, the fourth horizontal dividing line and the second horizontal dividing line at one side; a second inner line extending in parallel with the vertical dividing line and connecting inner ends the first horizontal dividing line at the other side, the fifth horizontal dividing line, the sixth horizontal dividing line and the second horizontal dividing line at the other side; and seventh and eighth horizontal dividing lines arranged at sides of the first and second horizontal dividing lines opposite from the optical axis, in parallel with the first and second horizontal dividing lines and symmetrically with respect to the optical axis: the luminous flux incident area further includes an N region crossing over the vertical dividing line between the first and second inner lines: a region defined by the first horizontal dividing line, the second horizontal dividing line and the first inner line in the one region partitioned by the vertical dividing line is divided into an A1 region between the third and fourth horizontal dividing lines and remaining A7 regions: a region defined by the first horizontal dividing line, the second horizontal dividing line and the second inner line in the other region partitioned by the vertical dividing line is divided into a B1 region between the fifth and sixth horizontal dividing lines and remaining B7 regions: regions at sides of the seventh and eighth horizontal dividing lines opposite from the optical axis are defined as N2 regions: the pair of first horizontal dividing lines and the pair of second horizontal dividing lines are symmetrically arranged with respect to the optical axis: the A1 region and the B1 region are symmetrically arranged with respect to the vertical dividing line: the A7 region and the B7 region are symmetrically arranged with respect to the vertical dividing line: and the optical head further comprises a tilt detector for detecting a relative tilt of the objective lens and the optical disk in accordance with a luminous energy incident on the luminous flux incident area of the light sensing device.

A further aspect of the invention is directed to an optical disk device, comprising: an optical head including a light source, an objective lens for concentrating a laser beam emitted from the light source onto information tracks of an optical disk, and a light sensing device for sensing a luminous flux reflected by information tracks; an optical disk driver for driving the optical disk; and a controller for controlling the optical head and the optical disk driver, wherein: the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a first and a second partition lines symmetrically arranged between the two horizontal dividing lines with respect to the vertical dividing line while being distanced from the vertical dividing line and the two horizontal dividing lines; each of the first and second partition lines includes a pair of horizontal lines parallel with the two horizontal dividing lines, and an inner line connecting ends of the horizontal lines toward the vertical dividing line; the luminous flux incident area further includes an N region crossing over the vertical dividing line between the two horizontal dividing lines, one region partitioned between the two horizontal dividing lines by the vertical dividing line being divided into an A2 region at a side toward the optical axis and a remaining A1 region by the first partition line, and the other region partitioned between the two horizontal dividing lines by the vertical dividing line being divided into a B2 region at a side toward the optical axis and a remaining B1 region by the second partition line; the A1 region and the B1 region are symmetrically arranged with respect to the vertical dividing line; the A2 region and the B2 region are symmetrically arranged with respect to the vertical dividing line; and the optical head further comprises a tilt detector for detecting a relative tilt of the objective lens and the optical disk in accordance with a luminous energy incident on the luminous flux incident area of the light sensing device.

A further aspect of the invention is directed to an optical disk device, comprising: an optical head including a light source, an objective lens for concentrating a laser beam emitted from the light source onto information tracks of an optical disk, and a light sensing device for sensing a luminous flux reflected by information tracks; an optical disk driver for driving the optical disk; and a controller for controlling the optical head and the optical disk driver, wherein: the light sensing device includes a luminous flux incident area divided into a plurality of regions by a straight vertical dividing line passing an optical axis of the objective lens and parallel with a direction tangent to the information tracks, a first and a second partition lines symmetrically arranged with respect to the vertical dividing line while being distanced from the vertical dividing line, a third partition line arranged between the vertical dividing line and the first partition line, a fourth partition line symmetrically arranged with the third partition line with respect to the optical axis between the vertical dividing line and the second partition line; each of the first and second partition lines includes a pair of horizontal lines normal to the vertical dividing line, and an inner line connecting ends of the horizontal lines toward the vertical dividing line; each of the third and fourth partition lines includes a pair of horizontal lines normal to the vertical dividing line, and an inner line connecting ends of the horizontal lines toward the vertical dividing line; the luminous flux incident area further includes an N region crossing over the vertical dividing line, a region at a side of the third partition line opposite from the optical axis being divided into an A5 region at a side toward the third partition line and a remaining A1 region by the first partition line, and a region at a side of the fourth partition line opposite from the optical axis being divided into a B5 region at a side toward the fourth partition line and a remaining B1 region by the second partition line; the A1 region and the B1 region are symmetrically arranged with respect to the vertical dividing line; the A5 region and the B5 region are symmetrically arranged with respect to the vertical dividing line; and the optical head further comprises a tilt detector for detecting a relative tilt of the objective lens and the optical disk in accordance with a luminous energy incident on the luminous flux incident area of the light sensing device.

A further aspect of the invention is directed to an optical disk device, comprising: an optical head including a light source, an objective lens for concentrating a laser beam emitted from the light source onto information tracks of an optical disk, and a light sensing device for sensing a luminous flux reflected by information tracks; an optical disk driver for driving the optical disk; and a controller for controlling the optical head and the optical disk driver, wherein: the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a third and a fourth horizontal dividing lines at a distance to and parallel with the horizontal dividing lines in one region partitioned by the vertical dividing line between the first and second horizontal dividing lines, a fifth and a sixth horizontal dividing lines at a distance to and parallel with the horizontal dividing lines in the other region partitioned by the vertical dividing line between the first and second horizontal dividing lines, a seventh and an eighth horizontal dividing lines arranged at sides of the first and second horizontal dividing lines opposite from the optical axis, in parallel with the first and second horizontal dividing lines and symmetrically with respect to the optical axis; the luminous flux incident area further includes an N region crossing over the vertical dividing line between the first and second horizontal dividing lines; a region between the first and second horizontal dividing lines in the one region partitioned by the vertical dividing line is divided into an A1 region between the third and fourth horizontal dividing lines and remaining A7 regions; a region between the first and second horizontal dividing lines in the other region partitioned by the vertical dividing line is divided into a B1 region between the fifth and sixth horizontal dividing lines and remaining B7 regions; regions at sides of the seventh and eighth horizontal dividing lines opposite from the optical axis are defined as N2 regions; the A1 region and the B1 region are symmetrically arranged with respect to the vertical dividing line; the A7 region and the B7 region are symmetrically arranged with respect to the vertical dividing line; and the optical head further comprises a tilt detector for detecting a relative tilt of the objective lens and the optical disk in accordance with a luminous energy incident on the luminous flux incident area of the light sensing device.

A further aspect of the invention is directed to an optical disk device, comprising: an optical head including a light source, an objective lens for concentrating a laser beam emitted from the light source onto information tracks of an optical disk, and a light sensing device for sensing a luminous flux reflected by information tracks; an optical disk driver for driving the optical disk; and a controller for controlling the optical head and the optical disk driver, wherein: the light sensing device includes a luminous flux incident area divided into a plurality of regions by a straight vertical dividing line passing an optical axis of the objective lens and parallel with a direction tangent to the information tracks; a pair of first horizontal dividing lines normal to the vertical dividing line and symmetrically arranged with respect to the vertical dividing line; a pair of second horizontal dividing lines parallel with the pair of first horizontal dividing lines and symmetrically arranged with respect to the vertical dividing line; a third and a fourth horizontal dividing lines at a distance to and parallel with the first and second horizontal dividing lines in one region partitioned by the vertical dividing line between the first and second horizontal dividing lines; a fifth and a sixth horizontal dividing lines at a distance to and parallel with the first and second horizontal dividing lines in the other region partitioned by the vertical dividing line between the first and second horizontal dividing lines; a first inner line extending in parallel with the vertical dividing line and connecting inner ends of the first horizontal dividing line at one side, the third horizontal dividing line, the fourth horizontal dividing line and the second horizontal dividing line at one side; a second inner line extending in parallel with the vertical dividing line and connecting inner ends the first horizontal dividing line at the other side, the fifth horizontal dividing line, the sixth horizontal dividing line and the second horizontal dividing line at the other side; and seventh and eighth horizontal dividing lines arranged at sides of the first and second horizontal dividing lines opposite from the optical axis, in parallel with the first and second horizontal dividing lines and symmetrically with respect to the optical axis: the luminous flux incident area further includes an N region crossing over the vertical dividing line between the first and second inner lines: a region defined by the first horizontal dividing line, the second horizontal dividing line and the first inner line in the one region partitioned by the vertical dividing line is divided into an A1 region between the third and fourth horizontal dividing lines and remaining A7 regions: a region defined by the first horizontal dividing line, the second horizontal dividing line and the second inner line in the other region partitioned by the vertical dividing line is divided into a B1 region between the fifth and sixth horizontal dividing lines and remaining B7 regions: regions at sides of the seventh and eighth horizontal dividing lines opposite from the optical axis are defined as N2 regions: the pair of first horizontal dividing lines and the pair of second horizontal dividing lines are symmetrically arranged with respect to the optical axis: the A1 region and the B1 region are symmetrically arranged with respect to the vertical dividing line: the A7 region and the B7 region are symmetrically arranged with respect to the vertical dividing line: and the optical head further comprises a tilt detector for detecting a relative tilt of the objective lens and the optical disk in accordance with a luminous energy incident on the luminous flux incident area of the light sensing device.

A further aspect of the invention is directed to an integrated circuit for deriving a tilt signal corresponding to a relative tilt of an objective lens and an optical disk in accordance with a signal from a light sensing device of an optical head for concentrating a laser beam emitted from a light source onto information tracks of the optical disk by means of the objective lens and sensing a luminous flux reflected by the information tracks by means of the light sensing device, wherein:

the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a first and a second partition lines symmetrically arranged between the two horizontal dividing lines with respect to the vertical dividing line while being distanced from the vertical dividing line and the two horizontal dividing lines; each of the first and second partition lines includes a pair of horizontal lines parallel with the two horizontal dividing lines, and an inner line connecting ends of the horizontal lines toward the vertical dividing line; the luminous flux incident area further includes an N region crossing over the vertical dividing line between the two horizontal dividing lines, one region partitioned between the two horizontal dividing lines by the vertical dividing line being divided into an A2 region at a side toward the optical axis and a remaining A1 region by the first partition line, and the other region partitioned between the two horizontal dividing lines by the vertical dividing line being divided into a B2 region at a side toward the optical axis and a remaining B1 region by the second partition line; the A1 region and the B1 region are symmetrically arranged with respect to the vertical dividing line; the A2 region and the B2 region are symmetrically arranged with respect to the vertical dividing line; and a difference signal between a first difference signal, which is a difference signal between a signal obtained from the A1 region of the light sensing device and a signal obtained from the B1 region of the light sensing device, and a second difference signal, which is a difference signal between a signal obtained from the A2 region of the light sensing device and a signal obtained from the B2 region of the light sensing device, is generated after multiplying at least one of the first and second difference signals by a specified weight coefficient, and the tilt signal is derived in accordance with the generated difference signal.

A further aspect of the invention is directed to an integrated circuit for deriving a tilt signal corresponding to a relative tilt of an objective lens and an optical disk in accordance with a signal from a light sensing device of an optical head for concentrating a laser beam emitted from a light source onto information tracks of the optical disk by means of the objective lens and sensing a luminous flux reflected by the information tracks by means of the light sensing device, wherein: the light sensing device includes a luminous flux incident area divided into a plurality of regions by a straight vertical dividing line passing an optical axis of the objective lens and parallel with a direction tangent to the information tracks, a first and a second partition lines symmetrically arranged with respect to the vertical dividing line while being distanced from the vertical dividing line, a third partition line arranged between the vertical dividing line and the first partition line, a fourth partition line symmetrically arranged with the third partition line with respect to the optical axis between the vertical dividing line and the second partition line; each of the first and second partition lines includes a pair of horizontal lines normal to the vertical dividing line, and an inner line connecting ends of the horizontal lines toward the vertical dividing line; each of the third and fourth partition lines includes a pair of horizontal lines normal to the vertical dividing line, and an inner line connecting ends of the horizontal lines toward the vertical dividing line; the luminous flux incident area further includes an N region crossing over the vertical dividing line, a region at a side of the third partition line opposite from the optical axis being divided into an A5 region at a side toward the third partition line and a remaining A1 region by the first partition line, and a region at a side of the fourth partition line opposite from the optical axis being divided into a B5 region at a side toward the fourth partition line and a remaining B1 region by the second partition line; the A1 region and the B1 region are symmetrically arranged with respect to the vertical dividing line; the A5 region and the B5 region are symmetrically arranged with respect to the vertical dividing line; and a difference signal between a first difference signal, which is a difference signal between a signal obtained from the A1 region of the light sensing device and a signal obtained from the B1 region of the light sensing device, and a second difference signal, which is a difference signal between a signal obtained from the A5 region of the light sensing device and a signal obtained from the B5 region of the light sensing device, is generated after multiplying at least one of the first and second difference signals by a specified weight coefficient, and the tilt signal is derived in accordance with the generated difference signal.

A further aspect of the invention is directed to an integrated circuit for deriving a tilt signal corresponding to a relative tilt of an objective lens and an optical disk in accordance with a signal from a light sensing device of an optical head for concentrating a laser beam emitted from a light source onto information tracks of the optical disk by means of the objective lens and sensing a luminous flux reflected by the information tracks by means of the light sensing device, wherein: the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a third and a fourth horizontal dividing lines at a distance to and parallel with the horizontal dividing lines in one region partitioned by the vertical dividing line between the first and second horizontal dividing lines, a fifth and a sixth horizontal dividing lines at a distance to and parallel with the horizontal dividing lines in the other region partitioned by the vertical dividing line between the first and second horizontal dividing lines, a seventh and an eighth horizontal dividing lines arranged at sides of the first and second horizontal dividing lines opposite from the optical axis, in parallel with the first and second horizontal dividing lines and symmetrically with respect to the optical axis; the luminous flux incident area further includes an N region crossing over the vertical dividing line between the first and second horizontal dividing lines; a region between the first and second horizontal dividing lines in the one region partitioned by the vertical dividing line is divided into an A1 region between the third and fourth horizontal dividing lines and remaining A7 regions; a region between the first and second horizontal dividing lines in the other region partitioned by the vertical dividing line is divided into a B1 region between the fifth and sixth horizontal dividing lines and remaining B7 regions; regions at sides of the seventh and eighth horizontal dividing lines opposite from the optical axis are defined as N2 regions; the A1 region and the B1 region are symmetrically arranged with respect to the vertical dividing line; the A7 region and the B7 region are symmetrically arranged with respect to the vertical dividing line; and a difference signal between a first difference signal, which is a difference signal between a signal obtained from the A1 region of the light sensing device and a signal obtained from the B1 region of the light sensing device, and a second difference signal, which is a difference signal between a signal obtained from the A7 region of the light sensing device and a signal obtained from the B7 region of the light sensing device, is generated after multiplying at least one of the first and second difference signals by a specified weight coefficient, and the tilt signal is derived in accordance with the generated difference signal.

A further aspect of the invention is directed to an integrated circuit for deriving a tilt signal corresponding to a relative tilt of an objective lens and an optical disk in accordance with a signal from a light sensing device of an optical head for concentrating a laser beam emitted from a light source onto information tracks of the optical disk by means of the objective lens and sensing a luminous flux reflected by the information tracks by means of the light sensing device, wherein: the light sensing device includes a luminous flux incident area divided into a plurality of regions by a straight vertical dividing line passing an optical axis of the objective lens and parallel with a direction tangent to the information tracks: a pair of first horizontal dividing lines normal to the vertical dividing line and symmetrically arranged with respect to the vertical dividing line; a pair of second horizontal dividing lines parallel with the pair of first horizontal dividing lines and symmetrically arranged with respect to the vertical dividing line; a third and a fourth horizontal dividing lines at a distance to and parallel with the first and second horizontal dividing lines in one region partitioned by the vertical dividing line between the first and second horizontal dividing lines; a fifth and a sixth horizontal dividing lines at a distance to and parallel with the first and second horizontal dividing lines in the other region partitioned by the vertical dividing line between the first and second horizontal dividing lines; a first inner line extending in parallel with the vertical dividing line and connecting inner ends of the first horizontal dividing line at one side, the third horizontal dividing line, the fourth horizontal dividing line and the second horizontal dividing line at one side; a second inner line extending in parallel with the vertical dividing line and connecting inner ends the first horizontal dividing line at the other side, the fifth horizontal dividing line, the sixth horizontal dividing line and the second horizontal dividing line at the other side; and seventh and eighth horizontal dividing lines arranged at sides of the first and second horizontal dividing lines opposite from the optical axis, in parallel with the first and second horizontal dividing lines and symmetrically with respect to the optical axis: the luminous flux incident area further includes an N region crossing over the vertical dividing line between the first and second inner lines: a region defined by the first horizontal dividing line, the second horizontal dividing line and the first inner line in the one region partitioned by the vertical dividing line is divided into an A1 region between the third and fourth horizontal dividing lines and remaining A7 regions: a region defined by the first horizontal dividing line, the second horizontal dividing line and the second inner line in the other region partitioned by the vertical dividing line is divided into a B1 region between the fifth and sixth horizontal dividing lines and remaining B7 regions: regions at sides of the seventh and eighth horizontal dividing lines opposite from the optical axis are defined as N2 regions: the pair of first horizontal dividing lines and the pair of second horizontal dividing lines are symmetrically arranged with respect to the optical axis: the A1 region and the B1 region are symmetrically arranged with respect to the vertical dividing line: the A7 region and the B7 region are symmetrically arranged with respect to the vertical dividing line: and a difference signal between a first difference signal, which is a difference signal between a signal obtained from the A1 region of the light sensing device and a signal obtained from the B1 region of the light sensing device, and a second difference signal, which is a difference signal between a signal obtained from the A7 region of the light sensing device and a signal obtained from the B7 region of the light sensing device, is generated after multiplying at least one of the first and second difference signals by a specified weight coefficient, and the tilt signal is derived in accordance with the generated difference signal.

According to the present invention, even in a place where reflectivity differs at adjacent information tracks, the tilt of an optical disk can be detected with high precision while being little influenced by the defocusing and a displacement of an objective lens.

These and other objects, features, aspects and advantages of the present invention will become more apparent upon a reading of the following detailed description and accompanying drawings.

BRIEF DESCRIPTION OF THE DRAWINGS

FIG. 1 is a schematic diagram of an optical head according to a first embodiment of the invention, FIG. 2 is a diagram showing a light sensing area of a light sensing element provided in the optical head, FIGS. 4A and 4B are diagrams conceptually showing luminous energy distributions in the light sensing area when an optical disk is not tilted and showing luminous energy distributions in the light sensing area when the optical disk is tilted, respectively, FIG. 5 is a diagram, corresponding to FIG. 2, showing a light sensing area of a light sensing element provided in an optical head according to a second embodiment of the invention.

DETAILED DESCRIPTION OF THE INVENTION

Figure 3A:
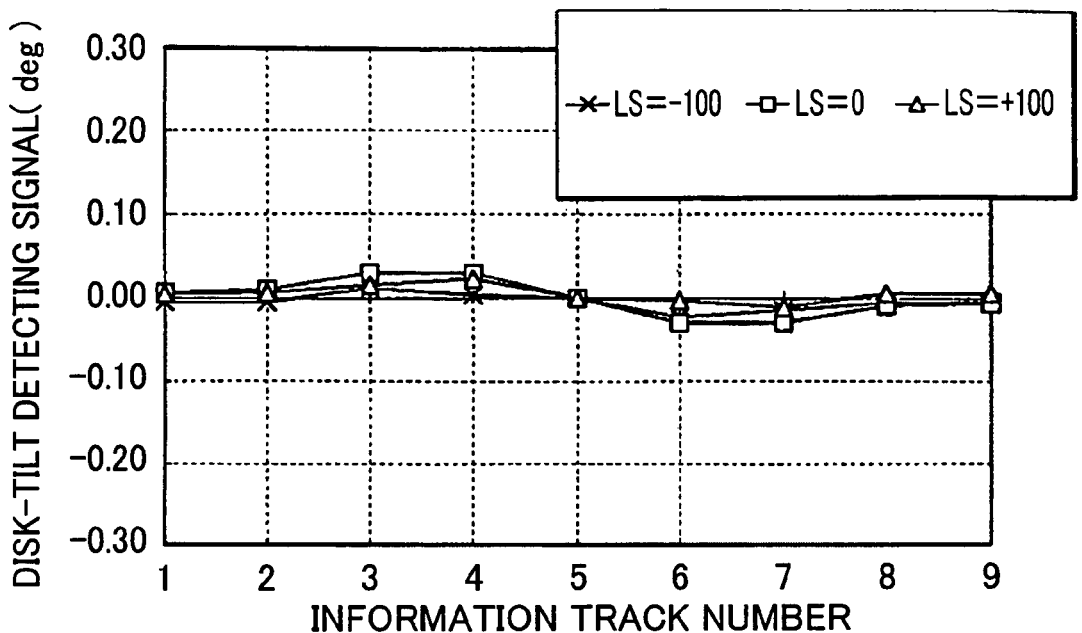
FIGS. 3A and 3B are graphs showing the influence of a detection error caused by a displacement of an objective lens in the optical head when a defocusing amount is set at zero and showing the influence of a detection error caused by the defocusing amount in the optical head when the displacement of the objective lens is set at zero, respectively.

Hereinafter, best modes for embodying the present invention are described in detail with reference to the accompanying the drawings.

First Embodiment

FIG. 1 is a construction diagram of an optical head according to a first embodiment. As shown in FIG. 1, this optical head is provided with a light source 1, a beam splitter 3, an objective lens 4, a detecting optical system 6, a light sensing element 7 as one example of a light sensing device, and a tilt detector 8 as one example of a tilt detecting means. The tilt detector 8 is provided with an integrated circuit 11 functionally including a signal calculating section 9 and a phase difference detecting section 10. Two signals P1, P2 are outputted from the signal calculating section 9 to the phase difference detecting section 10 in the integrated circuit 11.

The light source 1 emits a light having a wavelength of, for example, 405 nm. The numerical aperture (NA) of the objective lens 4 is set at 0.85. An optical axis 2 of the optical head is normal to the optical disk 5, and the objective lens 4 is arranged such that the optical axis thereof coincides with this optical axis 2.

Examples of various factors of the optical disk 5 are as follows. Specifically, the thickness of a transparent substrate is 10 μm; the pitches of information tracks 0.32 μm, the width of grooves of the information tracks 0.2 μm, the depth of the information tracks $\frac{1}{12}$ of the wavelength; the reflectivity of the recorded information tracks 0.6; and the reflectivity of the non-recorded information tracks 1.0. This optical disk 5 is an optical information recording medium of the so-called phase-changing type.

A laser beam emitted from the light source 1 passes through the beam splitter 3 and is concentrated onto an information recording surface through the transparent substrate of the optical disk 5 by the objective lens 4. The luminous flux reflected by the optical disk 5 passes through the objective lens 4 again, is reflected by the beam splitter 3 and introduced by the detecting optical system 6 to the light sensing element 7, where the luminous flux is sensed while being divided into a plurality of regions.

A light sensing signal of the light sensing element 7 is introduced to the tilt detector 8 and used for the calculation in the signal calculating section 9, whereby two push-pull signals P1, P2 are detected. These signals P1, P2 are inputted to the phase difference detecting section 10, have the phase difference of the wavefront modulated by the information tracks detected, and are consequently outputted as a signal TL. Although a general optical head requires other constituents such as a focusing detecting means, a tracking detecting means and an information signal detecting means, no description is given thereon because they are not necessary for the description of the present invention.

FIG. 2 shows a light sensing area as a luminous flux incident area of the light sensing element 7, wherein a pattern of a luminous flux 12 incident on this light sensing area is shown by broken line. As shown in FIG. 2, the light sensing area is defined to have a rectangular shape. In FIG. 2, a direction tangent to the information tracks is shown to be vertical. In other words, the transverse direction of FIG. 2 is a radial direction of the optical disk 5.

$0^{th}$-order components of the luminous flux 12 diffracted by the grooves of the information tracks when the luminous flux 12 is reflected by the optical disk 5 are sensed substantially in the middle part of the light sensing area. Although ±$1^{st}$-order components of the light diffracted by the grooves of the information tracks are also sensed in the light sensing area, they are incident at positions displaced from the $0^{th}$-order components along the radial direction of the optical disk 5. The ±$1^{st}$-order components are partly sensed in the light sensing area while overlapping the $0^{th}$-order components.

Two regions encircled by arcs at the left and right sides of the luminous flux 12 shown in FIG. 2 represent sections where the $0^{th}$-order components and the $\pm 1^{st}$-order components overlap.

The light sensing area is comprised of a region 7a as an A1 region, a region 7b as a B1 region, a region 7c as an A2 region, a region 7d as a B2 region, regions 7e, 7g as A3 regions, regions 7f, 7h as B3 regions, and a region 13 as an N region.

The light sensing area is divided into left and right areas by a vertical dividing line 61 extending in a direction parallel with a direction tangent to the information tracks of the optical disk 5, and each divided area is further vertically divided into three by two horizontal dividing lines (first and second horizontal dividing lines) 62, 63. The vertical dividing line 61 passes an optical axis 4a of the objective lens 4 in a state where there is no lens shift. The first and second horizontal dividing lines 62, 63 are straight lines normal to the vertical dividing line 61 and symmetrically arranged with respect to the optical axis 4a of the objective lens 4. A distance between the first and second horizontal dividing lines 62 and 63 substantially approximates to the vertical dimension of the sections where the $0^{th}$-order components and the $\pm 1^{st}$-components lights overlap.

The region 13 is a light blocking portion arranged in a region containing only or mainly the $0^{th}$-order components of the diffracted light preset in the center of the luminous flux 12. The region 13 is in the form of a vertically long rectangle, and is so defined in the center of the light sensing area as to include a part of the vertical dividing line 61, and is located between the first and second horizontal dividing lines 62 and 63.

Out of a region between the first and second horizontal dividing lines 62 and 63, a region at the left side of the region 13 in FIG. 2 is divided into the regions 7a and 7c by a first partition line 65 and a region at the right side of the region 13 in FIG. 2 is divided into the regions 7b, 7d by a second partition line 66.

The regions 7a and 7b are located at sides of the partition lines 65, 66 opposite from the optical axis 4a of the objective lens 4, are transversely distanced from the region 13 and are transversely symmetrical with respect to the vertical dividing line 61. The four regions 7a to 7d are used for the tilt detection.

The region 7c is comprised of a region 7c1 as an A21 region between the region 7a and the first horizontal dividing line 62, a region 7c2 as an A22 region between the region 7a and the second horizontal dividing line 63, and a region 7c3 as an A23 region connecting the regions 7c1 and 7c2. The region 7c3 is located between the region 7a and the region 13.

The region 7d is comprised of a region 7d1 as a B21 region between the region 7b and the first horizontal dividing line 62, a region 7d2 as a B22 region between the region 7b and the second horizontal dividing line 63, and a region 7d3 as a B23 region connecting the regions 7d1 and 7d2. The region 7d3 is located between the region 7b and the region 13.

An area at a side of the first horizontal dividing line 62 opposite from the optical axis 4a is divided into a left and a right regions by the vertical dividing line 61, wherein the left region serves as the region 7e and the right region serves as the region 7f.

An area at a side of the second horizontal dividing line 63 opposite from the optical axis 4a is divided into a left and a right regions by the vertical dividing line 61, wherein the left region serves as the region 7g and the right region serves as the region 7h. The regions 7e, 7g are regions excluding the region 13 and the regions 7a, 7c from the area at the left side of the vertical dividing line 61, and the regions 7f, 7h are regions excluding the region 13 and the regions 7b, 7d from the area at the right side of the vertical dividing line 61.

The first partition line 65 and the second partition line 66 include a pair of horizontal lines 65a, 66a; 65b, 66b extending in a direction normal to the vertical dividing line 61, and an arcuate inner lines 65c; 66c connecting the inner ends of both horizontal lines 65a, 66a; 65b, 66b, respectively. The horizontal line 65a serves as a boundary between the region 7a and the region 7c1; the horizontal line 65b serves as a boundary between the regions 7a and 7c2; and the inner line 65c serves as a boundary between the regions 7a and 7c3. Further, the horizontal line 66a serves as a boundary between the region 7b and the region 7d1; the horizontal line 66b serves as a boundary between the regions 7b and 7d2; and the inner line 66c serves as a boundary between the regions 7b and 7d3.

A vertical dimension (maximum width in the direction tangent to the information tracks) of the regions 7a and 7b is preferably 0.2 (inclusive) to 0.5 (inclusive) times the diameter of the luminous flux 12 to be sensed, and more preferably 0.25 (inclusive) to 0.35 (inclusive) times the diameter of the luminous flux 12 to be sensed. A distance between the regions 7a and 7b is preferably 0.3 (inclusive) to 0.6 (inclusive) times the diameter of the luminous flux 12 to be sensed, and more preferably 0.4 (inclusive) to 0.5 (inclusive) times the diameter of the luminous flux 12 to be sensed. In the case of the light sensing element 7 of FIG. 2, the vertical dimension of the regions 7a and 7b is set to be about 0.30 times the diameter of the luminous flux 12 to be sensed, and the distance between the regions 7a and 7b is set to be about 0.47 times the diameter of the luminous flux 12. Further, a radius of curvature of the inner lines 65c, 66c of the partition lines 65, 66 is preferably 0.5 (inclusive) to 1.2 (inclusive) times the radius of the luminous flux 12 to be sensed. In the case of the light sensing element 7 of FIG. 2, this radius of curvature is set to be about 1.0 times the radius of the luminous flux 12.

As can be understood from FIG. 2, the regions 7a and 7b are regions including substantially center parts of the sections where the $0^{th}$-order light and the $\pm 1^{st}$-order lights of the sensed diffracted light overlap, respectively. These center parts mean locations where a change in the luminous energy caused by a tilt or a lens shift is most conspicuously found.

The signal P1 is a difference signal having a modulated waveform and obtained from the regions 7a and 7b, and is a so-called push-pull signal. This signal P1 can be expressed as follows using electrical signals S7a, S7b outputted from the regions 7a, 7b:

$$P1 = S7a - S7b.$$

Further, the signal P2 is a difference signal having a modulated waveform and obtained from the regions 7c and 7d, and is a so-called push-pull signal. This signal P2 can be expressed as follows using electrical signals S7c, S7d outputted from the regions 7c, 7d:

$$P2 = S7c - S7d.$$

A phase difference between the signals P1 and P2 changes according to the tilt of the optical disk 5, and this changing direction is positive or negative depending on the tilted direction of the optical disk 5. Accordingly, the tilt, i.e. the tilt of the optical disk 5 can be detected by detecting this phase difference and the changing direction. Specifically, one or both of the signals P1, P2 are detected based on the phases of the signals P1 and P2 or the phase difference between them, and the signal TL, which is the optical-disk tilt detecting signal, is generated from the detected signal(s). A general method can be used for the detection of the phase difference.

For example, after the signals P1, P2 are passed through a high-pass filter to remove DC components, the level of the signal P2 is detected at a zero-crossing timing of the signal P1 and is outputted as the tilt signal TL.

Similar to the prior art, in the case that a specified factor k is so set as to correct an offset caused by a displacement of the optical axis 4a of the objective lens 4 relative to the optical axis 2 of the optical head and the tilt signal TL is obtained by a calculation of TL=P1−k*P2, the tilt detection unlikely to be influenced by the displacement of the objective lens 4 is possible by detecting the level of the tilt signal TL while a light spot is tracing the information tracks. More specifically, in the case that the objective lens 4 is movable in a direction normal to the direction of the information tracks, the luminous flux 12 incident on the light sensing element 7 is moved to left or right on the light sensing element 7 as the objective lens 4 moves. A moving distance of the luminous flux 12 in the light sensing area is determined by the dimensions of the objective lens 4, those of the light sensing element 7, distances between the respective parts of the optical head, optical characteristics and the like. The moving distance of the luminous flux 12 in the light sensing area resulting from a usual movement of the objective lens 4 is preferably set at about ±10% of the diameter of the sensed luminous flux 12. The intensities of the lights sensed in the respective regions 7a to 7d change as a result of the movement of the luminous flux 12 to such a degree. At this time, if the intensities of the lights sensed in the regions 7a, 7b increase, those of the lights sensed in the regions 7c, 7d decreases. Consequently, the signals P1, P2 both change. However, since the extents of the respective changes differ depending on the shapes of the regions 7a to 7d, the influence of the movement of the objective lens 4 on the tilt signal TL can be reduced by selecting such a factor k as to reduce a change of the tilt signal TL (=P1−k*P2) at the time of a lens shift in accordance with the shapes of the suitably set regions 7a to 7d.

Figure 3B:
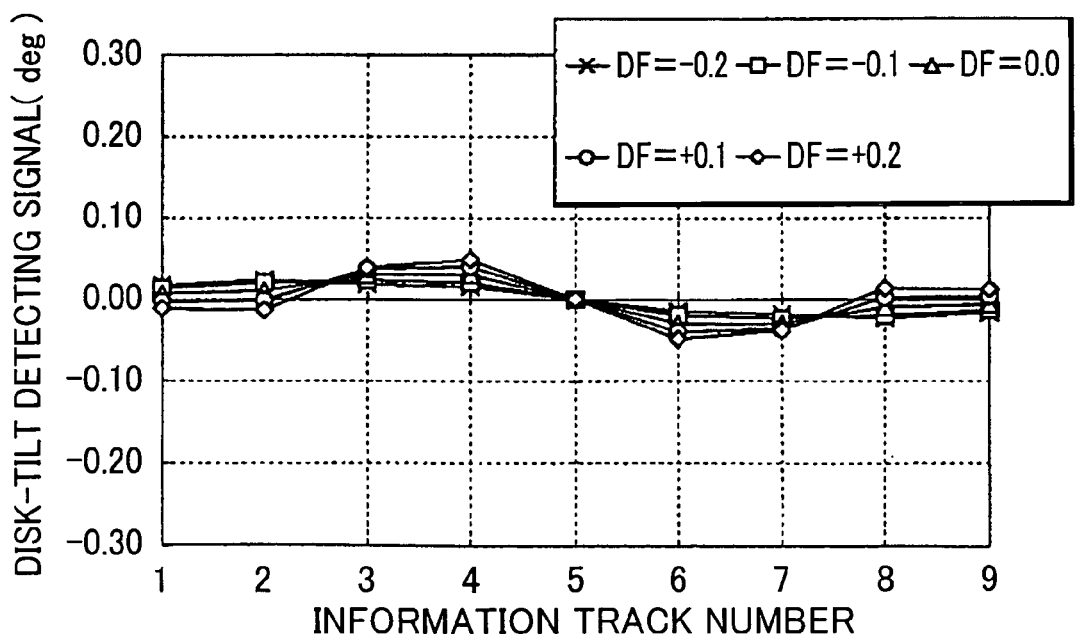
Figure 25:
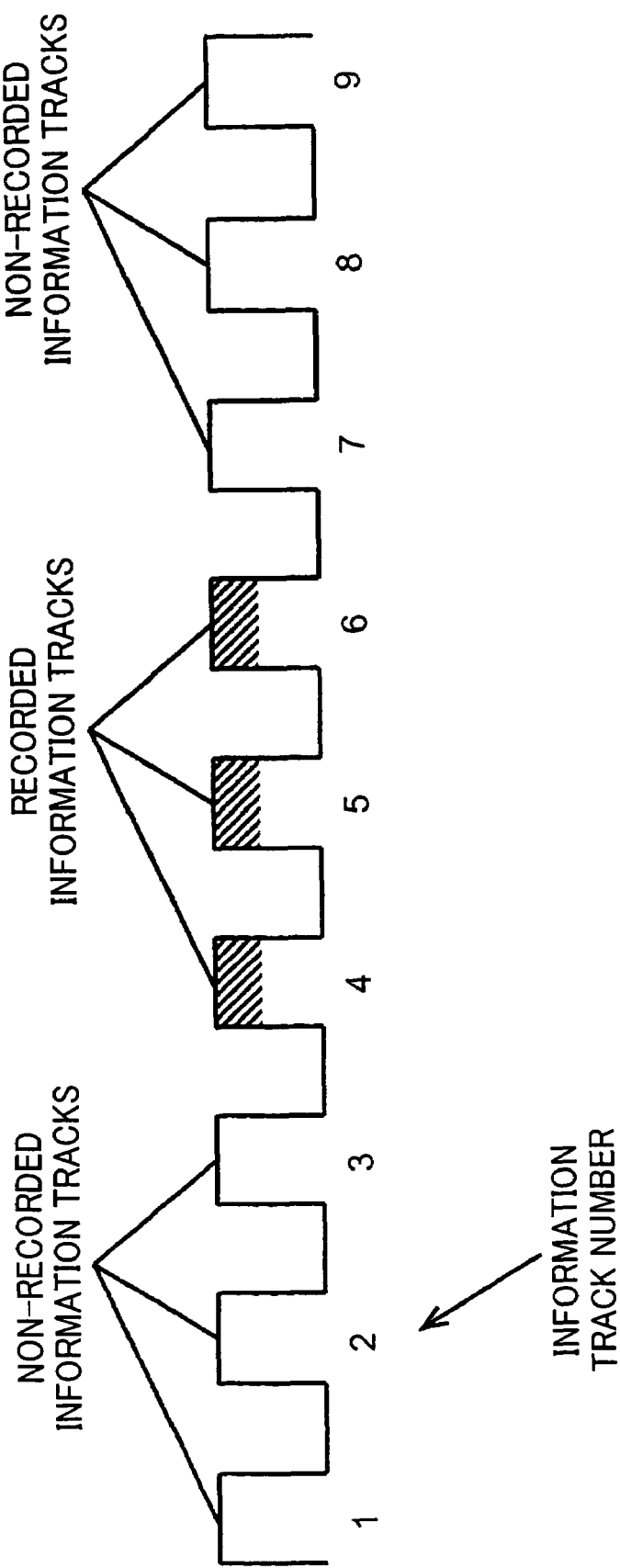
FIG. 25 is a diagram showing information tracks.

FIGS. 3A and 3B show a simulation result of the variation of the level of the tilt signal TL caused when a light spot crosses the information tracks 1 to 9 for the light sensing element 7 of the embodiment shown in FIG. 2, assuming that a pattern of information tracks having different reflectivity is cyclically repeated, similar to the simulation result shown in FIG. 25. For the comparison with the prior art, it was assumed that the tilt signal TL was detected by TL=P1−k*P2.

Calculation conditions were as follows. Specifically, the wavelength of the light source was 405 nm; NA of the objective lens 0.85; the thickness of the transparent substrate of the optical disk 100 µm; the pitches of the information tracks 0.32 µm; the width of the grooves of the information tracks 0.2 µm; the depth of the information tracks 1/12 of the wavelength; the reflectivity of the recorded information tracks 0.6; the reflectivity of the non-recorded information tracks 1.0; and the tilt of the optical disk 0 deg.

In this simulation, a ratio of the vertical dimension (dimension along the direction tangent to the information tracks) of the regions 7a (A1 region) and 7b (B1 region) in FIG. 2 for detecting the signal P1 to the diameter of the luminous flux was set at 0.30; a ratio of the distance between the regions 7a and 7b to the diameter of the luminous flux was set at 0.47; the radii of curvature of the inner lines 65c, 66c of the first and second partition lines 65, 66 were made equal to the radius of curvature of the luminous flux 12. Further, the vertical dimension (dimension along the direction tangent to the information tracks) of the regions 7c, 7d for detecting the signal P2, i.e. a distance between the first and second horizontal dividing lines 62 and 63 was set to be 0.60 times the diameter of the luminous flux. An area outside these regions 7a to 7d was not used for the calculation. Further, a ratio of the horizontal dimension (dimension along the direction normal to the direction tangent to the information tracks) of the region 13 (N region) to the diameter of the luminous flux was set at 0.35. Furthermore, a value of the factor k was so determined as to correct an offset caused by a displacement of the objective lens of ±100 µm and was set at 1.14.

Three sequential lines in FIG. 3A were calculated when the displacement of the objective lens was 0 µm and ±100 µm with a defocusing amount fixed at 0 µm. Five sequential lines of FIG. 3B were calculated when the defocusing amount was 0 µm, ±0.1 µm and ±0.2 µm with the displacement of the objective lens fixed at 0 µm. In FIGS. 3A, 3B, horizontal axis corresponds to the information track numbers of FIG. 25 and vertical axis represents an optical-disk tilted amount (unit: deg) converted from the tilt detecting signal TL.

Figure 26A:
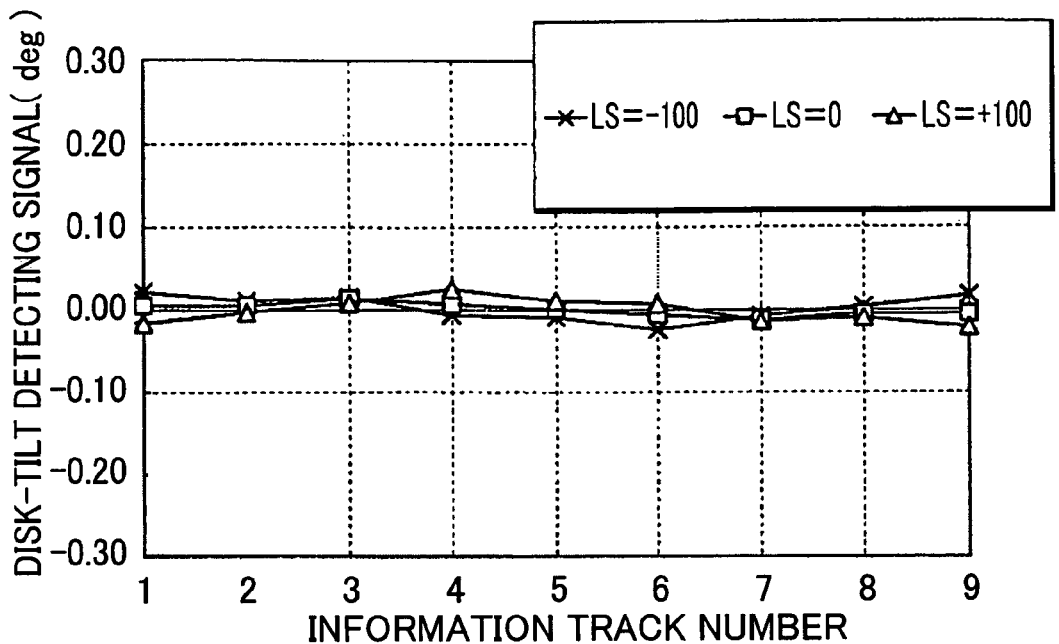
FIGS. 26A and 26B are graphs showing the influence of a detection error caused by a displacement of an objective lens in the conventional optical head when a defocusing amount is set at zero and showing the influence of a detection error caused by the defocusing amount in the conventional optical head when the displacement of the objective lens is set at zero, respectively.
Figure 26B:
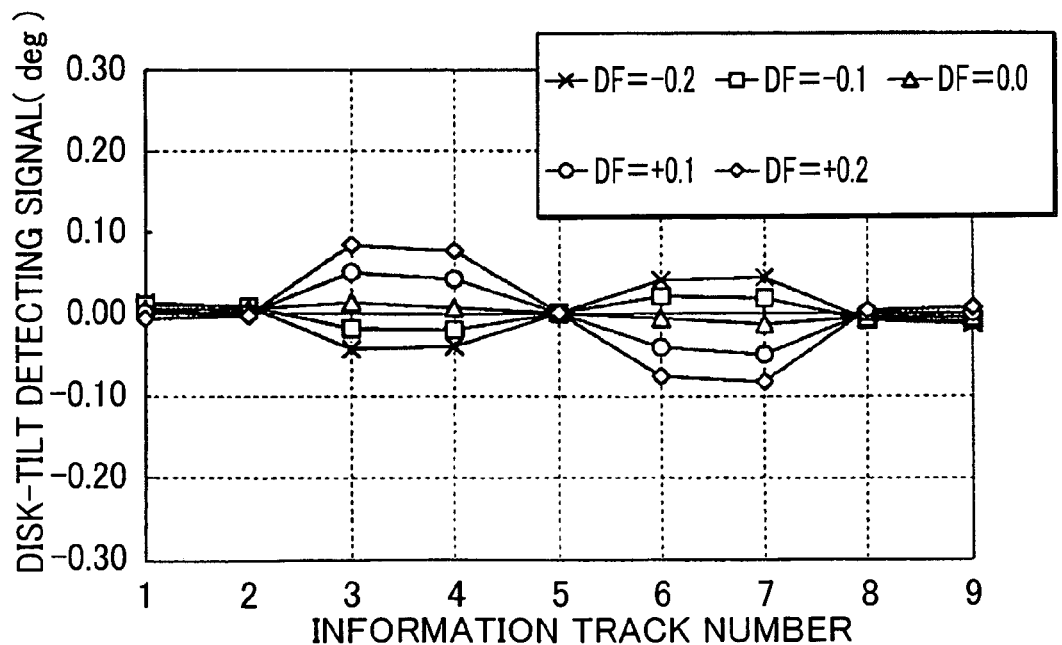

Although the detection error in detecting the tilt of the optical disk caused by the defocusing was a maximum of 0.17 deg (p-p) in the prior art shown in FIG. 26B, a maximum detection error is 0.10 deg (p-p) in this embodiment shown in FIG. 3B. This indicates that the tilt signal TL, which is the optical-disk tilt detecting signal, is unlikely to be influenced by both the defocusing and the displacement of the objective lens since the signal P1 and a signal obtained by multiplying the signal P2 by the factor k produce substantially equal offsets in response to the defocusing and the displacement of the objective lens in the light sensing element 7 of this embodiment. It should be noted that the detection error means a value of a difference between a maximum value (deg) and a minimum value (deg) of the detection signals near the boundaries between the recorded information tracks and the non-recorded information tracks.

As described above, according to the present invention, it is possible to obtain a high-precision optical-disk tilt detecting signal little influenced by both the defocusing and the displacement of the objective lens by suitably allotting the regions within the luminous flux 12, particularly largely influenced the defocusing, i.e. the regions between the regions 7a, 7b and the region 13 shown in FIG. 2 to the signals P1, P2.

Although the difference signal TL is generated based on the signal P1 as a first difference signal and a signal obtained by multiplying the signal P2 as a second difference signal by the factor k in the tilt detector 8 of this embodiment, the tilt detector 8 may, instead, generate a difference signal of the signals P1 and P2 after multiplying at least one of the signals P1, P2 by a specified weight coefficient. In other words, it is sufficient that a ratio of the respective weight coefficients upon subtracting the signal P2 from the signal P1 if the factor k.

The tilt detector 8 may include a comparing circuit for comparing the first and second difference signals P1, P2, detect the tilted direction of the optical disk as the tilt signal TL by a comparison result in this comparing circuit and finely adjust the tilt of the objective lens 4 based on whether the tilt signal TL is 1 or 0 or whether the tilt signal TL is positive or negative for a tilt correction in accordance with the tilted amount of the optical disk.

Even in the case of detecting the phase difference between the signals P1 and P2, an extent to which the defocusing and the displacement of the objective lens 4 are erroneously outputted as the tilt of the optical disk can be remarkably reduced by the light sensing element 7 of the present invention.

Here, the regions 7e to 7h (i.e. regions of the luminous flux 12 excluding the regions 7a to 7d and the region 13 (light blocking portion)) are not used for the tilt detection in this embodiment. This is because these regions are supposed to be used for other purposes as described later (third embodiment). In this respect, the regions 7e to 7h can also be omitted.

FIGS. 4A and 4B are diagrams showing changes of luminous energy distributions on the light sensing element 7 when the optical disk is tilted. When the optical disk is not tilted, the luminous energy distributions in regions 12a, 12b where $0^{th}$-order light and $\pm 1^{st}$-order lights overlap are substantially same in both left and right regions, and the luminous energy distributions within the regions 12a, 12b are substantially uniform as shown in FIG. 4A. Contrary to this, with the optical disk tilted, the luminous energy decreases in a middle part in one of the left and right regions 12a, 12b while increasing in a middle part in the other as shown in FIG. 4B.

More specifically, as the tilted amount of the optical disk increases, changes in the luminous energy in the middle parts of the regions 12a, 12b where the $0^{th}$-order light and the $\pm 1^{st}$-order lights overlap also increase, whereby the signal P1 increases in positive or negative direction while the signal P2 increases in opposite direction. Thus, the tilted amount of the optical disk can be detected by the tilt signal TL obtained by subtracting one of the signals P1, P2 from the other.

The light spot traces the information tracks in the above description. If the light spot is moving in a direction normal to the information tracks (crossing the information tracks), the luminous energies in the left and right regions change in accordance with the position of the light spot.

As can be understood from the description of this embodiment, the division of the light sensing area is not limited to the example of FIG. 2. More specifically, it is essential how the section where the $0^{th}$-order light and the $\pm 1^{st}$-order lights overlap is allotted to the regions 7a and 7c. The dividing lines may take shapes other than those shown in FIG. 2.

Second Embodiment

FIG. 5 shows a light sensing area of a light sensing element 17 applied to an optical head according to a second embodiment of the present invention. Identified by 17a to 17d are divided light sensing regions. Since this second embodiment is analogous to the first embodiment, only differences are described without describing the common construction by identifying common elements by the same reference numerals used in FIGS. 1 and 2.

A vertical dimension (maximum dimension along a direction tangent to information tracks) of the regions 17a and 17b is preferably 0.2 (inclusive) to 0.5 (inclusive) times the diameter of a luminous flux 12 to be sensed, and more preferably 0.25 (inclusive) to 0.35 (inclusive) times the diameter of the luminous flux 12. A distance between the regions 17a and 17b is preferably 0.3 (inclusive) to 0.6 (inclusive) times the diameter of the luminous flux 12 to be sensed, and more preferably 0.4 (inclusive) to 0.5 (inclusive) times the diameter of the luminous flux 12. In the case of the light sensing element 17 of FIG. 5, the vertical dimension of the regions 17a, 17b is set at about 0.30 times the diameter of the luminous flux 12, and the distance between the regions 17a, 17b is set at about 0.47 times the diameter of the luminous flux 12. Further, a radius of curvature of the inner lines 65c, 66c of the partition lines 65, 66 is about 0.5 times of the radius of the luminous flux 12 in the case of the light sensing element 17 of FIG. 5.

The signal TL is detected by TL=P1−k*P2. Here, the signals P1, P2 can be expressed as follows using electrical signals S17a to S17d outputted from the respective light sensing regions 17a to 17d:

$$P1 = S17a - S17b$$

$$P2 = S17c - S17d.$$

Figure 6A:
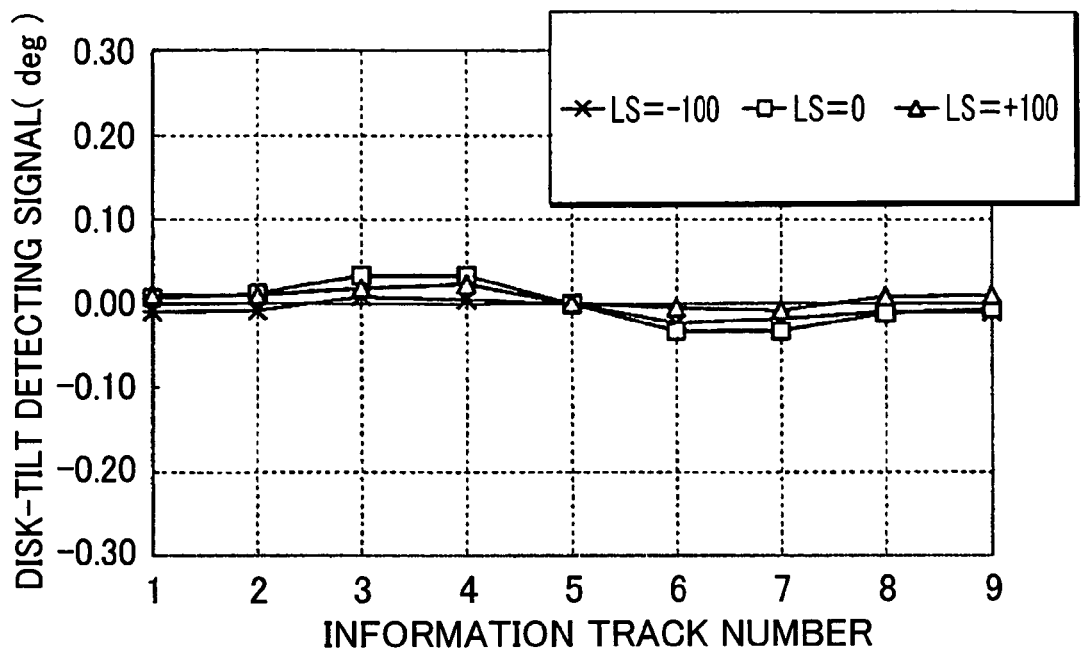
FIGS. 6A and 6B are graphs showing the influence of the detection error caused by the displacement of the objective lens in the optical head of the second embodiment when the defocusing amount is set at zero and showing the influence of the detection error caused by the defocusing amount in the optical head of the second embodiment when the displacement of the objective lens is set at zero, respectively.
Figure 6B:
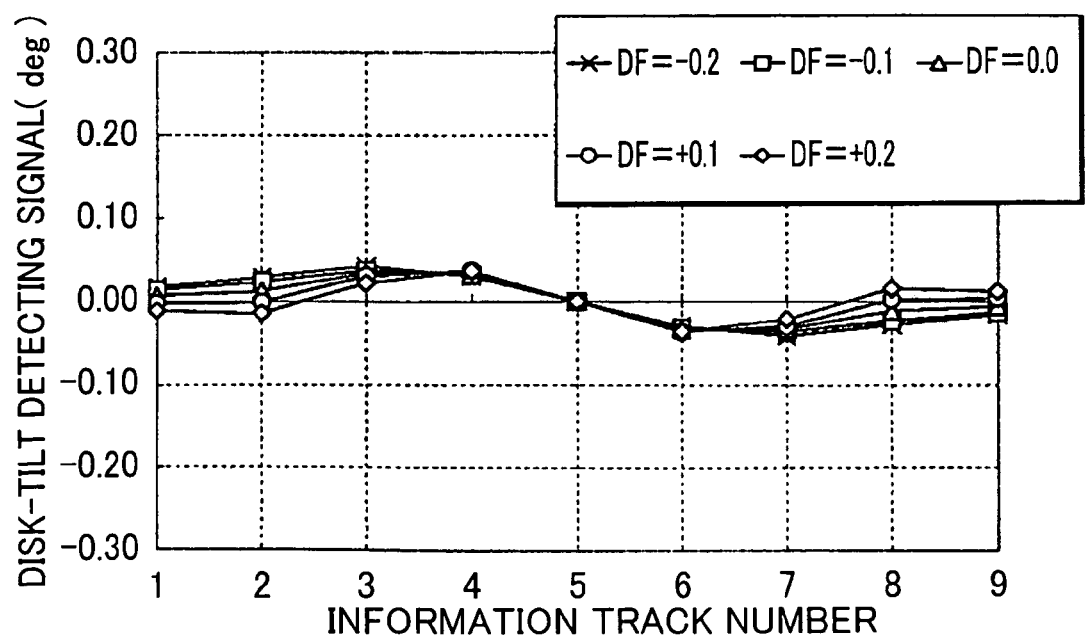

FIGS. 6A and 6B show a simulation result of the level of the signal TL for the light sensing element 17 of the second embodiment shown in FIG. 5 similar to the first embodiment. It should be noted that the calculation conditions here are the same as in the first embodiment.

In this simulation, a ratio of the vertical dimension of the regions 17a, 17b in FIG. 5 for detecting the signal P1 to the diameter of luminous flux 12 was set at 0.30; a ratio of the distance between the regions 17a, 17b to the diameter of the luminous flux 12 was set at 0.47; and the radii of curvature of the inner lines 65c, 66c of the first and second partition lines 65, 66 was set at half the radius of curvature of the luminous flux 12. Further, a vertical dimension of the regions 17c, 17d for detecting the signal P2 was set at 0.60 times the diameter of the luminous flux 12. An area outside these regions 17a to 17f was not used for the calculation. Further, a ratio of the horizontal dimension of the region 13 (N region) to the diameter of the luminous flux 12 was set at 0.35 and the value of the factor k was so determined as to correct an offset produced by a displacement of the objective lens of ±100 µm and set at 1.15.

In the simulation result shown in FIG. 6B, the detection error in detecting the tilt of the optical disk caused by the defocusing is 0.08 deg(p-p). The optical-disk tilt detecting signal TL by this light sensing element 17 is said to be less influenced by both the defocusing and the displacement of the objective lens even as compared to the light sensing element 7 of the first embodiment.

This indicates that a more precise optical-disk tilt detecting signal can be obtained not only by changing the distance between the regions 17a (A1 region) and 17b (B1 region), but also by setting the suitable shapes for the first and second partition lines 65, 66 since the partition line 65 as a boundary line between the regions 17a (A1 region) and 17c (A2 region) and the partition line 66 as a boundary line between the regions 17b (B1 region) and 17d (B2 region) are located near the region of the luminous flux 12 where the influence of the defocusing is particularly large and this region also has a distribution along the direction tangent to the information tracks.

As can be understood from the above description, the area division on the light sensing element 17 is not limited to the example of FIG. 5. Specifically, it is essential how the section where the $0^{th}$-order light and the $\pm 1^{st}$-order lights of the luminous flux 12 overlap is allotted to the A1 region and the A2 region. Generally, if a ratio of the area of a section of the region 17a (A1 region) where the $0^{th}$-order light and $\pm 1^{st}$-order lights of the luminous flux 12 overlap to the area of a section of the region 17c (A2 region) where the $0^{th}$-order light and the $\pm 1^{st}$-order lights of the luminous flux 12 overlap is set at about 0.6 to 1.5, the regions 17a to 17d may take shapes other than those shown in FIG. 5.

Third Embodiment

Figure 7:
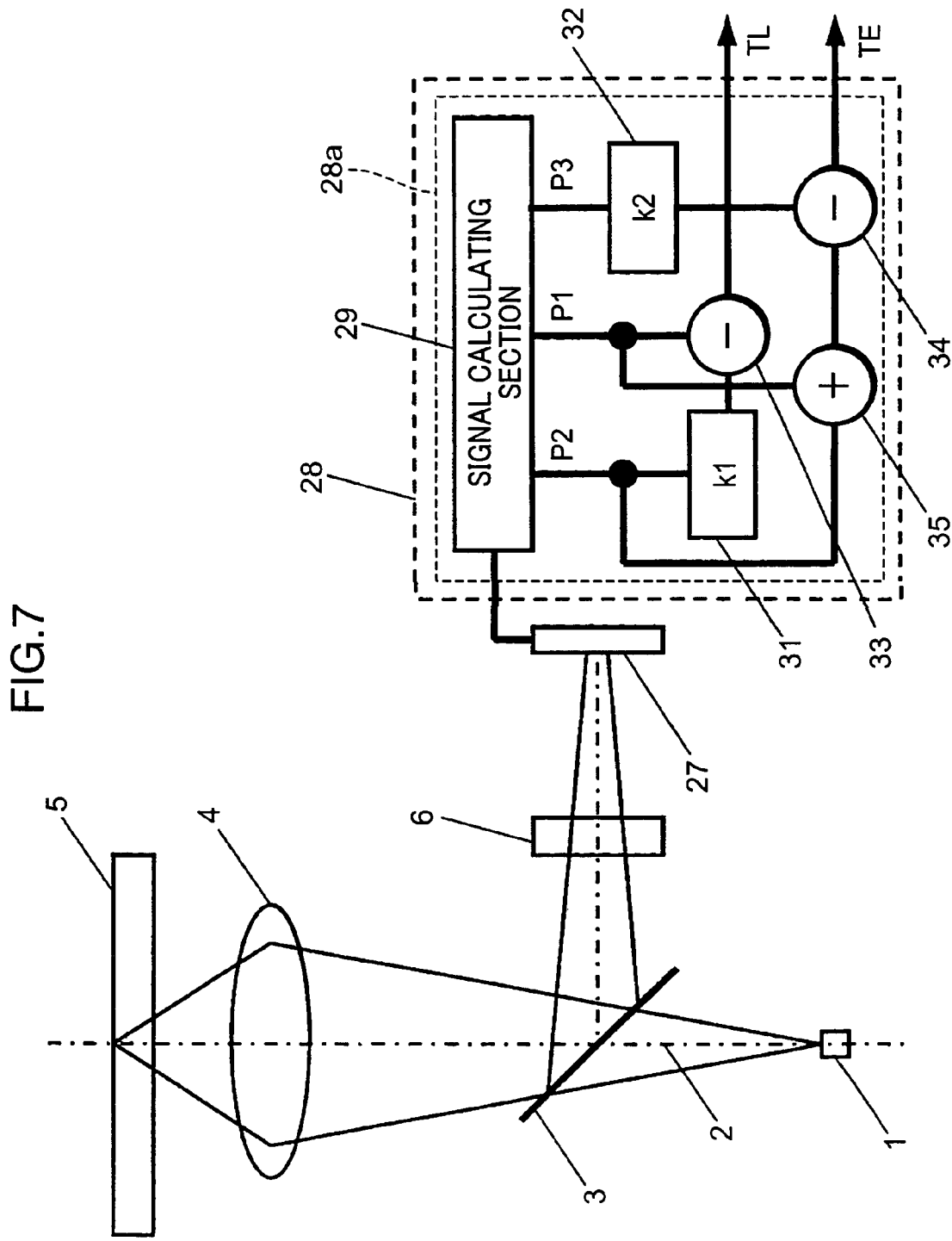
FIG. 7 is a schematic diagram of an optical head according to a third embodiment of the invention.

FIG. 7 schematically shows an optical head according to a third embodiment of the present invention. Elements common to FIG. 1 are not described by being identified in FIG. 7 by the same reference numerals as in FIG. 1. Hereinafter, elements different from those of FIG. 1 are described.

A light sensing element 27 as one example of the light sensing device is communicably connected with a signal calculating section 29 of an integrated circuit 28a provided in a signal detector 28 as one example of the signal detecting means. The signal detector 28 includes amplifiers 31, 32, differential amplifiers 33, 34 and an adding amplifier 35.

Three difference signals P1, P2, P3 are outputted from the signal calculating section 29. The amplifier 31 multiplies the input signal P2 from the signal calculating section 29 by a factor of k1. The amplifier 32 multiplies the input signal P3 from the signal calculating section 29 by a factor of k2. The signal detector 28 outputs a tilt signal TL as an optical-disk tilt detecting signal and a tracking error signal TE.

Figure 8:
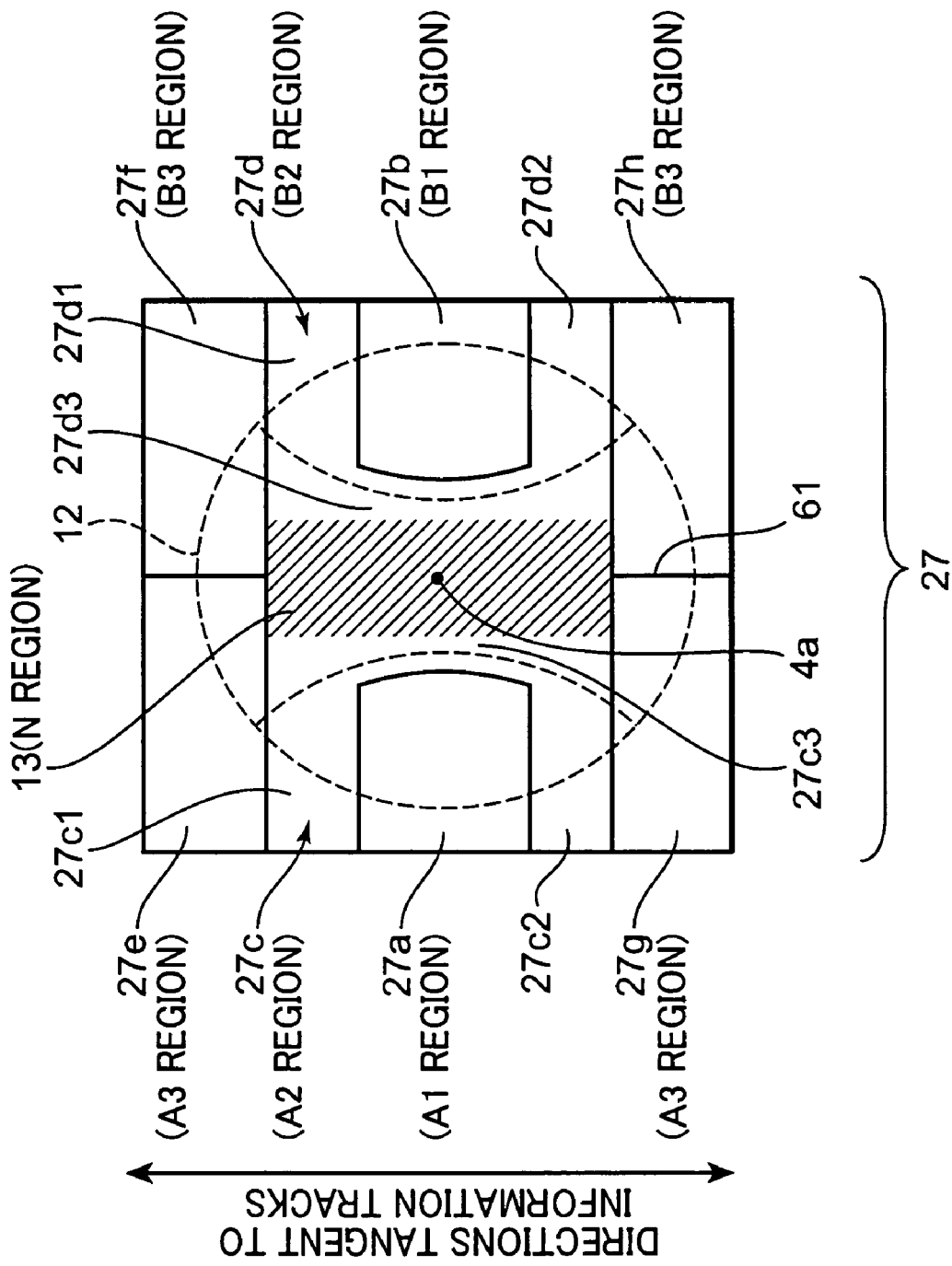
FIG. 8 is a diagram, corresponding to FIG. 2, showing a light sensing area of a light sensing element provided in an optical head according to the third embodiment of the invention.

FIG. 8 shows a light sensing area of the light sensing element 27. A division pattern of this light sensing area is similar to the one on the light sensing element 7 of FIG. 1. Specifically, the light sensing area is divided into regions 27a to 27h, and a region 13 (N region) as a light blocking portion is defined. The region 13 is arranged in an area containing only or mainly $0^{th}$-order components of a diffracted light preset in the center of the luminous flux 12.

The signal detected by the light sensing element 27 is introduced to the signal detector 28, where the three push-pull signals P1, P2, P3 are detected by the calculation in the signal calculating section 29.

The signal P1 is a push-pull signal detected in the region 27a, 27b; the signal P2 is a push-pull signal detected in the regions 27c, 27d; and the signal P3 is a push-pull signal detected in the regions 27e to 27h. These signals P1, P2, P3 can be expressed as follows using electrical signals S27a to S27h outputted from the respective regions 27a to 27h:

$$P1 = S27a - S27b$$

$$P2 = S27c - S27d$$

$$P3 = S27e + S27g - (S27f + S27h).$$

The signals P1, P2 are signals modulated by the information tracks in order to detect the light in the sections where the $0^{th}$-order components and the $\pm 1^{st}$-order components of the diffracted light overlap. On the other hand, the signal P3 detects the light in the region containing only or mainly the $0^{th}$-order components of the diffracted light and is hardly modulated by the information tracks. Thus, the signals corresponding to the positions of the luminous flux 12 moving on the light sensing element 27 according to the displacement of the objective lens 4 are detected.

If the optical disk 5 is tilted, a phase difference between the signals P1 and P2 changes and its changing direction is positive or negative depending on the tilted direction of the optical disk 5. Accordingly, the tilt of the optical disk 5 can be detected by detecting this phase difference and the changing direction similar to the first embodiment.

After being amplified by the factor of k1 in the amplifier 31, the signal P2 is subtracted from the signal P1 by the differential amplifier 33 to be outputted as the tilt signal TL. In other words, the tilt signal TL is obtained by a calculation of:

$$TL = P1 - k1 * P2.$$

Similar to the first embodiment, the specified factor k1 is so set as to correct an offset caused by the displacement of the optical axis of the objective lens 4 relative to the optical axis 2 of the optical head.

It is clear that the optical-disk tilt detecting signal obtained by this light sensing element 27 is unlikely to be influenced by both the defocusing and the displacement of the objective lens since the shapes of the regions 27a to 27d used for the optical-disk tilt detection are same as in the first embodiment. Thus, no detailed calculation is given here.

A sum signal of the signals P1 and P2 is a signal having a smaller displacement of zero-crossing points of the waveform caused by the tilt of the optical disk. In the sum signal of the signals P1 and P2, a signal obtained by correcting an offset produced by the displacement of the objective lens using the signal P3 can be used as a tracking error signal. Specifically, as shown in FIG. 7, the stable tracking error signal TE having a smaller displacement of zero-crossing points of the waveform caused by the displacement of the objective lens and the tilt of the optical disk can be obtained by causing the differential amplifier 34 to subtract the signal P3 multiplied by k2 by the amplifier 32 from the sum signal of the signals P1 and P2 obtained by the adding amplifier 35. That is to say, the signal TE can be obtained by a calculation of:

$$TE = (P1 + P2) - k2 * P3.$$

In other words, a TE signal generator for generating the tracking error signal is constructed by the adding amplifier 35, the amplifier 32 and the differential amplifier 34. It should be noted that the factor k2 is so set as to correct the offset produced in the sum signal of the signals P1 and P2 by the displacement of the objective lens.

The tilt of the optical disk can be detected by carrying out a tracking control using the signal TE and measuring the tilt signal TL while the light spot is tracing the information tracks.

Although the tracking error signal TE is generated by subtracting the product of the third signal P3 multiplied by the factor k2 from the sum signal (P1+P2) of the signals P1 and P2, it may be a signal obtained by subtracting one of the sum signal (P1+P2) and the third difference signal P3 from the other after multiplying at least either one of the sum signal (P1+P2) and the third difference signal P3 by a specified weight coefficient. In other words, it is sufficient that a ratio of the respective weight coefficients is the factor k2 upon subtracting one of the sum signal (P1+P2) and the third difference signal P3 from the other.

In the above description, the specified factor k1 is so set as to correct the offset produced by the displacement of the optical axis of the objective lens 4 and the factor k2 is so set as to correct the offset produced in the sum signal of the signals P1 and P2 by the displacement of the objective lens. The present invention is not limited thereto. For example, the signal TL may be derived by the following operational equations.

$$TL = TL1 - k4 * TL2$$

$$TL1 = P1 - k3 * P2$$

$$P1 = S27a - S27b$$

$$P2 = S27c - S27d$$

$$TL2 = S27e + S27g - (S27f + S27h).$$

The factors k3, k4 used in this calculation are set as follows. First, the factor k3 may be so set as to minimize an AC amplitude of a signal TL1 when the objective lens 4 is moved and then the factor k4 may be so set as to let a variation of the offset of the signal TL stay within a specified range. With such setting, an error variation of the tilt signal TL caused by a lens shift can be suppressed while the level variation of the tilt signal TL during an off-track period is suppressed.

Further, the tracking error signal TE may be derived by an operational equation of:

TE=P1+P2.

In this case, the TE signal generator is constructed by the adding amplifier 35.

Fourth Embodiment

Figure 9:
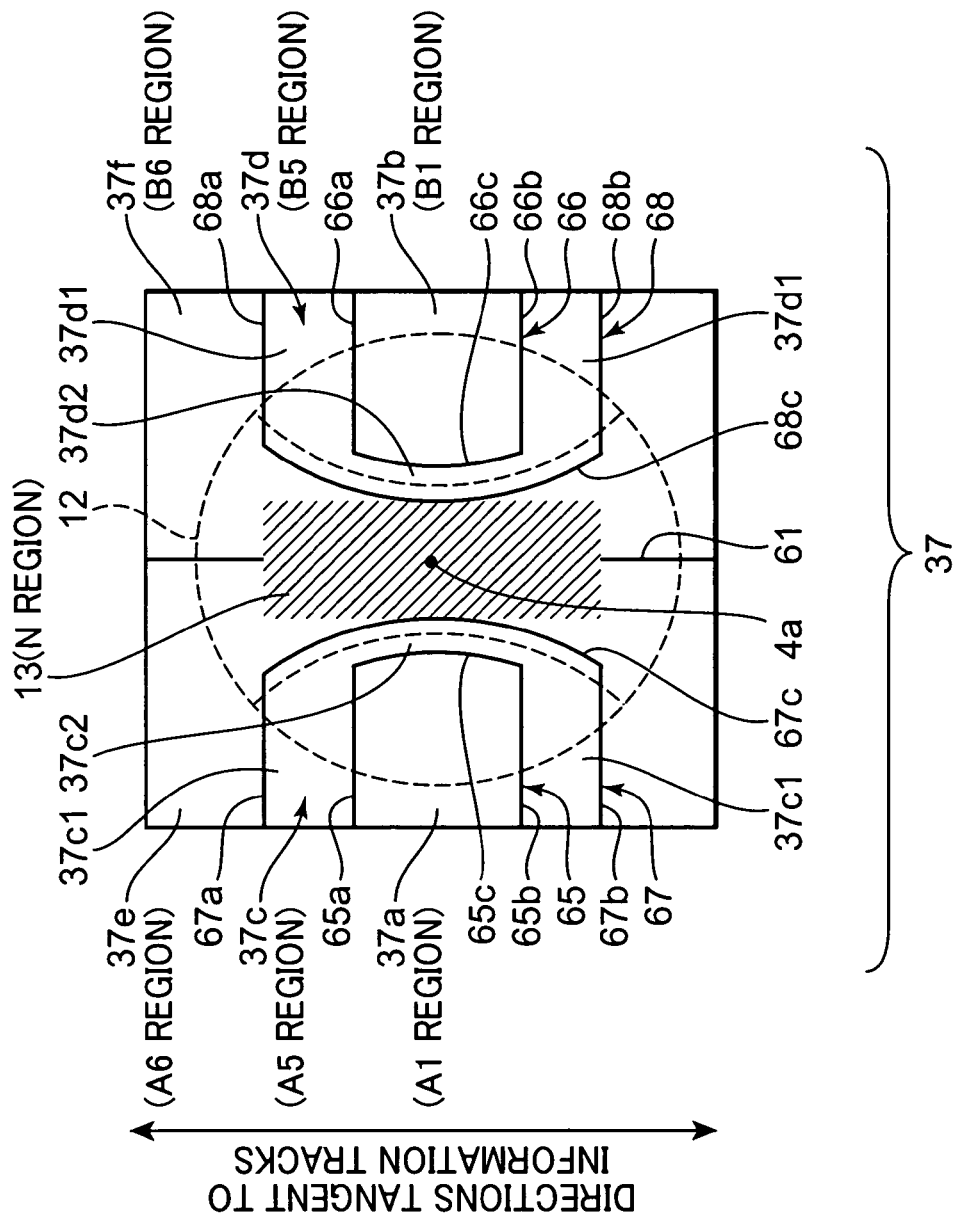
FIG. 9 is a diagram, corresponding to FIG. 2, showing a light sensing area of a light sensing element provided in an optical head according to a fourth embodiment of the invention.
Figure 10:
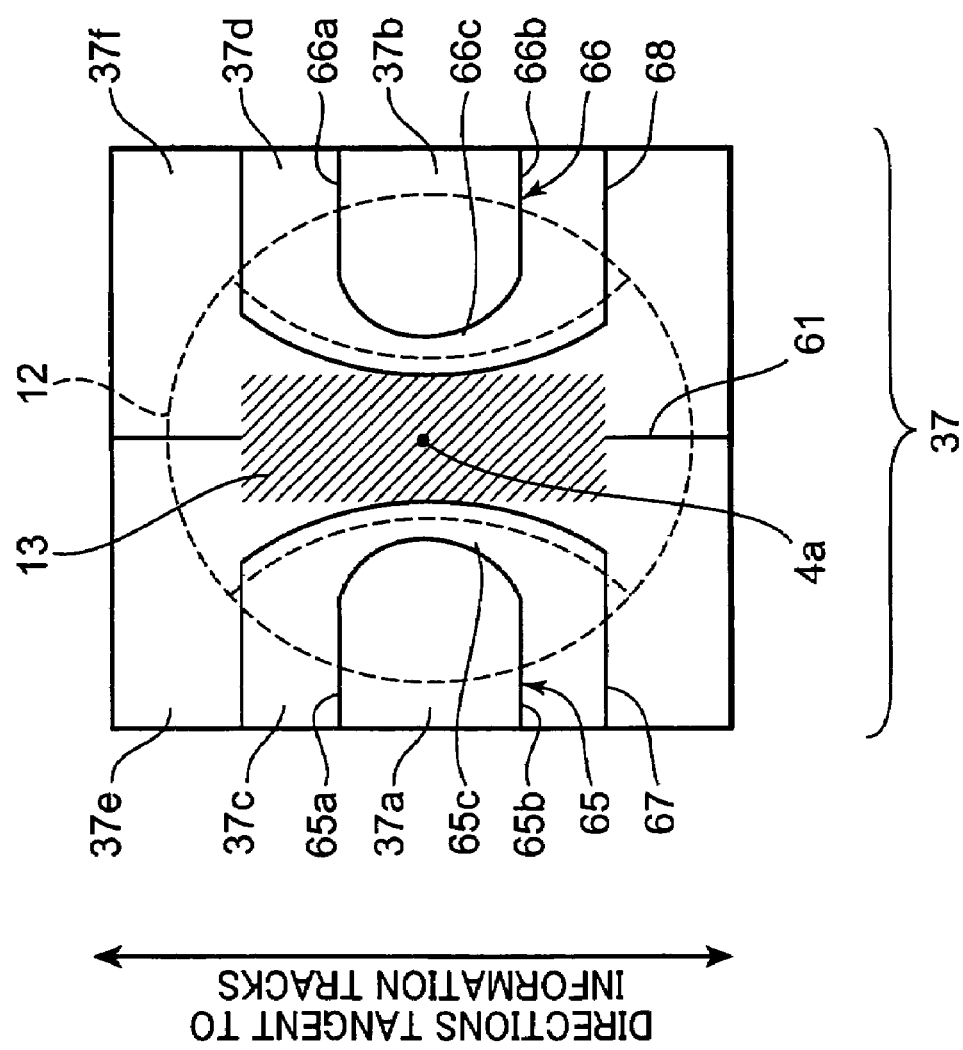
FIG. 10 is a diagram, corresponding to FIG. 2, showing a light sensing area of a light sensing element according to another embodiment of the invention.

FIGS. 9 and 10 show a light sensing area of a light sensing element 37 applied to an optical head according to a fourth embodiment of the invention. Here, elements common to the first embodiment are not described by being identified by the same reference numerals.

The light sensing area is comprised of a region 37a as an A1 region, a region 37b as a B1 region, a region 37c as an A5 region, a region 37d as a B5 region, a region 37e as an A6 region, a region 37f as a B6 region and a region 13 as an N region.

The light sensing area is divided into left and right regions by a vertical dividing line 61. The regions 37a, 37c, 37e are defined in the left region. The regions 37a and 37c are partitioned by a first partition line 65. In other words, a region at a side of a third partition line 67 opposite from the optical axis 4a is divided into the regions 37c, 37a by the first partition line 65. The region at the left side of the vertical dividing line 61 is divided into the regions 37c, 37e by the third partition line 67.

On the other hand, the regions 37b, 37d, 37f are defined in the region at the right side of the vertical dividing line 61. The regions 37b, 37d are partitioned by a second partition line 66. In other words, a region at a side of a fourth partition line 68 opposite from the optical axis 4a is divided into the regions 37d, 37b by the second partition line 66. The region at the right side of the vertical dividing line 61 is divided into the regions 37d, 37f by the fourth partition line 68.

The region 13 has a vertically long rectangular shape and is arranged in an area present in a middle part of the luminous flux 12 and only or mainly containing the $0^{th}$-order components of the diffracted light.

The regions 37a and 37b are distanced from the region 13 and are symmetrically arranged with respect to the vertical dividing line 61 within the vertical range of the region 13. The regions 37c and 37d are also symmetrically arranged with respect to the vertical dividing line 61. The regions 37a and 37b have configurations similar to the regions 7a and 7b of the first embodiment.

The first and second partition lines 65, 66 include a pair of horizontal lines 65a, 66a; 65b, 66b extending in a direction normal to the vertical dividing line 61, and an arcuate inner lines 65c, 66c connecting the inner ends of both horizontal lines 65a, 66a: 65b, 66b.

The third and fourth partition lines 67, 68 include a pair of horizontal lines 67a, 68a; 67b, 68b extending in a direction normal to the vertical dividing line 61, and an arcuate inner line 67c; 68c connecting the inner ends of both horizontal lines 67a, 68a; 67b, 68b, respectively. The horizontal lines 67a, 68a, 67b, 68b are arranged near ends of a section where the $0^{th}$-order light and $\pm 1^{st}$-order lights of the incident luminous flux 12 overlap. The inner lines 67c, 68c are arranged right inner side the section where the $0^{th}$-order light and the $\pm 1^{st}$-order lights of the incident luminous flux 12 and touch the region 13 in their middle parts while being distanced from the region 13 at the opposite sides of their middle parts. A radius of curvature of the inner lines 67c, 68c is substantially equal to a radius of the luminous flux 12 to be sensed. It should be noted that the inner lines 67c, 68c may not touch the region 13.

The region 37c includes a pair of regions 37c1 as a pair of A51 regions and a region 37c2 as an A52 region connecting the two regions 37c1, wherein the regions 37c1 and 37c2 are so arranged as to surround three sides of the region 37a. The regions 37c1 are adjacent to the opposite sides of the region 37a with respect to a direction tangent to the information tracks. In other words, the region 37a is located between the two regions 37c1 with respect to an extending direction of the vertical dividing line 61. The region 37c2 has a curved shape and is so arranged between the region 37a and the region 13 as to extend along the outer peripheries of the $\pm 1^{st}$-order lights.

The region 37d includes a pair of regions 37d1 as a pair of B51 regions and a region 37d2 as a B52 region connecting the two regions 37d1, wherein the regions 37d1 and 37d2 are so arranged as to surround three sides of the region 37b. The regions 37d1 are adjacent to the opposite sides of the region 37b with respect to the direction tangent to the information tracks. In other words, the region 37b is located between the two regions 37d1 with respect to the extending direction of the vertical dividing line 61. The region 37d2 has a curved shape and is so arranged between the region 37b and the region 13 as to extend along the outer peripheries of the $\pm 1^{st}$-order lights.

The region 37e is defined outside the region 37c in the region at the left side of the vertical dividing line 61. On the other hand, the region 37f is defined outside the region 37d in the region at the right side of the vertical dividing line 61.

The regions 37a, 37b include substantially middle parts of the sections where the $0^{th}$-order light and the $\pm 1^{st}$-order lights of the sensed diffracted light overlap, and serve as regions for sensing the $0^{th}$-order light and the $\pm 1^{st}$-order lights. The regions 37c, 37d serve as regions for sensing the $0^{th}$-order light and the $\pm 1^{st}$-order lights except middle parts of sections where the $0^{th}$-order light and the $\pm 1^{st}$-order lights overlap. On the other hand, the regions 37e, 37f serve as regions for only or mainly sensing the $0^{th}$-order light.

For example, by comparing the light sensing area shown in FIG. 9 with the one shown in FIG. 8, the region 27c (A2 region) and the region 37c (A5 region) differ in shape, and the region 27d (B2 region) and the region 37d (B5 region) differ in shape. Since there is hardly no influence from the modulation by the information tracks in these different sections, i.e. substantially triangular sections removed from the regions 27c, 27d and added to the regions 37e, 37f, there is hardly no influence on the tilt signal TL as an optical-disk tilt detecting signal. On the other hand, since there is a little influence from boundaries between recorded and non-recorded information tracks in the substantially triangular sections, the influence of a tracking error signal at the boundaries between the recorded and non-recorded information tracks can be reduced without reducing the performance of detecting the tilt of the optical disk by suitably setting the shape and dimensions for the sections to be added to the regions 37e, 37f. To this end, the areas of the regions 37a, 37b need to be decreased as the areas of the regions 37c, 37d decrease. Specifically, it can be done through an increase of a distance between the regions 37a and 37b or a decrease of the vertical dimension of the regions 37a and 37b or both.

Here, a simulation result of a detection error in detecting the tilt of the optical disk caused by the defocusing is described for the light sensing element 37 of the fourth embodiment. This simulation is the same as the one described in the first embodiment, and calculations were made using five items as calculation conditions set as shown in TABLE 1. These items include:
1) Vertical dimension of the region 37c (A5 region) (=Vertical dimension of the region 37d (B5 region))
2) Vertical dimension of the region 37a (A1 region) (=Vertical dimension of the region 37b (B1 region))
3) Distance between the region 37a (A1 region) and the region 37b (B1 region)
4) Horizontal dimension of the region 13 (N region)
5) Radius of curvature of the inner lines 65c, 66c of the partition lines 65, 66.

Numerical values in the respective items of TABLE 1 are ratios to the diameter of the sensed luminous flux 12 for the items 1) to 4) and ratios to the radius of the sensed luminous flux 12 for the item 5). Detection errors (unit: deg) are shown as optical-disk tilted amounts obtained by converting the tilt signal TL as the optical-disk tilt detecting signal. It should be noted that the other calculation conditions are the same as those described in the first embodiment.

TABLE 1

| ITEM | EX. 1 | EX. 2 | EX. 3 | EX. 4 | EX. 5 | EX. 6 |
|---|---|---|---|---|---|---|
| 1) | 0.60 | 0.60 | 0.60 | 0.60 | 0.60 | 0.70 |
| 2) | 0.30 | 0.30 | 0.30 | 0.30 | 0.40 | 0.30 |
| 3) | 0.47 | 0.47 | 0.47 | 0.53 | 0.47 | 0.47 |
| 4) | 0.35 | 0.35 | 0.25 | 0.35 | 0.35 | 0.35 |
| 5) | 0.5 | 1.0 | 0.5 | 0.5 | 0.5 | 0.5 |
| DETECTION ERROR | 0.082 | 0.096 | 0.090 | 0.186 | 0.210 | 0.193 |

Any one of the items differs in Example 2 to Example 6, and Example 1 has no item different from those of the other Examples. Specifically, the item 5) differs in Example 2; the item 4) differs in Example 3; the item 3) differs in Example 4; the item 2) differs in Example 5; and the item 1) differs in Example 6. Example 1 is the one shown in FIG. 10 where the radius of curvature as the item 5) is 0.5, whereas Example 2 is the one shown in FIG. 9 where the radius of curvature as the item 5) is 1.0.

As can be understood from this simulation result, the detection errors are 0.082 to 0.096 deg (p-p) in Examples 1 to 3, thereby being reduced to half as compared to the detection error of 0.17 deg of the prior art and presenting good results. Contrary to this, Examples 4 to 6 cannot be said to be better as compared to the prior art. By putting these results together, the following can be derived:

1) The ratio of the vertical dimension of the regions 37c, 37d to the diameter of the luminous flux is preferably 0.5 or larger and 0.65 or smaller;

2) The ratio of the vertical dimension of the regions 37a, 37b to the diameter of the luminous flux is preferably 0.25 or larger and 0.35 or smaller;

3) The ratio of the distance between the regions 37a, 37b to the diameter of the luminous flux is preferably 0.4 or larger and 0.5 or smaller;

4) The ratio of the horizontal dimension of the region N to the diameter of the luminous flux is preferably 0.2 or larger and 0.4 or smaller; and 5) The ratio of the radius of curvature of the inner lines 65c, 66c to the radius of the luminous flux is preferably 0.5 or larger and 1.2 or smaller.

If the above values lie within these numerical ranges, the tilt of the optical disk is more unlikely to be influenced by both the defocusing and the displacement of the objective lens even at the boundaries between the tracks having information recorded thereon and those having no information recorded thereon.

As can be understood from the above description, the division of the light sensing area of the light sensing element 37 is not limited to the examples of FIGS. 9 and 10. It is essential how the section where the $0^{th}$-order light and the $\pm 1^{st}$-order lights of the luminous flux 12 overlap is allotted to the A1 region and the A5 region. The dividing lines may take shapes other than those shown in FIGS. 9 and 10.

Further, the light sensing element 37 of the fourth embodiment may be electrically connected with the tilt detector 8 shown in FIG. 1 or with the signal detector 28 shown in FIG. 7.

The other construction, functions and effects are similar to those of the first embodiment.

Fifth Embodiment

Figure 11:
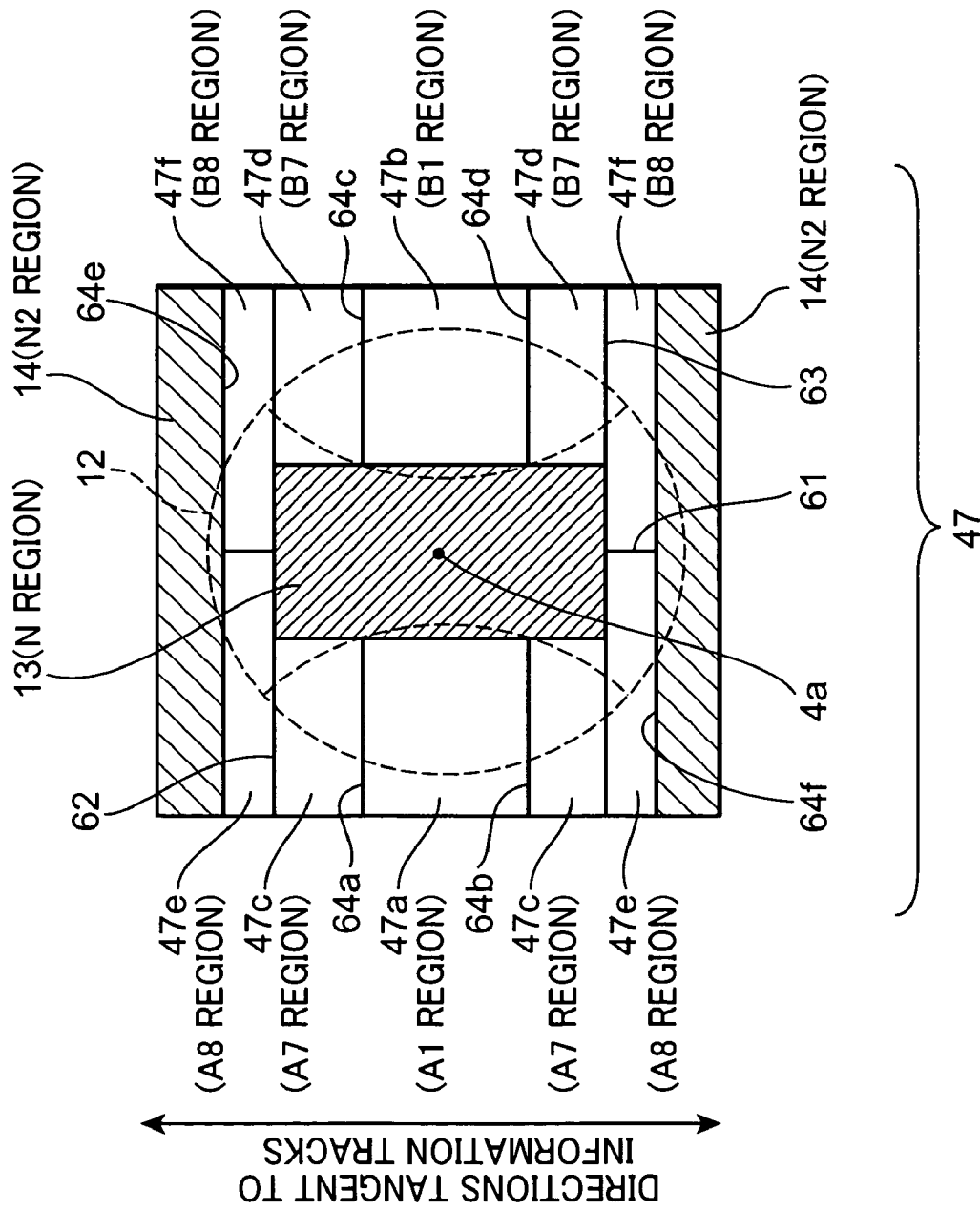
FIG. 11 is a diagram, corresponding to FIG. 2, showing a light sensing area of a light sensing element provided in an optical head according to a fifth embodiment of the invention.

FIG. 11 shows a light sensing area of a light sensing element 47 applied to an optical head according to a fifth embodiment of the invention. Here, elements common to the first embodiment are not described by being identified by the same reference numerals.

The light sensing area is comprised of a region 47a as an A1 region, a region 47b as a B1 region, regions 47c as A7 regions, regions 47d as B7 regions, regions 47e as A8 regions, regions 47f as B8 regions, a region 13 as an N region and regions 14 as N2 regions.

The light sensing area is divided into left and right areas by a vertical dividing line 61, and the region 13 is defined to span at the opposite sides of this vertical dividing line 61. This region 13 is defined between first and second horizontal dividing lines 62, 63 normal to the vertical dividing line 61. The width (vertical dimension) of the region 13 along the vertical dividing line 61 is equal to a distance between the first and second horizontal dividing lines 62 and 63, and the width (horizontal dimension) thereof along a direction normal to the vertical dividing line 61 is narrower than a distance between left and right sections where the $0^{th}$-order light and $\pm 1^{st}$-order lights of the diffracted light overlap.

An area at the left side of the region 13 is divided into three regions along an extending direction of the vertical dividing line 61 by third and fourth horizontal dividing lines 64a, 64b parallel to the horizontal dividing lines 62, 63. A middle one of these divided regions serves as the region 47a, and the regions at the opposite sides serve as the regions 47c.

An area at the right side of the region 13 is divided into three regions along the extending direction of the vertical dividing line 61 by fifth and sixth horizontal dividing lines 64c, 64d parallel to the horizontal dividing lines 62, 63. A middle one of these divided regions serves as the region 47b, and the regions at the opposite sides serve as the regions 47d. The regions 47a and 47b are symmetrically arranged with respect to the vertical dividing line 61 and adjacent to the region 13. The regions 47c and 47d are also symmetrically arranged with respect to the vertical dividing line 61 and adjacent to the region 13.

The regions 47a and 47b are regions including substantially middle parts of the sections where the $0^{th}$-order light and $\pm 1^{st}$-order lights overlap and adapted to sense the $0^{th}$-order light and $\pm 1^{st}$-order lights. The regions 47c and 47d are regions for sensing the $0^{th}$-order light and $\pm 1^{st}$-order lights except in the middle parts of the sections where the $0^{th}$-order light and $\pm 1^{st}$-order lights overlap.

An area at a side of the first horizontal dividing line 62 opposite from the optical axis 4a is divided by a seventh horizontal dividing line 64e parallel to the first horizontal dividing line 62. On the other hand, an area at a side of the second horizontal dividing line 63 opposite from the optical axis 4a is divided by an eighth horizontal dividing line 64f parallel to the second horizontal dividing line 63. The seventh and eighth horizontal dividing lines 64e, 64f are symmetrically arranged with respect to the optical axis 4a. Areas at sides of the seventh and eighth horizontal dividing lines 64e, 64f opposite from the optical axis 4a are defined as the regions 14.

The regions 14 are formed by light blocking portions which do not detect the incident luminous flux 12. By providing the regions 14 made of the light blocking portions at the upper and lower sides of the region 13, it becomes easier to adjust coefficients for correcting an offset of the tracking error signal caused by the displacement of the objective lens and an offset of the tracking error signal produced at boundaries between the tracks having information recorded thereon and those having no information recorded thereon, respectively.

An area between the first and seventh horizontal dividing lines 62, 64e is divided into a left and a right regions by the vertical dividing line 61, whereas an area between the second and eighth horizontal dividing lines 63, 64f is divided into a left and a right regions by the vertical dividing line 61. The regions at the left side of the vertical dividing line 61 in the area between the first and seventh horizontal dividing lines 62, 64e and in the area between the second and eighth horizontal dividing lines 63, 64f serve as the regions 47e, and those at the right side of the vertical dividing line 61 serve as the regions 47f. In other words, the regions 47e, 47f are defined at the sides of the first and second horizontal dividing lines 62, 63 opposite from the optical axis 4a. These regions 47e, 47f are for sensing only or mainly the $0^{th}$-order light of the luminous flux 12.

The signals detected by the light sensing element 47 are introduced to a signal detector, where three push-pull signals P1, P2, P3 are detected.

The signal P1 is a push-pull signal detected in the regions 47a, 47b; the signal P2 is the one detected in the regions 47c, 47d; and the signal P3 is the one detected in the regions 47e, 47f. These signals P1, P2, P3 can be expressed as follows using electrical signals S47a to S47f outputted from the respective regions 47a to 47f:

$$P1 = S47a - S47b$$

$$P2 = S47c - S47d$$

$$P3 = S47e - S47f.$$

A tilt signal TL can be obtained by a calculation of:

$$TL = P1 - k1*P2.$$

Instead of this calculation, the tilt signal TL may be obtained by a calculation of:

$$TL = P1 - k1*P2 - k2*P3.$$

In this construction, factors k1, k2 are set as follows. First, the factor k1 may be so set as to minimize an AC amplitude of P1−k1*P2 when the objective lens is moved and then the factor k2 may be so set as to let a variation of the offset of the tilt signal stay within a specified range. With such setting, an error variation of the tilt signal TL caused by a lens shift can be suppressed while the level variation of the tilt signal TL during an off-track period is suppressed.

Here, a simulation result of a detection error in detecting the tilt of the optical disk caused by the defocusing is described for the light sensing element 47 of the fifth embodiment. In this simulation, the signal TL is derived using the above operational equation: TL=P1−k1*P2.

In this simulation, calculations were made using four items as calculation conditions set as shown in TABLE 2. These items include:

1) Horizontal dimension of the region 13 (N region) (=Distance between the region 47a (A1 region) and the region 47b (B1 region))
2) Vertical dimension of the region 13 (N region) (=Sum of the vertical dimensions of the region 47a (A1 region) and the regions 47c (A7 regions))
3) Vertical dimension of the region 47a (A1 region) (=Vertical dimension of the region 47b (B1 region))
4) Distance between the regions 14 (N2 regions) (=sum of the vertical dimensions of the region 47a (A1 region), the regions 47c (A7 regions) and the regions 47e (A8 regions).

Numerical values in the respective items of TABLE 2 are ratios to the diameter of the luminous flux 12 to be sensed. TE balance in TABLE 2 is an index to the stability of a tracking error signal and represents a deviation of zero-crossing points of the tracking error signal.

TABLE 2

| ITEM | EX. 1 | EX. 2 | EX. 3 | EX. 4 | EX. 5 |
| --- | --- | --- | --- | --- | --- |
| 1) | 0.40 | 0.36 | 0.40 | 0.40 | 0.40 |
| 2) | 0.54 | 0.54 | 0.54 | 0.54 | 0.60 |
| 3) | 0.26 | 0.26 | 0.26 | 0.32 | 0.26 |
| 4) | 0.80 | 0.80 | 0.85 | 0.80 | 0.80 |
| DETECTION ERROR | 0.070 | 0.065 | 0.069 | 0.074 | 0.075 |
| TE BALANCE | 0.0226 | 0.0298 | 0.0268 | 0.0226 | 0.0240 |

Any one of the items differs in Example 2 to Example 5, and Example 1 has no item different from those of the other Examples. Specifically, the item 1) differs in Example 2; the item 4) differs in Example 3; the item 3) differs in Example 4; and the item 2) differs in Example 5.

As can be understood from this simulation result, the detection error of the light sensing element 47 of this embodiment is held down to 0.065 to 0.075 deg (p-p) which is about 40% of 0.17 deg (p-p) as the detection error of the prior art. This result is fairly good.

Accordingly, the following can be derived:

1) The ratio of the horizontal dimension of the region 13 to the diameter of the luminous flux is preferably 0.35 or larger and 0.45 or smaller, more preferably 0.36 or larger and 0.40 or smaller;

2) The ratio of the vertical dimension of the region 13 to the diameter of the luminous flux is preferably 0.5 or larger and 0.6 or smaller, more preferably 0.54 or larger and 0.60 or smaller;

3) The ratio of the vertical dimension of the regions 47a, 47b to the diameter of the luminous flux is preferably 0.2 or larger and 0.32 or smaller, and more preferably 0.26 or larger and 0.30 or smaller; and 4) The ratio of the distance between the regions 14 to the diameter of the luminous flux is preferably 0.75 or larger and 0.85 or smaller, and more preferably 0.80 or larger and 0.85 or smaller.

If the above values lie within these numerical ranges, the tilt of the optical disk is more unlikely to be influenced by both the defocusing and the displacement of the objective lens even at the boundaries between the tracks having information recorded thereon and those having no information recorded thereon.

The other construction, functions and effects are similar to those of the fourth embodiment.

Sixth Embodiment

Figure 12:
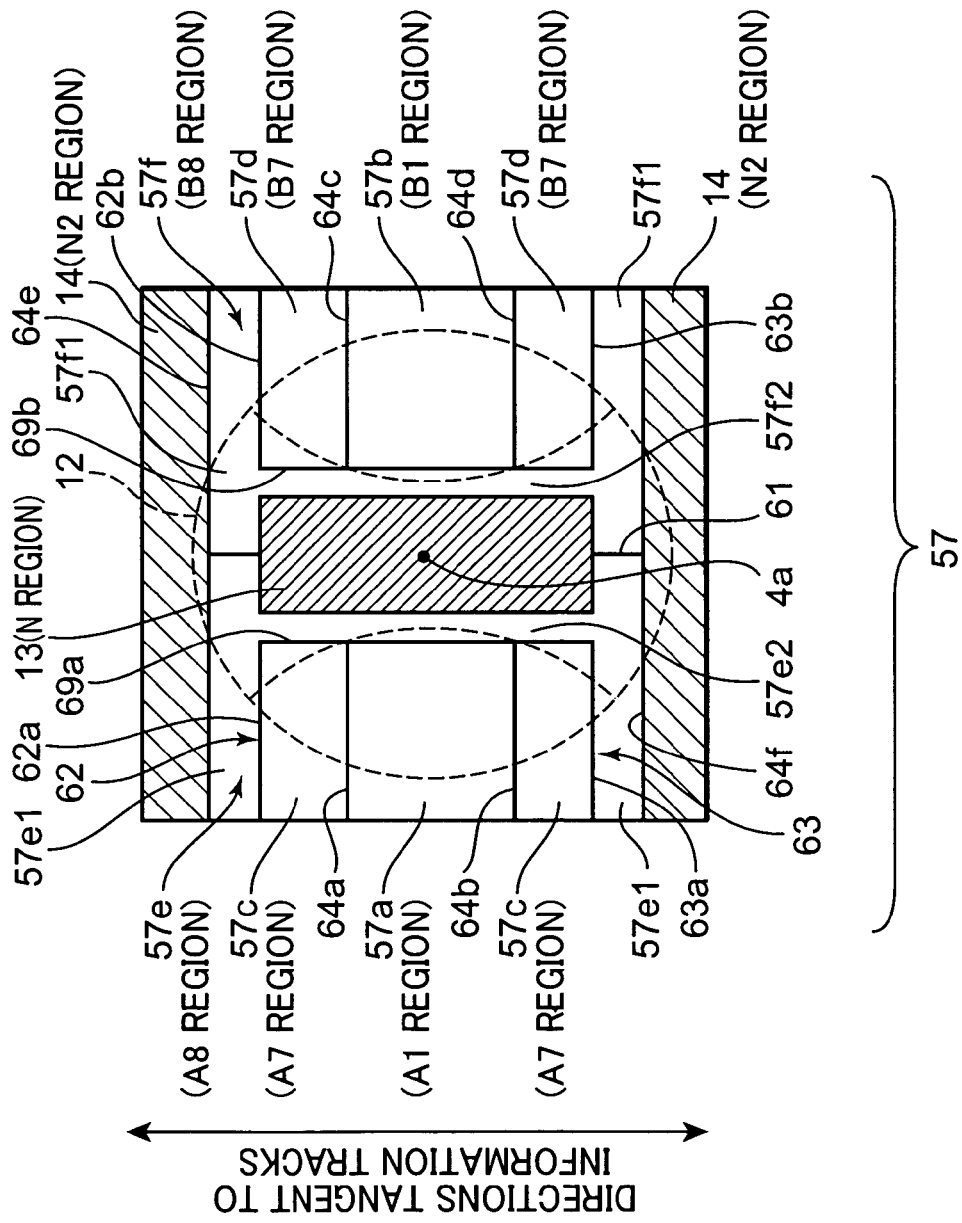
FIG. 12 is a diagram, corresponding to FIG. 2, showing a light sensing area of a light sensing element provided in an optical head according to a sixth embodiment of the invention.

FIG. 12 shows a light sensing area of a light sensing element 57 applied to an optical head according to a sixth embodiment of the present invention. Here, elements common to the first embodiment are not described by being identified by the same reference numerals.

The light sensing area is comprised of a region 57a as an A1 region, a region 57b as a B1 region, regions 57c as A7 regions, regions 57d as B7 regions, a region 57e as an A8 region, a region 57f as a B8 region, a region 13 as an N region and regions 14 as N2 regions.

In the light sensing area, a pair of first horizontal dividing lines 62a, 62b are symmetrically arranged with respect to the vertical dividing line 61 and a pair of second horizontal dividing lines 63a, 63b are also symmetrically arranged with respect to the vertical dividing line 61. Any of these horizontal dividing lines 62a, 62b, 63a, 63b is a straight line extending in a direction normal to the vertical dividing line 61. The pair of first horizontal dividing lines 62a, 62b and the pair of second horizontal dividing lines 63a, 63b are symmetrically arranged with respect to the optical axis 4a.

At a side of the first horizontal dividing lines 62a, 62b opposite from the optical axis 4a is provided a seventh horizontal dividing line 64e parallel to the first horizontal dividing lines 62a, 62b. At a side of the second horizontal dividing lines 63a, 63b opposite from the optical axis 4a is provided an eighth horizontal dividing line 64f parallel to the second horizontal dividing lines 63a, 63b. The seventh and eighth horizontal dividing lines 64e, 64f are symmetrically arranged with respect to the optical axis 4a. Areas at sides of the seventh and eighth horizontal dividing lines 64e, 64f opposite from the optical axis 4a are defined as the regions 14.

In an area at the left side of the vertical dividing line 61 in FIG. 12, a third horizontal dividing line 64a and a fourth horizontal dividing line 64b, which are both straight lines and parallel to and at a specified distance to each other, are arranged in a region between the first and second horizontal dividing lines 62a, 63a. Further, a straight first inner line 69a parallel to the vertical dividing line 61 is so arranged as to connect the inner ends of the first, third, fourth and second horizontal dividing lines 62a, 64a, 64b and 63a.

In this left region, a rectangular area defined by the first horizontal dividing line 62a, the first inner line 69a and the second horizontal dividing line 63a is divided into the region 57a between the third and fourth horizontal dividing lines 64a and 64b and the areas 57c at the opposite sides of the region 57a. An area of this left area excluding the regions 57a, 57c, 13 and 14 is defined as the region 57e.

In an area at the right side of the vertical dividing line 61 in FIG. 12, a fifth horizontal dividing line 64c and a sixth horizontal dividing line 64d, which are both straight lines and parallel to and at a specified distance to each other, are arranged in a region between the first and second horizontal dividing lines 62b, 63b. Further, a straight second inner line 69b parallel to the vertical dividing line 61 is so arranged as to connect the inner ends of the first, fifth, sixth and second horizontal dividing lines 62b, 64c, 64d and 63b.

In this right area, a rectangular area defined by the first horizontal dividing line 62b, the second inner line 69b and the second horizontal dividing line 63b is divided into the region 57b between the fifth and sixth horizontal dividing lines 64c and 64d and the areas 57d at the opposite sides of the region 57b. An area of this right area excluding the regions 57b, 57d, 13 and 14 is defined as the region 57f.

The region 57e is comprised of regions 57e1 as A81 regions and a region 57e2 as an A82 region. There are two regions 57e1 spaced apart in the direction tangent to the information tracks, and the regions 57a, 57c and 13 are arranged between these two regions 57e1. The region 57e2 is located between the first inner line 69a and the region 13, and is so defined as to connect the two regions 57e1 between the region 13 and the regions 57a, 57c. In other words, the regions 57a, 57c are distanced from the region 13.

The regions 57a, 57b are symmetrically arranged with respect to the vertical dividing line 61, and the regions 57c, 57d are also symmetrically arranged with respect to the vertical dividing line 61.

The region 57f is comprised of regions 57f1 as B81 regions and a region 57f2 as a B82 region. There are two regions 57f1 spaced apart in the direction tangent to the information tracks, and the regions 57b, 57d and 13 are arranged between these two regions 57f1. The region 57f2 is located between the second inner line 69b and the region 13, and is so defined as to connect the two regions 57f1 between the region 13 and the regions 57b, 57d. In other words, the regions 57b, 57d are distanced from the region 13.

The regions 57e2, 57f2 span over an section for sensing only the $0^{th}$-order light of the diffracted light and sections where the $0^{th}$-order light and the $\pm 1^{st}$-order lights overlap. The region 13 is arranged in a section containing only or mainly the $0^{th}$-order components of the diffracted light present in the middle part of the luminous flux 12.

Signals detected by the light sensing element 47 are introduced to the signal detector, where three push-pull signals P1, P2, P3 are detected.

The signal P1 is a push-pull signal detected in the regions 57a, 57b; the signal P2 is the one detected in the regions 57c, 57d; and the signal P3 is the one detected in the regions 57e, 57f. These signals P1, P2, P3 can be expressed as follows using electrical signals S57a to S57f outputted from the respective regions 57a to 57f:

$$P1 = S57a - S57b$$

$$P2 = S57c - S57d$$

$$P3 = S57e - S57f.$$

A tilt signal TL can be obtained by a calculation of:

$$TL = P1 - k1 * P2.$$

Instead of this calculation, the tilt signal TL may be obtained by a calculation of:

$$TL = P1 - k1 * P2 - k2 * P3.$$

In this construction, factors k1, k2 are set as follows. First, the factor k1 may be so set as to minimize an AC amplitude of P1−k1*P2 when the objective lens is moved and then the factor k2 may be so set as to let a variation of the offset of the tilt signal TL stay within a specified range.

Here, a simulation result of the detection error of the tilt of the optical disk caused by the defocusing is described for the light sensing element 57 of the sixth embodiment. It should be noted that the tilt signal TL is derived using the above operational equation: TL=P1−k1*P2 in this simulation.

In this simulation, calculations were made using five items as calculation conditions set as shown in TABLE 3. These items include:

1) Horizontal dimension of the region 13 (N region)
2) Vertical dimension of the region 13 (N region) (=Sum of the vertical dimensions of the region 57*a* (A1 region) and the regions 57*c* (A7 regions))
3) Distance between the region 57*a* (A1 region) and the region 57*b* (B1 region)
4) Vertical dimension of the region 57*a* (A1 region) (=Vertical dimension of the region 57*b* (B1 region))
5) Distance between the regions 14 (N2 regions) (=sum of the vertical dimensions of the region 57*a* (A1 region), the regions 57*c* (A7 regions) and the regions 57*e* (A8 regions).

Numerical values in TABLE 3 are ratios to the diameter of the luminous flux 12 to be sensed.

TABLE 3

| ITEM | EX. 1 | EX. 2 | EX. 3 | EX. 4 | EX. 5 | EX. 6 |
|---|---|---|---|---|---|---|
| 1) | 0.35 | 0.30 | 0.35 | 0.35 | 0.35 | 0.35 |
| 2) | 0.60 | 0.60 | 0.60 | 0.60 | 0.60 | 0.54 |
| 3) | 0.38 | 0.38 | 0.42 | 0.38 | 0.38 | 0.38 |
| 4) | 0.30 | 0.30 | 0.30 | 0.30 | 0.38 | 0.30 |
| 5) | 0.85 | 0.85 | 0.85 | 0.92 | 0.85 | 0.85 |
| DETECTION ERROR | 0.089 | 0.102 | 0.111 | 0.083 | 0.100 | 0.078 |
| TE BALANCE | 0.0138 | 0.0328 | 0.0485 | 0.0248 | 0.0138 | 0.0174 |

Any one of the items differs in Example 2 to Example 6, and Example 1 has no item different from those of the other Examples. Specifically, the item 1) differs in Example 2; the item 3) differs in Example 3; the item 5) differs in Example 4; the item 4) differs in Example 5; and the item 2) differs in Example 6.

As can be understood from this simulation result, the detection error of the light sensing element 57 of this embodiment is, in any of these Examples, held down to 0.078 to 0.111 deg (p-p) which is about half of 0.17 deg (p-p) as the detection error of the prior art. This result is fairly good.

Accordingly, the following can be derived:

1) The ratio of the horizontal dimension of the region 13 to the diameter of the luminous flux is preferably 0.30 or larger and 0.4 or smaller, more preferably 0.30 or larger and 0.35 or smaller;

2) The ratio of the vertical dimension of the region 13 to the diameter of the luminous flux is preferably 0.54 or larger and 0.65 or smaller, more preferably 0.55 or larger and 0.60 or smaller;

3) The ratio of the distance between the regions 57*a*, 57*b* to the diameter of the luminous flux is preferably 0.35 or larger and 0.45 or smaller, more preferably 0.38 or larger and 0.42 or smaller;

4) The ratio of the vertical dimension of the regions 57*a*, 57*b* to the diameter of the luminous flux is preferably 0.25 or larger and 0.38 or smaller, and more preferably 0.30 or larger and 0.35 or smaller; and 5) The ratio of the distance between the regions 14 to the diameter of the luminous flux is preferably 0.8 or larger and 0.92 or smaller, and more preferably 0.85 or larger and 0.90 or smaller.

If the above values lie within these numerical ranges, the tilt of the optical disk is more unlikely to be influenced by both the defocusing and the displacement of the objective lens even at the boundaries between the tracks having information recorded thereon and those having no information recorded thereon.

The other construction, functions and effects are similar to those of the fourth embodiment.

Seventh Embodiment

Figure 13:
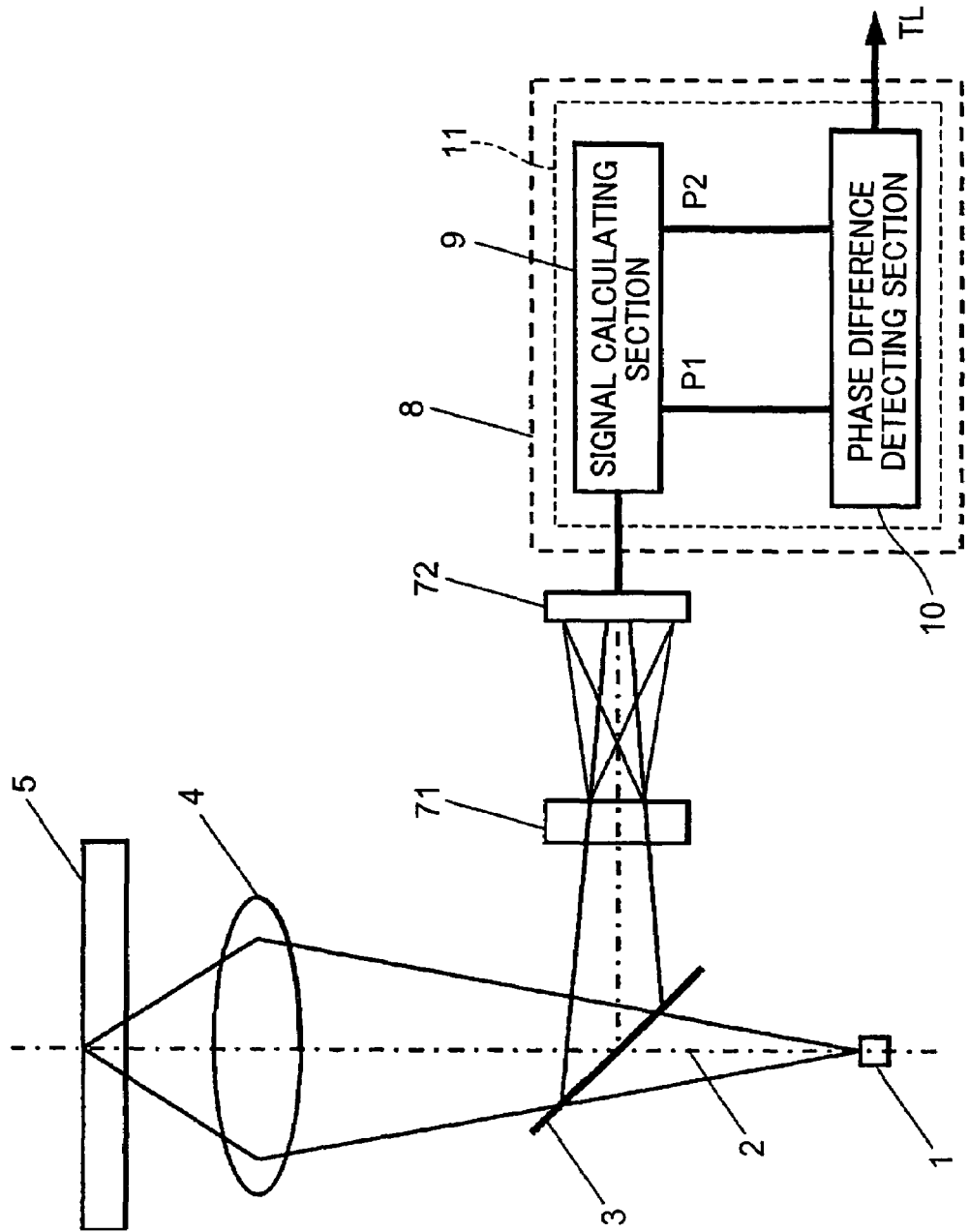
FIG. 13 is a schematic diagram of an optical head according to a seventh embodiment of the invention.

FIG. 13 schematically shows the construction of an optical head according to a seventh embodiment of the present invention. Here, elements common to the first embodiment are not described by being identified by the same reference numerals.

The seventh embodiment differs from any of the aforementioned embodiments, and a photodetector as one example of a light sensing device includes a light splitting element and a light sensing element. Specifically, a diffracting element 71 as one example of the light splitting element for splitting a luminous flux into a plurality of luminous fluxes is provided in a light path of the luminous flux reflected by an optical disk 5. A light sensing element 72 has a light sensing area for sensing a plurality of luminous fluxes split by the diffracting element 71. The diffracting element 71 is arranged between a beam splitter 3 and the light sensing element 72 in the light path, and is constructed, for example, by a hologram element.

Figure 14:
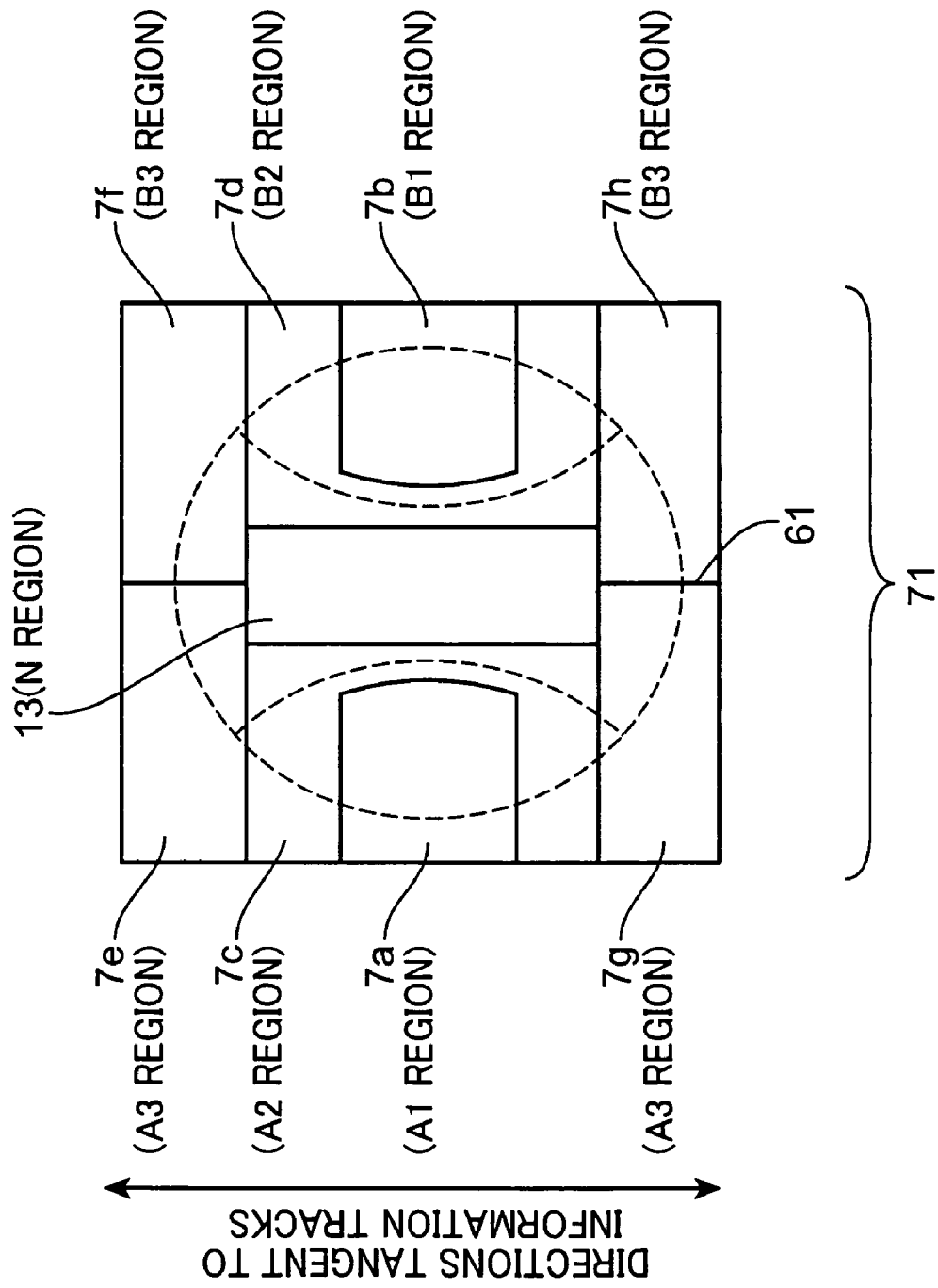
FIG. 14 is a diagram showing a light sensing area of a diffracting element provided in the optical head according to the seventh embodiment.

As shown in FIG. 14, a luminous flux incident area of the diffracting element 71 is divided into a plurality of regions similar to the light sensing element 7 of the first embodiment. These regions are identified by the same reference numerals as those in FIG. 2 for the sake of convenience and are not described in detail. The diffracting element 7 splits the incident luminous flux into a $0^{th}$-order light and $\pm 1^{st}$-order lights diffracted by the respective regions 7*a* to 7*h*, 13.

The luminous flux is split into the $0^{th}$-order light and the $\pm 1^{st}$-order lights by being diffracted in the respective regions 7*a* to 7*h*, 13. Since the respective regions have different patterns of diffraction, the diffracted lights therefrom propagate in different directions to be sensed in the respective light sensing areas of the light sensing element 72.

Figure 15:
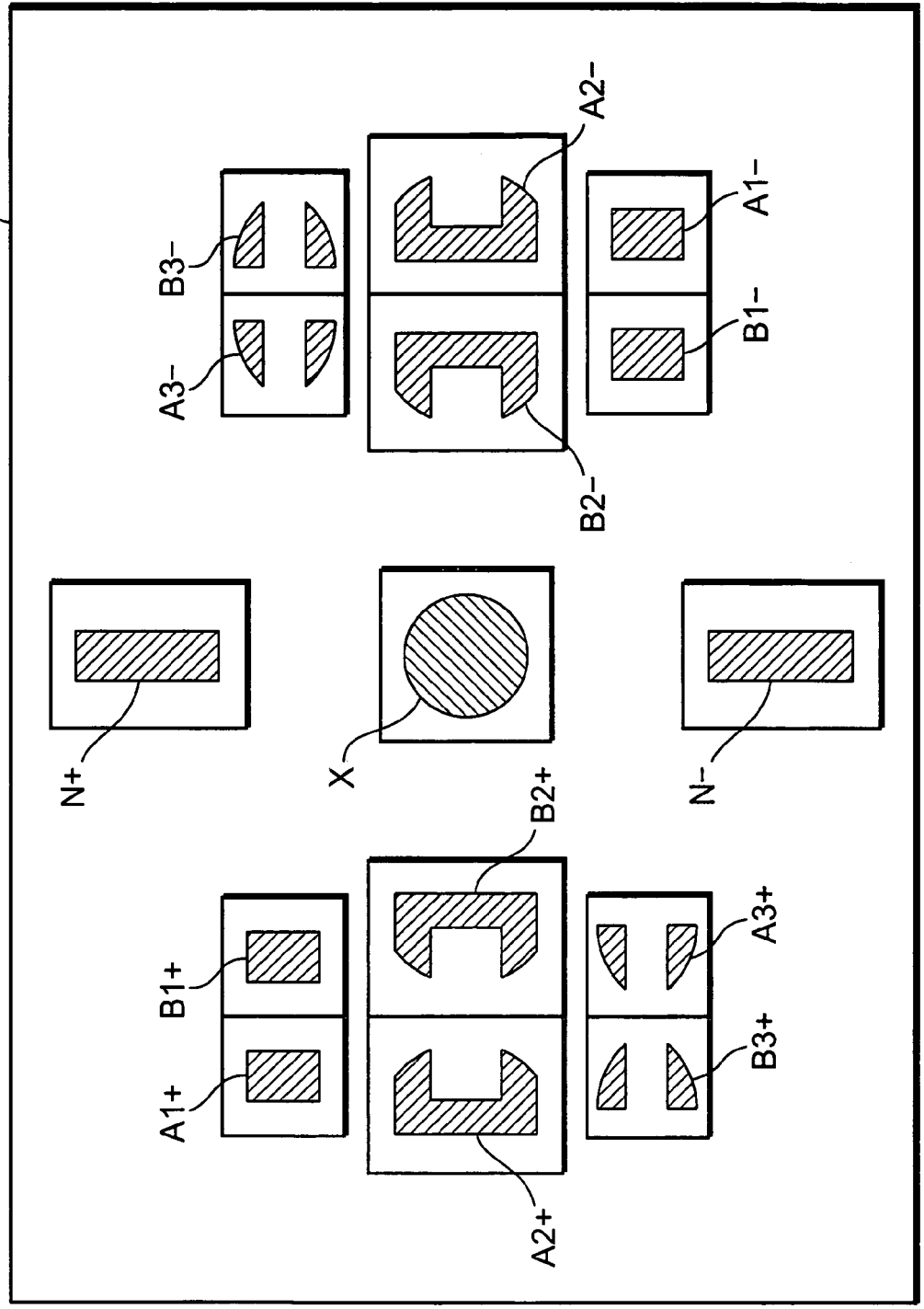
FIG. 15 is a diagram showing a light sensing area of a light sensing element provided in an optical head according to the seventh embodiment of the invention.

As shown in FIG. 15, the light sensing element 72 has fifteen light sensing regions for sensing the luminous fluxes split by the diffracting element 71. Specifically, since the diffracting element 71 is divided into seven regions, the fifteen light sensing regions are provided in order to be able to sense the $0^{th}$-order light and the $\pm 1^{st}$-order lights diffracted in the respective seven regions. Since the split luminous fluxes are sensed by the light sensing element 72 in this embodiment, the respective light sensing regions are separated from each other without being divided by the dividing lines.

In FIG. 15, a region X is for sensing the $0^{th}$-order light. For example, a focusing detection and an information signal detection can be made using a signal detected in the region X. Regions A1+ to A3+ are for sensing the $+1^{st}$-order lights diffracted in the A1 region to A3 region of the diffracting element 71; and regions B1+ to B3+ are for detecting the $+1^{st}$-order lights diffracted in the B1 region to B3 region of the diffracting element 71. Further, regions A1 − to B3 + are for detecting $-1^{st}$-order lights diffracted in the A1 region to B3 region of the diffracting element 71. Regions N+, N− are for sending the $+1^{st}$-order light and $-1^{st}$-order light detected in the N region, respectively.

A tilt detector 8 detects the tilt of the optical disk 5 in accordance with a first difference signal, which is a difference signal between a signal obtained from the luminous flux detected by the light sensing element 72 after being diffracted in the region 7*a* of the diffracting element 71 and a signal obtained from the luminous flux detected by the light sensing element 72 after being diffracted in the region 7*b* of the diffracting element 71, and a second difference signal, which is a difference signal between a signal obtained from the luminous flux detected by the light sensing element 72 after being diffracted in the region 7*c* of the diffracting element 71 and a signal obtained from the luminous flux detected by the light sensing element 72 after being diffracted in the region 7*d* of the diffracting element 71. Since the calculation of this tilt detection is similar to that of the foregoing embodiments, no detailed description is given here.

In this construction, the region 13 (N region) is defined as one region on the diffracting element 71. The luminous flux diffracted in this region 13 may not be detected on the light sensing element or may not be used to detect the tilt of the optical disk even if being detected. With such an arrangement, the same performances as those of the optical heads of the foregoing embodiments can be realized.

Figure 16:
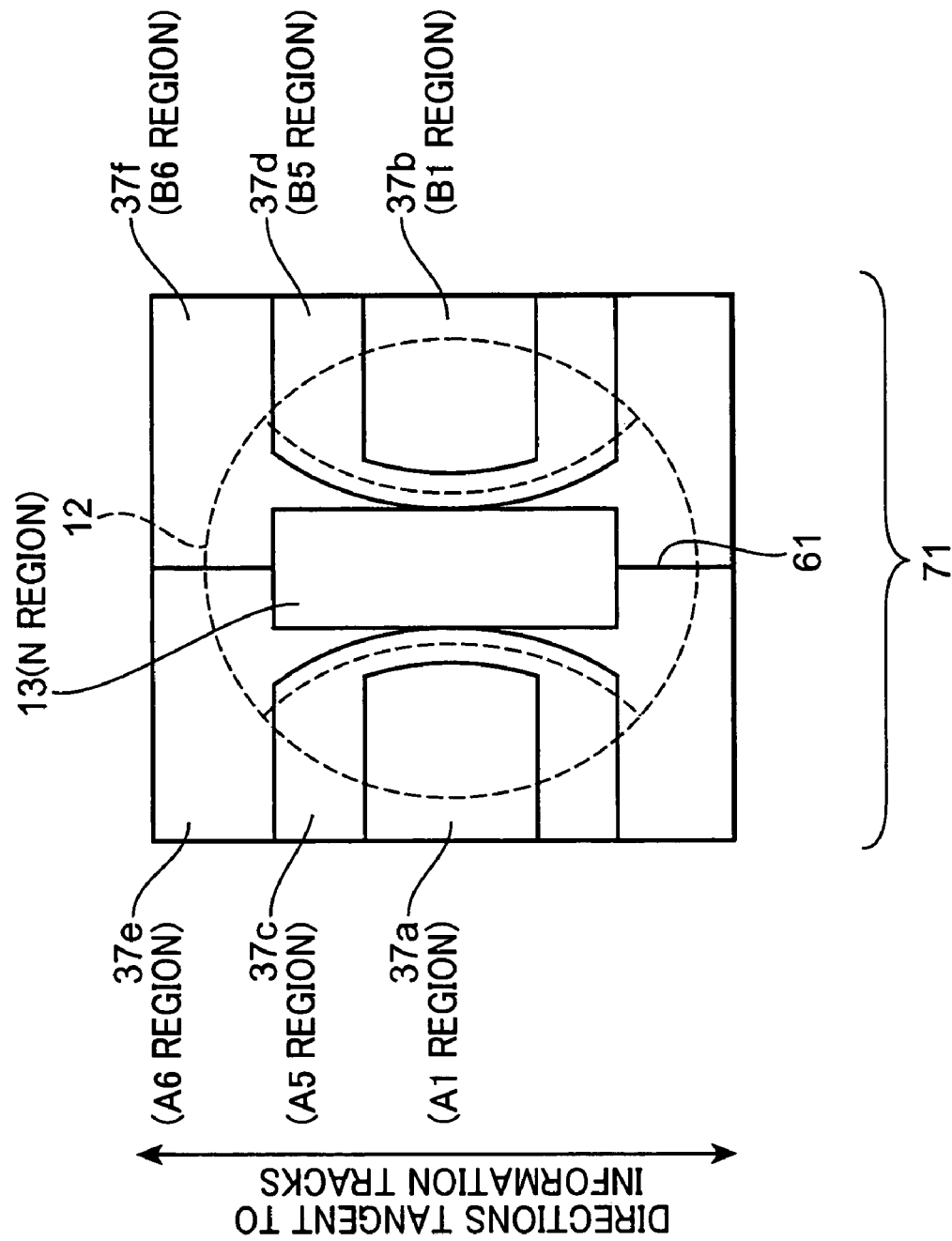
FIG. 16 is a diagram showing a light sensing area of a diffracting element provided in an optical head according to another embodiment of the invention.
Figure 17:
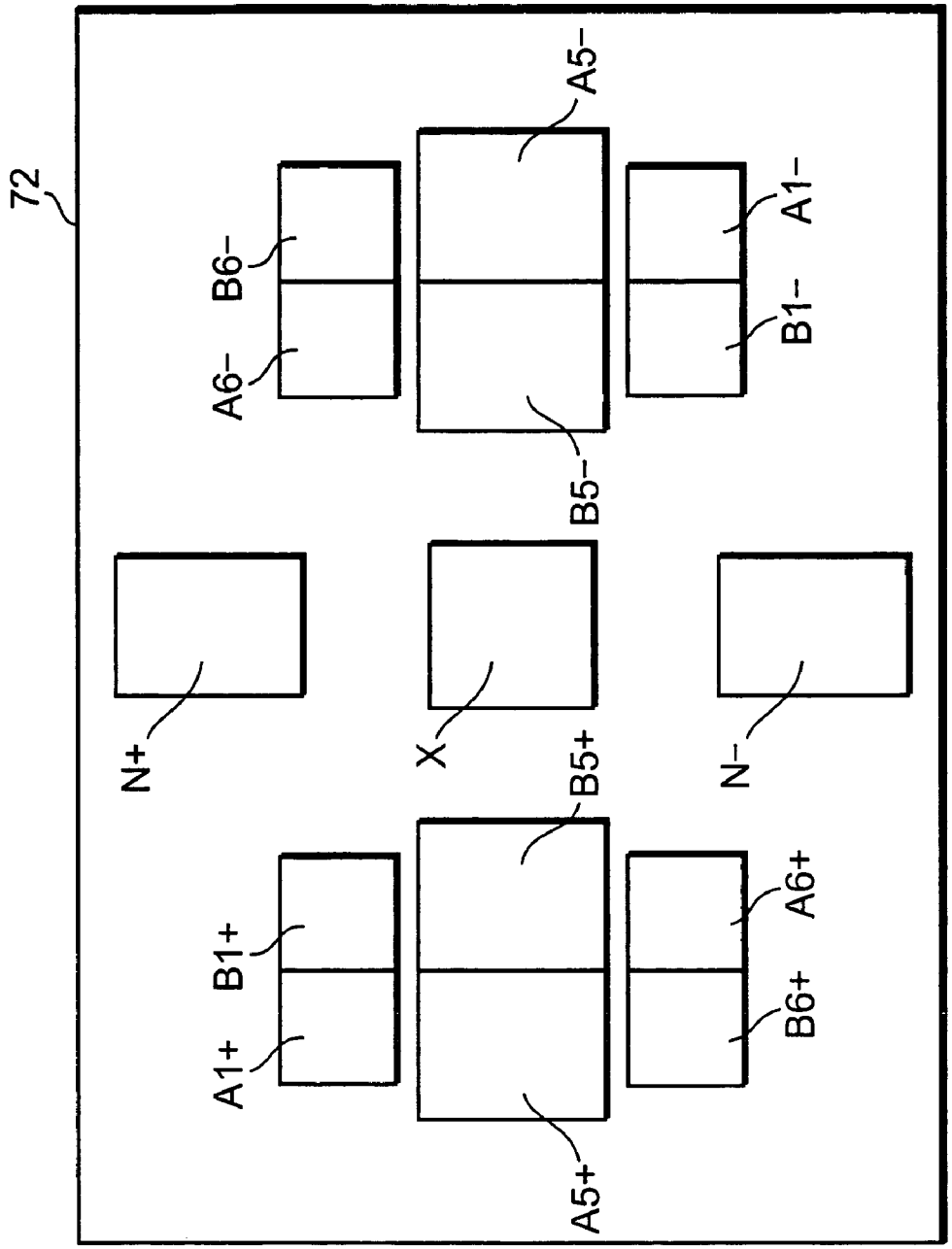
FIG. 17 is a diagram showing a light sensing area of a light sensing element provided in an optical head according to still another embodiment of the invention.
Figure 18:
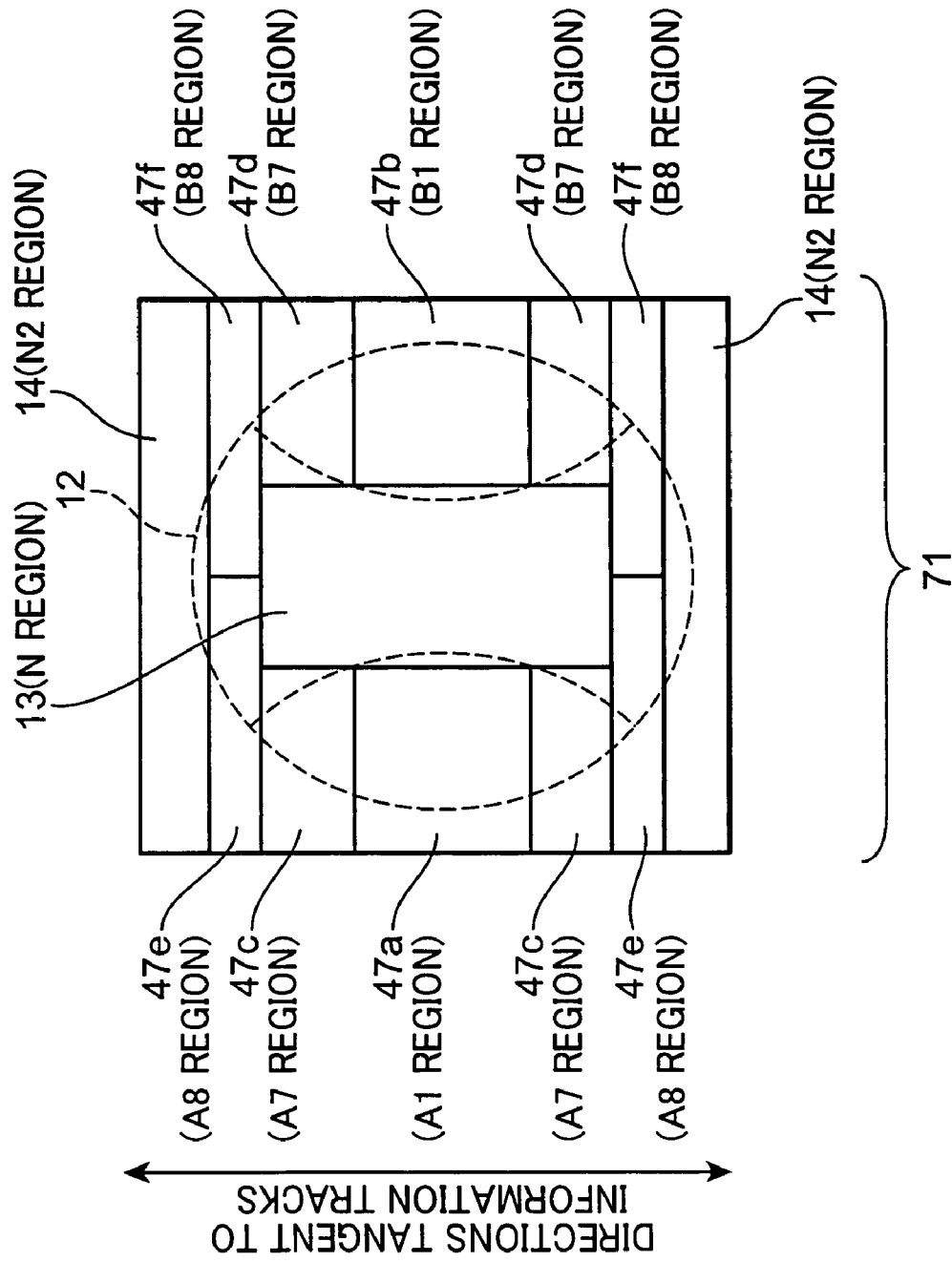
FIG. 18 is a diagram showing a light sensing area of a diffracting element provided in an optical head according to further another embodiment of the invention.
Figure 19:
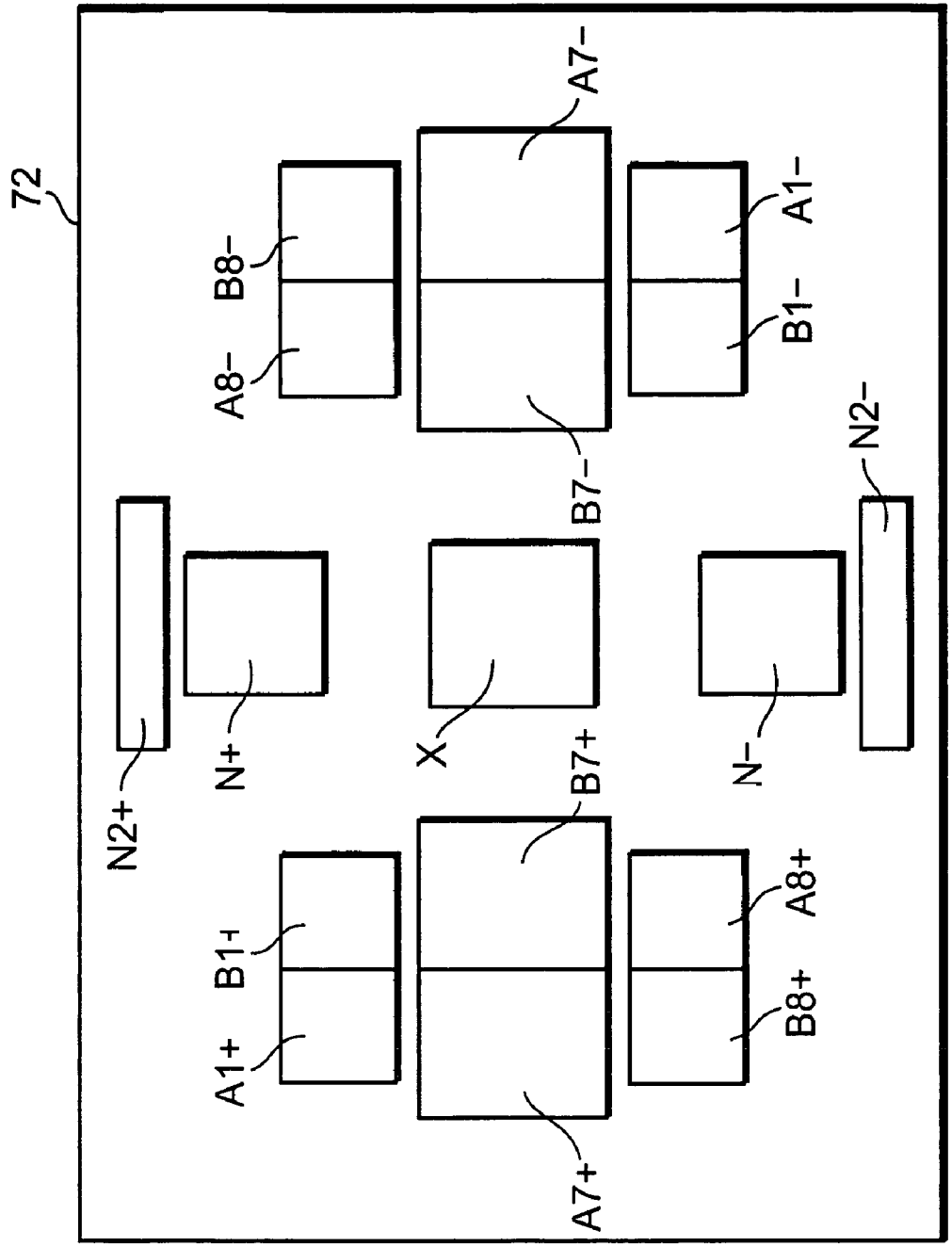
FIG. 19 is a diagram showing a light sensing area of a light sensing element provided in an optical head according to still further another embodiment of the invention.
Figure 20:
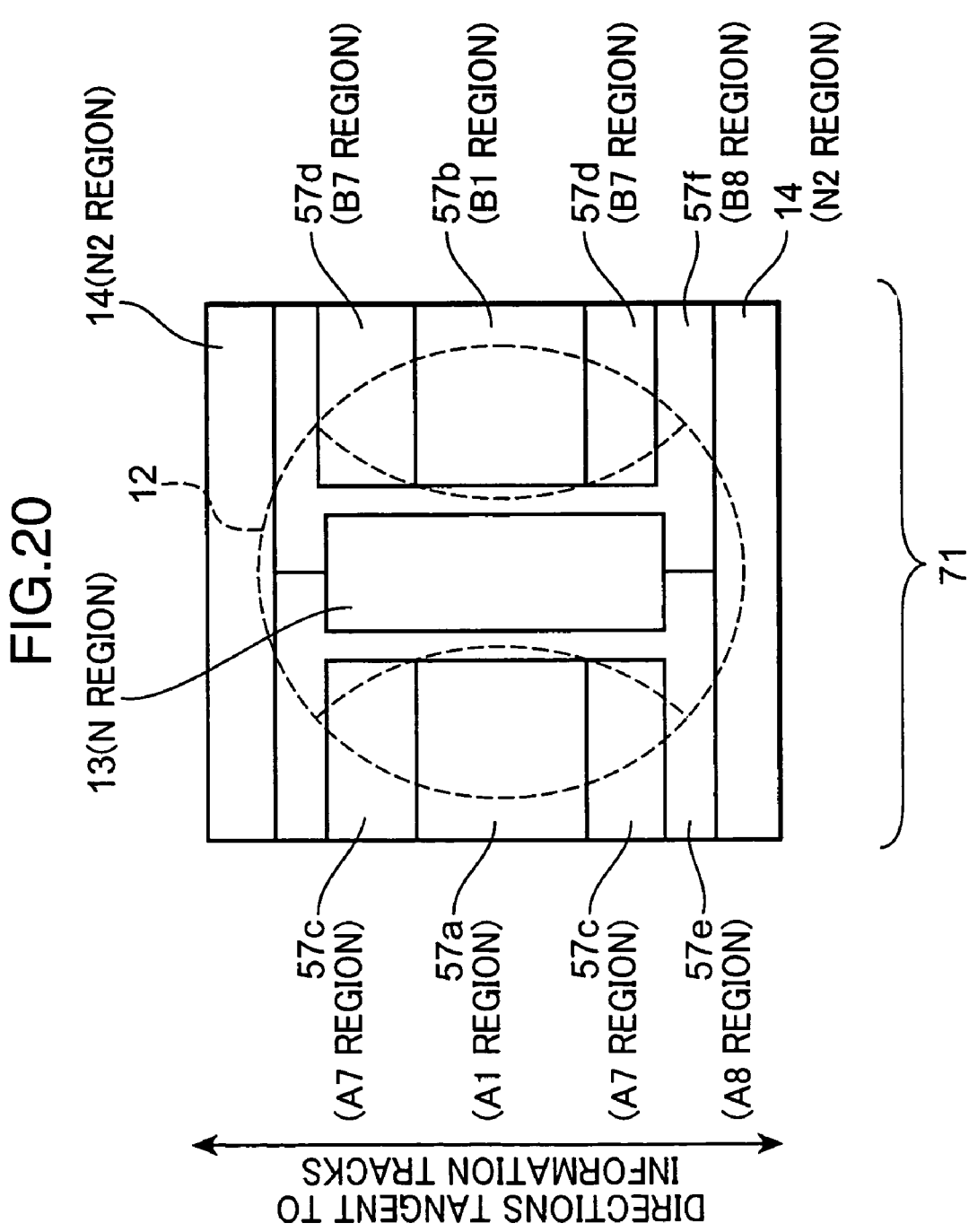
FIG. 20 is a diagram showing a light sensing area of a diffracting element provided in an optical head according to further another embodiment of the invention.

In the case that the light sensing device includes the light splitting element and the light sensing element, the diffracting element 71 as one example of the light splitting element may be divided in a manner similar to the fourth embodiment as shown in FIG. 16. In this case, the light sensing area of the light sensing element 72 may be defined as shown in FIG. 17. The diffracting element 71 as one example of the light splitting element may be divided in a manner similar to the fifth embodiment as shown in FIG. 18. In this case, the light sensing area of the light sensing element 72 may be defined as shown in FIG. 19. In this light sensing element 72, the region N+ senses the respective +$1^{st}$-order lights from the regions 13, 14, and the region N− senses the respective −$1^{st}$-order lights from the regions 13, 14. Further, the diffracting element 71 as one example of the light splitting element may be divided in a manner similar to the sixth embodiment as shown in FIG. 20. In this case as well, the light sensing element 72 is similar to the one shown in FIG. 19.

Eighth Embodiment

Figure 21:
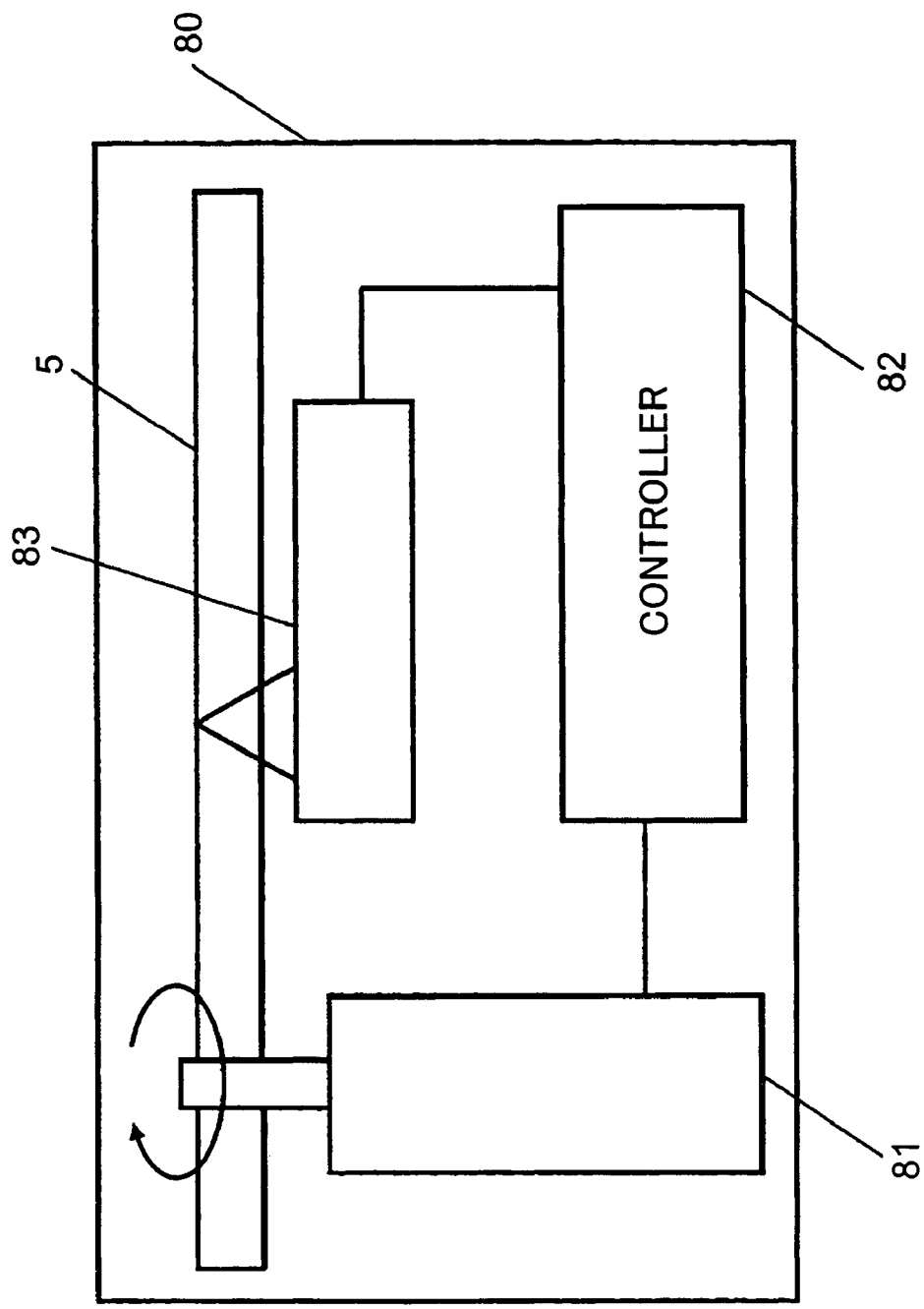
FIG. 21 is a diagram schematically showing an optical disk device according to an eighth embodiment of the invention.
Figure 22:
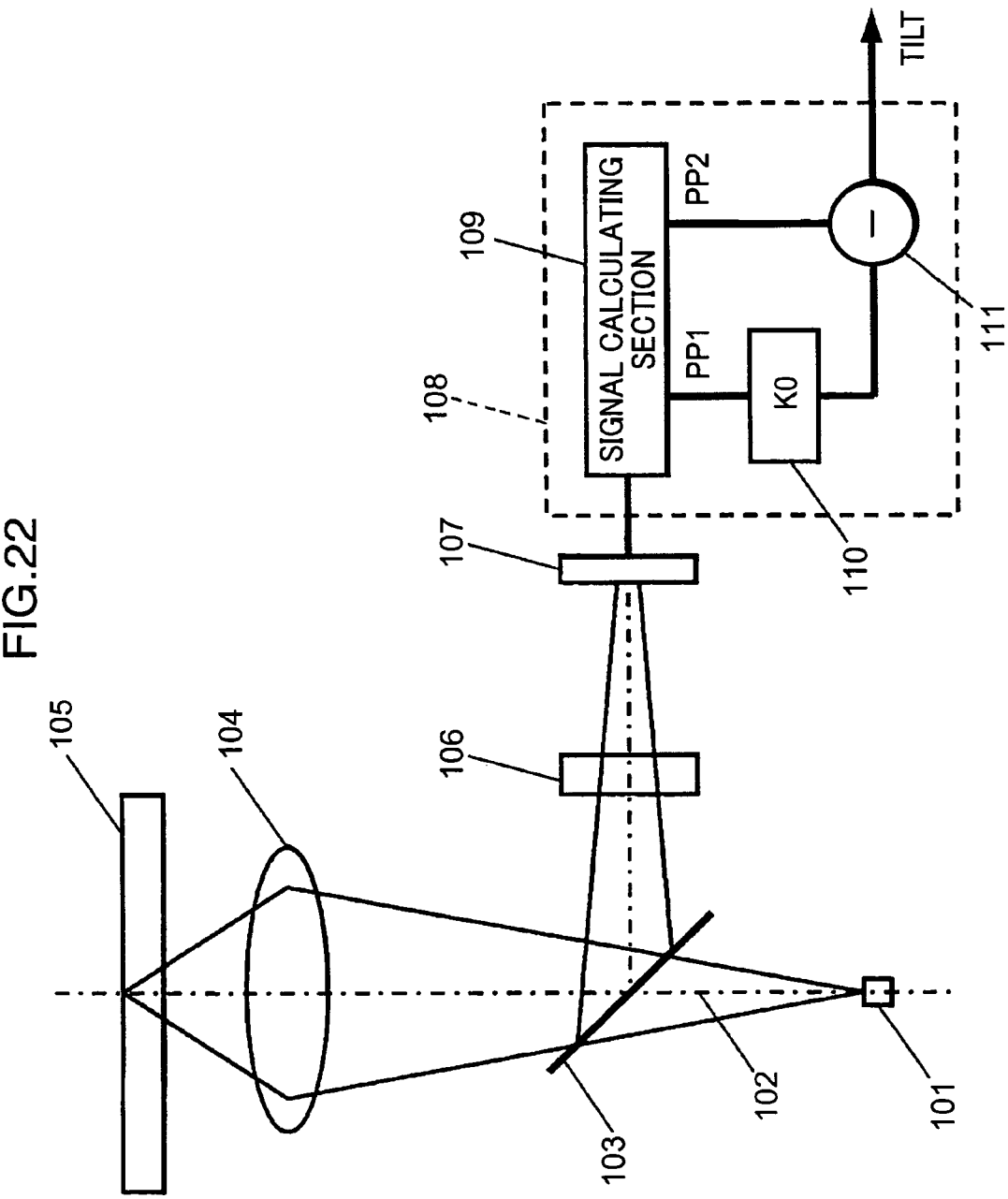
FIG. 22 is a diagram schematically showing a conventional optical head.
Figure 23:
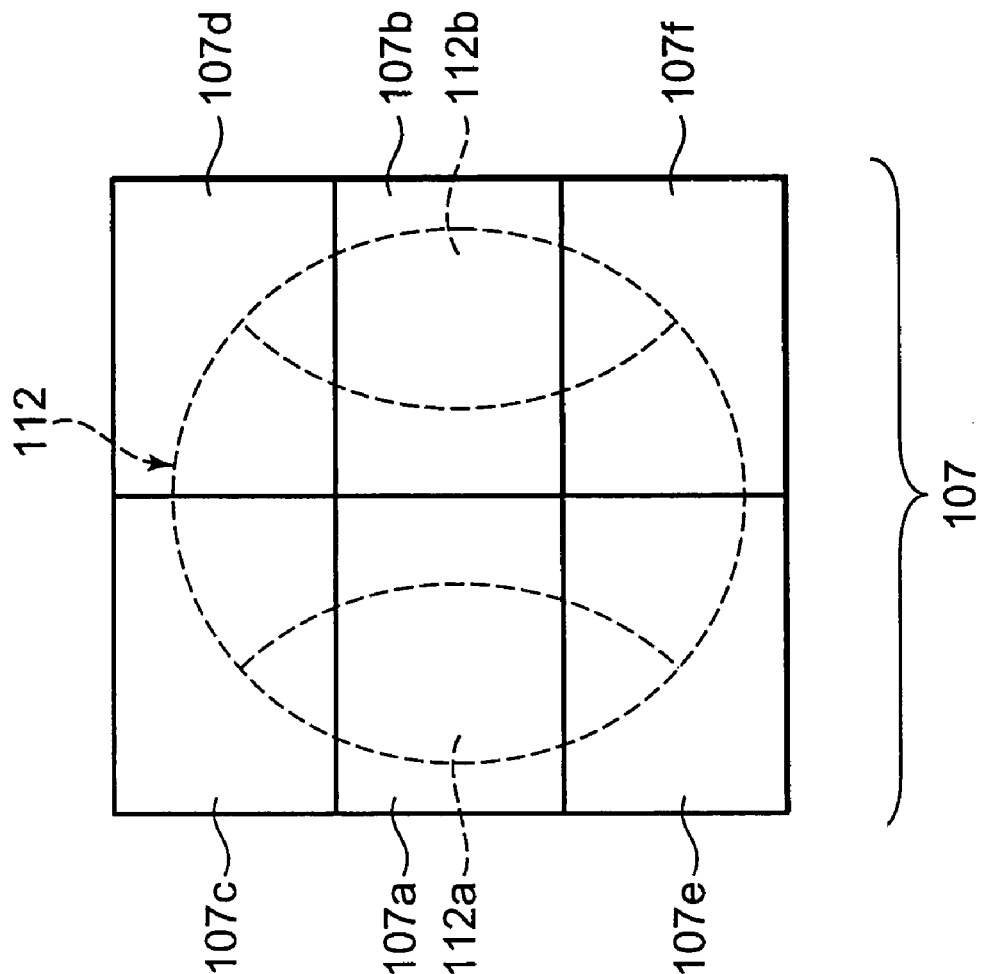
FIG. 23 is a diagram schematically showing a light sensing area of a light sensing means provided in the conventional optical head.
Figure 24:
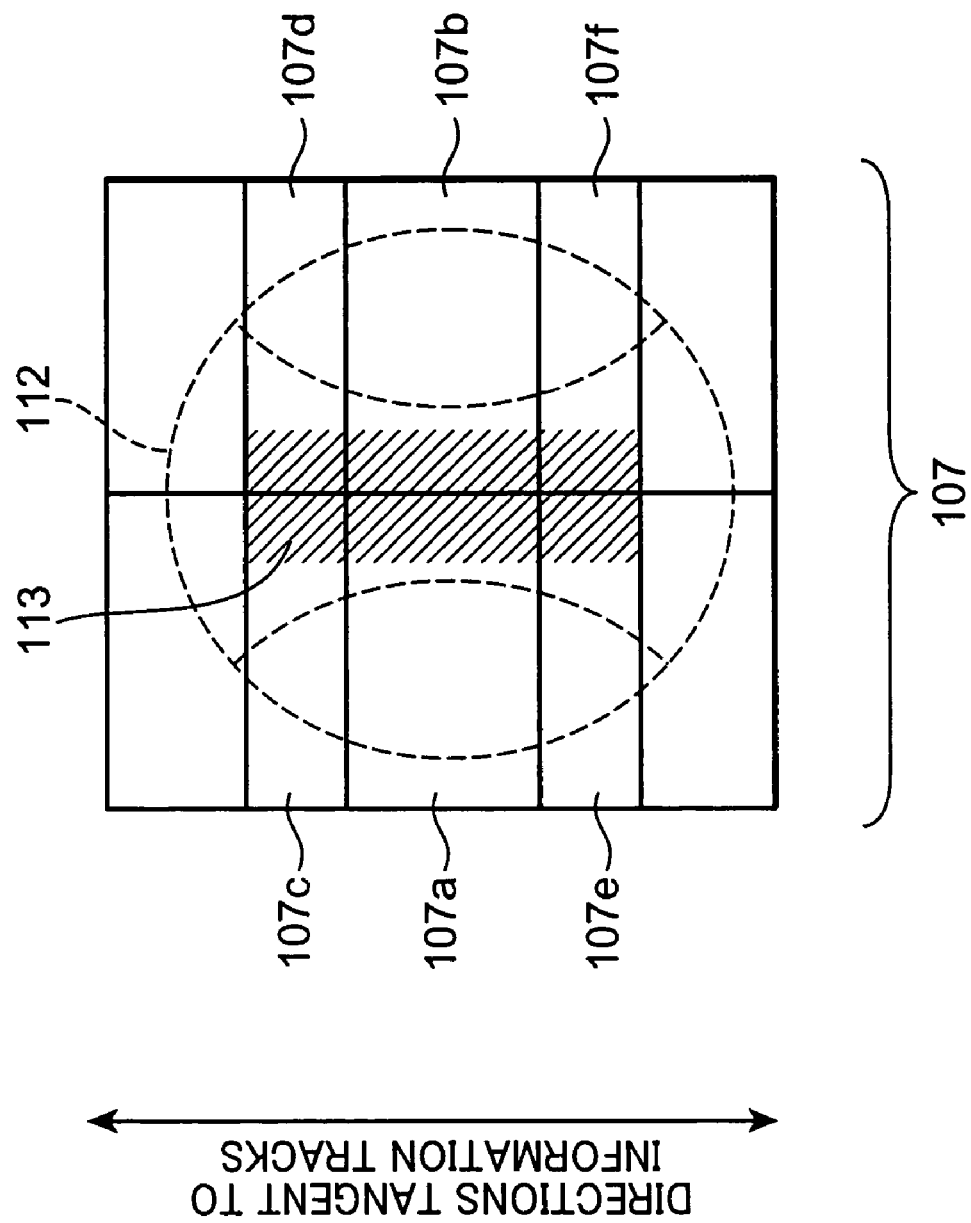
FIG. 24 is a diagram showing another light sensing means of the prior art optical head.

FIG. 21 is a schematic diagram of an optical disk device according to one embodiment of the present invention. In FIG. 21, the optical disk device has a casing 80, and an optical disk driver 81, a controller 82 and an optical head 83 are provided in this casing 80. The optical disk driver 81 has a function of driving the optical disk 5. The optical head 83 is, for example, the optical head according to the first embodiment. Instead, the optical head 83 may be any one of the optical heads according to the second to seventh embodiments. The controller 82 has a function of controllably driving the optical disk driver 81 and the optical head 83, a function of processing control signals and information signals sensed by the optical head 83, and a function of interfacing the information signals between the outside and inside of the casing 80.

Since the optical head 83 is any one of the optical heads according to the first to seventh embodiments, the tilt of this optical disk can be detected with high precision while being little influenced by both the defocusing and the displacement of the objective lens.

INDUSTRIAL APPLICABILITY

The inventive optical head can detect the tilt of the optical disk with high precision. Accordingly, the present invention can be applied to an optical head for recording or reproducing information in or from an optical disk of the phase changing type or the like. The present invention is also useful for an optical disk driver having a mechanism for adjusting the tilt of the optical disk, and to an optical head having a function of correcting a coma aberration caused by the tilt of the optical disk by tilting the objective lens.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

This application is based on Japanese patent application serial No. 2004-251556, filed in Japan Patent Office on Aug. 31, 2004, the contents of which are hereby incorporated by reference.

What is claimed is:

1. An optical head, comprising a light source, an objective lens for concentrating a laser beam emitted from the light source onto information tracks of an optical disk, and a light sensing device for sensing a luminous flux reflected by information tracks, wherein:

the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a first and a second partition lines symmetrically arranged between the two horizontal dividing lines with respect to the vertical dividing line while being distanced from the vertical dividing line and the two horizontal dividing lines, each of the first and second partition lines includes a pair of horizontal lines parallel with the two horizontal dividing lines, and an inner line connecting ends of the horizontal lines toward the vertical dividing line, the luminous flux incident area further includes an N region crossing over the vertical dividing line between the two horizontal dividing lines, one region partitioned between the two horizontal dividing lines by the vertical dividing line being divided into an A2 region at a side toward the optical axis and a remaining A1 region by the first partition line, and the other region partitioned between the two horizontal dividing lines by the vertical dividing line being divided into a B2 region at a side toward the optical axis and a remaining B1 region by the second partition line, the A1 region and the B1 region are symmetrically arranged with respect to the vertical dividing line, the A2 region and the B2 region are symmetrically arranged with respect to the vertical dividing line, and the optical head further comprises a tilt detector for detecting a relative tilt of the objective lens and the optical disk in accordance with a luminous energy incident on the luminous flux incident area of the light sensing device.

2. An optical head according to claim 1, wherein the A1 region and the B1 regions are for mainly detecting a luminous energy in middle parts of sections where a $0^{th}$-order light and ±$1^{st}$-order lights of the luminous flux overlap.

3. An optical head according to claim 2, wherein the A2 region and the B2 region are for mainly detecting a luminous energy in parts, excluding the middle parts, of the sections where the $0^{th}$-order light and the ±$1^{st}$-order lights of the luminous flux overlap.

4. An optical head according to claim 1, wherein the inner lines of the first and second partition lines are arcuate, and a ratio of the radius of curvature of the inner lines to the radius of the luminous flux is 0.5 or larger and 1.2 or smaller.

5. An optical head according to claim 1, wherein:
the light sensing device includes a light sensing element, on which the luminous flux incident area is provided, and the tilt detector detects the tilt in accordance with a first difference signal, which is a difference signal between a signal obtained from the A1 region of the light sensing element and a signal obtained from the B1 region of the light sensing element, and a second difference signal, which is a difference signal between a signal obtained from the A2 region of the light sensing element and a signal obtained from the B2 region of the light sensing element.

6. An optical head according to claim 1, wherein:
the light sensing device includes a light splitting element for slitting the luminous flux reflected by the information tracks into a plurality of luminous fluxes, and a light sensing element for separately sensing the respective luminous fluxes split by the light splitting element,
the luminous flux incident area is provided on the light splitting element, and
the tilt detector detects the tilt in accordance with a first difference signal, which is a difference signal between a signal obtained from the luminous flux diffracted in the A1 region of the light splitting element and detected by the light sensing element and a signal obtained from the luminous flux diffracted in the B1 region of the light splitting element and detected by the light sensing element, and a second difference signal, which is a difference signal between a signal obtained from the luminous flux diffracted in the A2 region of the light splitting element and detected by the light sensing element and a signal obtained from the luminous flux diffracted in the B2 region of the light splitting element and detected by the light sensing element.

7. An optical head according to claim 1, wherein:
the luminous flux incident area further includes an A3 region and a B3 region symmetrically arranged with respect to the vertical dividing line,
the A3 region is defined as a region excluding the N region, the A1 region and the A2 region from an area at a side of the vertical dividing line toward the A1 region,
the B3 region is defined as a region excluding the N region, the B1 region and the B2 region from an area at a side of the vertical dividing line toward the B1 region,
a difference signal between a signal obtained from the A3 region and a signal obtained from the B3 region serves as a third difference signal, and
the optical head further comprises a tracking error signal generator for generating a tracking error signal in accordance with a sum signal of the first and second difference signal and the third difference signal.

8. An optical head, comprising a light source, an objective lens for concentrating a laser beam emitted from the light source onto information tracks of an optical disk, and a light sensing device for sensing a luminous flux reflected by information tracks, wherein:
the light sensing device includes a luminous flux incident area divided into a plurality of regions by a straight vertical dividing line passing an optical axis of the objective lens and parallel with a direction tangent to the information tracks, a first and a second partition lines symmetrically arranged with respect to the vertical dividing line while being distanced from the vertical dividing line, a third partition line arranged between the vertical dividing line and the first partition line, a fourth partition line symmetrically arranged with the third partition line with respect to the optical axis between the vertical dividing line and the second partition line,
each of the first and second partition lines includes a pair of horizontal lines normal to the vertical dividing line, and an inner line connecting ends of the horizontal lines toward the vertical dividing line,
each of the third and fourth partition lines includes a pair of horizontal lines normal to the vertical dividing line, and an inner line connecting ends of the horizontal lines toward the vertical dividing line,
the luminous flux incident area further includes an N region crossing over the vertical dividing line, a region at a side of the optical axis opposite from the third partition line being divided into an A5 region at a side toward the third partition line and a remaining A1 region by the first partition line, and a region at a side of the optical axis opposite from the fourth partition line being divided into a B5 region at a side toward the fourth partition line and a remaining B1 region by the second partition line,
the A1 region and the B1 region are symmetrically arranged with respect to the vertical dividing line,
the A5 region and the B5 region are symmetrically arranged with respect to the vertical dividing line, and
the optical head further comprises a tilt detector for detecting a relative tilt of the objective lens and the optical disk in accordance with a luminous energy incident on the luminous flux incident area of the light sensing device.

9. An optical head according to claim 8, wherein the A1 region and the B1 regions are for mainly detecting a luminous energy in middle parts of sections where a $0^{th}$-order light and $\pm 1^{st}$-order lights of the luminous flux overlap.

10. An optical head according to claim 9, wherein the A5 region and the B5 region are for mainly detecting a luminous energy in parts, excluding the middle parts, of the sections where the $0^{th}$-order light and the $\pm 1^{st}$-order lights of the luminous flux overlap.

11. An optical head according to claim 8, wherein any of the inner lines of the first to fourth partition lines is arcuate.

12. An optical head according to claim 11, wherein the inner lines of the third and fourth partition lines are both defined to have a radius of curvature equal to the radius of the luminous flux.

13. An optical head according to claim 8, wherein:
the light sensing device includes a light sensing element, on which the luminous flux incident area is provided, and
the tilt detector detects the tilt in accordance with a first difference signal, which is a difference signal between a signal obtained from the A1 region of the light sensing element and a signal obtained from the B1 region of the light sensing element, and a second difference signal, which is a difference signal between a signal obtained from the A2 region of the light sensing element and a signal obtained from the B2 region of the light sensing element.

14. An optical head according to claim 8, wherein:
the light sensing device includes a light splitting element for slitting the luminous flux reflected by the information tracks into a plurality of luminous fluxes, and a light sensing element for separately sensing the respective luminous fluxes split by the light splitting element,
the luminous flux incident area is provided on the light splitting element, and
the tilt detector detects the tilt in accordance with a first difference signal, which is a difference signal between a signal obtained from the luminous flux diffracted in the A1 region of the light splitting element and detected by the light sensing element and a signal obtained from the luminous flux diffracted in the B1 region of the light splitting element and detected by the light sensing element, and a second difference signal, which is a difference signal between a signal obtained from the luminous flux diffracted in the A2 region of the light splitting element and detected by the light sensing element and a signal obtained from the luminous flux diffracted in the B2 region of the light splitting element and detected by the light sensing element.

15. An optical head according to claim 8, wherein:
the luminous flux incident area further includes an A6 region and a B6 region symmetrically arranged with respect to the vertical dividing line,
the A6 region is defined as a region excluding the N region, the A1 region and the A5 region from an area at a side of the vertical dividing line toward the A1 region,
the B6 region is defined as a region excluding the N region, the B1 region and the B5 region from an area at a side of the vertical dividing line toward the B1 region,
a difference signal between a signal obtained from the A6 region and a signal obtained from the B6 region serves as a third difference signal, and
the optical head further comprises a tracking error signal generator for generating a tracking error signal in accordance with a sum signal of the first and second difference signal and the third difference signal.

16. An optical head according to claim 8, wherein:
a ratio of a dimension of the A5 region along the vertical dividing line to the diameter of the luminous flux to be sensed is 0.55 or larger and 0.65 or smaller,
a ratio of a dimension of the B5 region along the vertical dividing line to the diameter of the luminous flux to be sensed is 0.55 or larger and 0.65 or smaller,
a ratio of a dimension of the A1 region along the vertical dividing line to the diameter of the luminous flux to be sensed is 0.25 or larger and 0.35 or smaller,
a ratio of a dimension of the B1 region along the vertical dividing line to the diameter of the luminous flux to be sensed is 0.25 or larger and 0.35 or smaller,
a ratio of a distance between the A1 region and the B1 region to the diameter of the luminous flux to be sensed is 0.4 or larger and 0.5 or smaller,
a ratio of a dimension the N region along a direction normal to the vertical dividing line to the diameter of the luminous flux to be sensed is 0.2 or larger and 0.4 or smaller,
a ratio of the radius of curvature of the inner line of the first partition line to the radius of the luminous flux to be sensed is 0.5 or larger and 1.2 or smaller, and
a ratio of the radius of the curvature of the inner line of the second partition line to the radius of the luminous flux to be sensed is 0.5 or larger and 1.2 or smaller.

17. An optical head, comprising a light source, an objective lens for concentrating a laser beam emitted from the light source onto information tracks of an optical disk, and a light sensing device for sensing a luminous flux reflected by information tracks, wherein:
the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a third and a fourth horizontal dividing lines at a distance to and parallel with the horizontal dividing lines in one region partitioned by the vertical dividing line between the first and second horizontal dividing lines, a fifth and a sixth horizontal dividing lines at a distance to and parallel with the horizontal dividing lines in the other region partitioned by the vertical dividing line, a seventh and an eighth horizontal dividing lines arranged at sides of the first and second horizontal dividing lines opposite from the optical axis, in parallel with the first and second horizontal dividing lines and symmetrically with respect to the optical axis,
the luminous flux incident area further includes an N region crossing over the vertical dividing line between the first and second horizontal dividing lines,
a region between the first and second horizontal dividing lines in the one region partitioned by the vertical dividing line is divided into an A1 region between the third and fourth horizontal dividing lines and remaining A7 regions,
a region between the first and second horizontal dividing lines in the other region partitioned by the vertical dividing line is divided into a B1 region between the fifth and sixth horizontal dividing lines and remaining B7 regions,
regions at sides of the seventh and eighth horizontal dividing lines opposite from the optical axis are defined as N2 regions,
the A1 region and the B1 region are symmetrically arranged with respect to the vertical dividing line,
the A7 region and the B7 region are symmetrically arranged with respect to the vertical dividing line, and
the optical head further comprises a tilt detector for detecting a relative tilt of the objective lens and the optical disk in accordance with a luminous energy incident on the luminous flux incident area of the light sensing device.

18. An optical head according to claim 17, wherein:
the light sensing device further includes an A8 region and a B8 region symmetrically arranged with respect to the vertical dividing line in the luminous flux incident area,
the A8 region is defined as a region excluding the A1 region, the A7 region, the N region and the N2 regions from the one region partitioned by the vertical dividing line, and
the B8 region is defined as a region excluding the B1 region, the B7 region, the N region and the N2 regions from the other region partitioned by the vertical dividing line.

19. An optical head according to claim 18, wherein a difference signal between a signal obtained from the A8 region and a signal obtained from the B8 region serves as a third difference signal, and the optical head further comprises a tracking error signal generator for generating a tracking error signal in accordance with a sum signal of the first and second difference signals and the third difference signal.

20. An optical head according to claim 17, wherein:
a ratio of a dimension of the N region along a direction normal to the vertical dividing line to the diameter of the luminous flux to be sensed is 0.35 or larger and 0.45 or smaller,
a ratio of a dimension of the N region along the vertical dividing line to the diameter of the luminous flux to be sensed is 0.5 or larger and 0.6 or smaller,
a ratio of a dimension of the A1 region along the vertical dividing line to the diameter of the luminous flux to be sensed is 0.2 or larger and 0.32 or smaller,
a ratio of a dimension of the B1 region along the vertical dividing line to the diameter of the luminous flux to be sensed is 0.2 or larger and 0.32 or smaller, and
a ratio of a distance between the N2 regions to the diameter of the luminous flux to be sensed is 0.75 or larger and 0.85 or smaller.

21. An optical head, comprising a light source, an objective lens for concentrating a laser beam emitted from the light source onto information tracks of an optical disk, and a light sensing device for sensing a luminous flux reflected by information tracks, wherein:

the light sensing device includes a luminous flux incident area divided into a plurality of regions by a straight vertical dividing line passing an optical axis of the objective lens and parallel with a direction tangent to the information tracks; a pair of first horizontal dividing lines normal to the vertical dividing line and symmetrically arranged with respect to the vertical dividing line; a pair of second horizontal dividing lines parallel with the pair of first horizontal dividing lines and symmetrically arranged with respect to the vertical dividing line; a third and a fourth horizontal dividing lines at a distance to and parallel with the first and second horizontal dividing lines in one region partitioned by the vertical dividing line between the first and second horizontal dividing lines; a fifth and a sixth horizontal dividing lines at a distance to and parallel with the first and second horizontal dividing lines in the other region partitioned by the vertical dividing line between the first and second horizontal dividing lines; a first inner line extending in parallel with the vertical dividing line and connecting inner ends of the first horizontal dividing line at one side, the third horizontal dividing line, the fourth horizontal dividing line and the second horizontal dividing line at one side; a second inner line extending in parallel with the vertical dividing line and connecting inner ends the first horizontal dividing line at the other side, the fifth horizontal dividing line, the sixth horizontal dividing line and the second horizontal dividing line at the other side; and seventh and eighth horizontal dividing lines arranged at sides of the first and second horizontal dividing lines opposite from the optical axis, in parallel with the first and second horizontal dividing lines and symmetrically with respect to the optical axis, the luminous flux incident area further includes an N region crossing over the vertical dividing line between the first and second inner lines, a region defined by the first horizontal dividing line, the second horizontal dividing line and the first inner line in the one region partitioned by the vertical dividing line is divided into an A1 region between the third and fourth horizontal dividing lines and remaining A7 regions, a region defined by the first horizontal dividing line, the second horizontal dividing line and the second inner line in the other region partitioned by the vertical dividing line is divided into a B1 region between the fifth and sixth horizontal dividing lines and remaining B7 regions, regions at sides of the seventh and eighth horizontal dividing lines opposite from the optical axis are defined as N2 regions, the pair of first horizontal dividing lines and the pair of second horizontal dividing lines are symmetrically arranged with respect to the optical axis, the A1 region and the B1 region are symmetrically arranged with respect to the vertical dividing line, the A7 region and the B7 region are symmetrically arranged with respect to the vertical dividing line, and the optical head further comprises a tilt detector for detecting a relative tilt of the objective lens and the optical disk in accordance with a luminous energy incident on the luminous flux incident area of the light sensing device.

22. An optical head according to claim 21, wherein the A1 region and the B1 regions are for mainly detecting a luminous energy in middle parts of sections where a $0^{th}$-order light and $\pm 1^{st}$-order lights of the luminous flux overlap.

23. An optical head according to claim 22, wherein the A7 region and the B7 region are for mainly detecting a luminous energy in parts, excluding the middle parts, of the sections where the $0^{th}$-order light and the $\pm 1^{st}$-order lights of the luminous flux overlap.

24. An optical head according to claim 21, wherein:

the light sensing device further includes an A8 region and a B8 region symmetrically arranged with respect to the vertical dividing line in the luminous flux incident area, the A8 region is defined as a region excluding the A1 region, the A7 region, the N region and the N2 regions from the one region partitioned by the vertical dividing line, and the B8 region is defined as a region excluding the B1 region, the B7 region, the N region and the N2 regions from the other region partitioned by the vertical dividing line.

25. An optical head according to claim 24, wherein a difference signal between a signal obtained from the A8 region and a signal obtained from the B8 region serves as a third difference signal, and the optical head further comprises a tracking error signal generator for generating a tracking error signal in accordance with a sum signal of the first and second difference signals and the third difference signal.

26. An optical head according to claim 21, wherein:

a ratio of a dimension of the N region along a direction normal to the vertical dividing line to the diameter of the luminous flux to be sensed is 0.3 or larger and 0.4 or smaller, a ratio of a dimension of the N region along the vertical dividing line to the diameter of the luminous flux to be sensed is 0.54 or larger and 0.65 or smaller, a ratio of a distance between the A1 region and the B1 region to the diameter of the luminous flux to be sensed is 0.35 or larger and 0.45 or smaller, a ratio of a dimension of the A1 region along the vertical dividing line to the diameter of the luminous flux to be sensed is 0.25 or larger and 0.38 or smaller, a ratio of a dimension of the B1 region along the vertical dividing line to the diameter of the luminous flux to be sensed is 0.25 or larger and 0.38 or smaller, and a ratio of a distance between the N2 regions to the diameter of the luminous flux to be sensed is 0.8 or larger and 0.92 or smaller.

27. An optical head according to claim 17, wherein:

the light sensing device includes a light sensing element, on which the luminous flux incident area is provided, and the tilt detector detects the tilt in accordance with a first difference signal, which is a difference signal between a signal obtained from the A1 region of the light sensing element and a signal obtained from the B1 region of the light sensing element, and a second difference signal, which is a difference signal between a signal obtained from the A7 region of the light sensing element and a signal obtained from the B7 region of the light sensing element.

28. An optical head according to claim 18, wherein:

the light sensing device includes a light sensing element, on which the luminous flux incident area is provided, and the tilt detector detects the tilt in accordance with a first difference signal, which is a difference signal between a signal obtained from the A1 region of the light sensing element and a signal obtained from the B1 region of the light sensing element; a second difference signal, which is a difference signal between a signal obtained from the A7 region of the light sensing element and a signal obtained from the B7 region of the light sensing element; and a third difference signal, which is a difference signal between a signal obtained from the A8 region of the light sensing element and a signal obtained from the B8 region of the light sensing element.

29. An optical head according to claim 17, wherein:
the light sensing device includes a light splitting element for slitting the luminous flux reflected by the information tracks into a plurality of luminous fluxes, and a light sensing element for separately sensing the respective luminous fluxes split by the light splitting element,
the luminous flux incident area is provided on the light splitting element, and
the tilt detector detects the tilt in accordance with a first difference signal, which is a difference signal between a signal obtained from the luminous flux diffracted in the A1 region of the light splitting element and detected by the light sensing element and a signal obtained from the luminous flux diffracted in the B1 region of the light splitting element and detected by the light sensing element, and a second difference signal, which is a difference signal between a signal obtained from the luminous flux diffracted in the A7 region of the light splitting element and detected by the light sensing element and a signal obtained from the luminous flux diffracted in the B7 region of the light splitting element and detected by the light sensing element.

30. An optical head according to claim 18, wherein:
the light sensing device includes a light splitting element for slitting the luminous flux reflected by the information tracks into a plurality of luminous fluxes, and a light sensing element for separately sensing the respective luminous fluxes split by the light splitting element,
the luminous flux incident area is provided on the light splitting element, and
the tilt detector detects the tilt in accordance with a first difference signal, which is a difference signal between a signal obtained from the luminous flux diffracted in the A1 region of the light splitting element and detected by the light sensing element and a signal obtained from the luminous flux diffracted in the B1 region of the light splitting element and detected by the light sensing element; a second difference signal, which is a difference signal between a signal obtained from the luminous flux diffracted in the A7 region of the light splitting element and detected by the light sensing element and a signal obtained from the luminous flux diffracted in the B7 region of the light splitting element and detected by the light sensing element; and a third difference signal, which is a difference signal between a signal obtained from the luminous flux diffracted in the A8 region of the light splitting element and detected by the light sensing element and a signal obtained from the luminous flux diffracted in the B8 region of the light splitting element and detected by the light sensing element.

31. An optical head according to claim 5, wherein the tilt detector compares the first and second difference signals.

32. An optical head according to claim 5, wherein the tilt detector generates a difference signal between the first and second difference signals after multiplying at least one of the first and second difference signals by a specified weight coefficient.

33. An optical head according to claim 5, wherein the tilt detector detects a signal based on the phases of the first and second difference signals or a phase difference between the first and second difference signals.

34. An optical head according to claim 1, wherein the optical disk is constructed such that light reflectivity differs at the information tracks having information recorded thereon and those having no information recorded thereon.

35. An optical disk device, comprising:
an optical head including a light source, an objective lens for concentrating a laser beam emitted from the light source onto information tracks of an optical disk, and a light sensing device for sensing a luminous flux reflected by information tracks,
an optical disk driver for driving the optical disk, and
a controller for controlling the optical head and the optical disk driver,
wherein:
the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a first and a second partition lines symmetrically arranged between the two horizontal dividing lines with respect to the vertical dividing line while being distanced from the vertical dividing line and the two horizontal dividing lines,
each of the first and second partition lines includes a pair of horizontal lines parallel with the two horizontal dividing lines, and an inner line connecting ends of the horizontal lines toward the vertical dividing line,
the luminous flux incident area further includes an N region crossing over the vertical dividing line between the two horizontal dividing lines, one region partitioned between the two horizontal dividing lines by the vertical dividing line being divided into an A2 region at a side toward the optical axis and a remaining A1 region by the first partition line, and the other region partitioned between the two horizontal dividing lines by the vertical dividing line being divided into a B2 region at a side toward the optical axis and a remaining B1 region by the second partition line,
the A1 region and the B1 region are symmetrically arranged with respect to the vertical dividing line,
the A2 region and the B2 region are symmetrically arranged with respect to the vertical dividing line, and
the optical head further comprises a tilt detector for detecting a relative tilt of the objective lens and the optical disk in accordance with a luminous energy incident on the luminous flux incident area of the light sensing device.

36. An optical disk device, comprising:
an optical head including a light source, an objective lens for concentrating a laser beam emitted from the light source onto information tracks of an optical disk, and a light sensing device for sensing a luminous flux reflected by information tracks,
an optical disk driver for driving the optical disk, and
a controller for controlling the optical head and the optical disk driver,
wherein:
the light sensing device includes a luminous flux incident area divided into a plurality of regions by a straight vertical dividing line passing an optical axis of the objective lens and parallel with a direction tangent to the information tracks, a first and a second partition lines symmetrically arranged with respect to the vertical dividing line while being distanced from the vertical dividing line, a third partition line arranged between the vertical dividing line and the first partition line, a fourth partition line symmetrically arranged with the third partition line with respect to the optical axis between the vertical dividing line and the second partition line, each of the first and second partition lines includes a pair of horizontal lines normal to the vertical dividing line, and an inner line connecting ends of the horizontal lines toward the vertical dividing line, each of the third and fourth partition lines includes a pair of horizontal lines normal to the vertical dividing line, and an inner line connecting ends of the horizontal lines toward the vertical dividing line, the luminous flux incident area further includes an N region crossing over the vertical dividing line, a region at a side of the third partition line opposite from the optical axis being divided into an A5 region at a side toward the third partition line and a remaining A1 region by the first partition line, and a region at a side of the fourth partition line opposite from the optical axis being divided into a B5 region at a side toward the fourth partition line and a remaining B1 region by the second partition line, the A1 region and the B1 region are symmetrically arranged with respect to the vertical dividing line, the A5 region and the B5 region are symmetrically arranged with respect to the vertical dividing line, and the optical head further comprises a tilt detector for detecting a relative tilt of the objective lens and the optical disk in accordance with a luminous energy incident on the luminous flux incident area of the light sensing device.

37. An optical disk device, comprising:

an optical head including a light source, an objective lens for concentrating a laser beam emitted from the light source onto information tracks of an optical disk, and a light sensing device for sensing a luminous flux reflected by information tracks, an optical disk driver for driving the optical disk, and a controller for controlling the optical head and the optical disk driver, wherein:

the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a third and a fourth horizontal dividing lines at a distance to and parallel with the horizontal dividing lines in one region partitioned by the vertical dividing line between the first and second horizontal dividing lines, a fifth and a sixth horizontal dividing lines at a distance to and parallel with the horizontal dividing lines in the other region partitioned by the vertical dividing line between the first and second horizontal dividing lines, a seventh and an eighth horizontal dividing lines arranged at sides of the first and second horizontal dividing lines opposite from the optical axis, in parallel with the first and second horizontal dividing lines and symmetrically with respect to the optical axis, the luminous flux incident area further includes an N region crossing over the vertical dividing line between the first and second horizontal dividing lines, a region between the first and second horizontal dividing lines in the one region partitioned by the vertical dividing line is divided into an A1 region between the third and fourth horizontal dividing lines and remaining A7 regions, a region between the first and second horizontal dividing lines in the other region partitioned by the vertical dividing line is divided into a B1 region between the fifth and sixth horizontal dividing lines and remaining B7 regions, regions at sides of the seventh and eighth horizontal dividing lines opposite from the optical axis are defined as N2 regions, the A1 region and the B1 region are symmetrically arranged with respect to the vertical dividing line, the A7 region and the B7 region are symmetrically arranged with respect to the vertical dividing line, and the optical head further comprises a tilt detector for detecting a relative tilt of the objective lens and the optical disk in accordance with a luminous energy incident on the luminous flux incident area of the light sensing device.

38. An optical disk device, comprising:

an optical head including a light source, an objective lens for concentrating a laser beam emitted from the light source onto information tracks of an optical disk, and a light sensing device for sensing a luminous flux reflected by information tracks, an optical disk driver for driving the optical disk, and a controller for controlling the optical head and the optical disk driver, wherein:

the light sensing device includes a luminous flux incident area divided into a plurality of regions by a straight vertical dividing line passing an optical axis of the objective lens and parallel with a direction tangent to the information tracks; a pair of first horizontal dividing lines normal to the vertical dividing line and symmetrically arranged with respect to the vertical dividing line; a pair of second horizontal dividing lines parallel with the pair of first horizontal dividing lines and symmetrically arranged with respect to the vertical dividing line; a third and a fourth horizontal dividing lines at a distance to and parallel with the first and second horizontal dividing lines in one region partitioned by the vertical dividing line between the first and second horizontal dividing lines; a fifth and a sixth horizontal dividing lines at a distance to and parallel with the first and second horizontal dividing lines in the other region partitioned by the vertical dividing line between the first and second horizontal dividing lines; a first inner line extending in parallel with the vertical dividing line and connecting inner ends of the first horizontal dividing line at one side, the third horizontal dividing line, the fourth horizontal dividing line and the second horizontal dividing line at one side; a second inner line extending in parallel with the vertical dividing line and connecting inner ends the first horizontal dividing line at the other side, the fifth horizontal dividing line, the sixth horizontal dividing line and the second horizontal dividing line at the other side; and seventh and eighth horizontal dividing lines arranged at sides of the first and second horizontal dividing lines opposite from the optical axis, in parallel with the first and second horizontal dividing lines and symmetrically with respect to the optical axis, the luminous flux incident area further includes an N region crossing over the vertical dividing line between the first and second inner lines, a region defined by the first horizontal dividing line, the second horizontal dividing line and the first inner line in the one region partitioned by the vertical dividing line is divided into an A1 region between the third and fourth horizontal dividing lines and remaining A7 regions, a region defined by the first horizontal dividing line, the second horizontal dividing line and the second inner line in the other region partitioned by the vertical dividing line is divided into a B1 region between the fifth and sixth horizontal dividing lines and remaining B7 regions, regions at sides of the seventh and eighth horizontal dividing lines opposite from the optical axis are defined as N2 regions, the pair of first horizontal dividing lines and the pair of second horizontal dividing lines are symmetrically arranged with respect to the optical axis, the A1 region and the B1 region are symmetrically arranged with respect to the vertical dividing line, the A7 region and the B7 region are symmetrically arranged with respect to the vertical dividing line, and the optical head further comprises a tilt detector for detecting a relative tilt of the objective lens and the optical disk in accordance with a luminous energy incident on the luminous flux incident area of the light sensing device.

39. An integrated circuit for deriving a tilt signal corresponding to a relative tilt of an objective lens and an optical disk in accordance with a signal from a light sensing device of an optical head for concentrating a laser beam emitted from a light source onto information tracks of the optical disk by means of the objective lens and sensing a luminous flux reflected by the information tracks by means of the light sensing device, wherein:

the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a first and a second partition lines symmetrically arranged between the two horizontal dividing lines with respect to the vertical dividing line while being distanced from the vertical dividing line and the two horizontal dividing lines, each of the first and second partition lines includes a pair of horizontal lines parallel with the two horizontal dividing lines, and an inner line connecting ends of the horizontal lines toward the vertical dividing line, the luminous flux incident area further includes an N region crossing over the vertical dividing line between the two horizontal dividing lines, one region partitioned between the two horizontal dividing lines by the vertical dividing line being divided into an A2 region at a side toward the optical axis and a remaining A1 region by the first partition line, and the other region partitioned between the two horizontal dividing lines by the vertical dividing line being divided into a B2 region at a side toward the optical axis and a remaining B1 region by the second partition line, the A1 region and the B1 region are symmetrically arranged with respect to the vertical dividing line, the A2 region and the B2 region are symmetrically arranged with respect to the vertical dividing line, and a difference signal between a first difference signal, which is a difference signal between a signal obtained from the A1 region of the light sensing device and a signal obtained from the B1 region of the light sensing device, and a second difference signal, which is a difference signal between a signal obtained from the A2 region of the light sensing device and a signal obtained from the B2 region of the light sensing device, is generated after multiplying at least one of the first and second difference signals by a specified weight coefficient, and the tilt signal is derived in accordance with the generated difference signal.

40. An integrated circuit according to claim 39, wherein the weight coefficient is so set as to reduce an offset in a difference signal produced as the objective lens is displaced.

41. An integrated circuit for deriving a tilt signal corresponding to a relative tilt of an objective lens and an optical disk in accordance with a signal from a light sensing device of an optical head for concentrating a laser beam emitted from a light source onto information tracks of the optical disk by means of the objective lens and sensing a luminous flux reflected by the information tracks by means of the light sensing device, wherein:

the light sensing device includes a luminous flux incident area divided into a plurality of regions by a straight vertical dividing line passing an optical axis of the objective lens and parallel with a direction tangent to the information tracks, a first and a second partition lines symmetrically arranged with respect to the vertical dividing line while being distanced from the vertical dividing line, a third partition line arranged between the vertical dividing line and the first partition line, a fourth partition line symmetrically arranged with the third partition line with respect to the optical axis between the vertical dividing line and the second partition line, each of the first and second partition lines includes a pair of horizontal lines normal to the vertical dividing line, and an inner line connecting ends of the horizontal lines toward the vertical dividing line, each of the third and fourth partition lines includes a pair of horizontal lines normal to the vertical dividing line, and an inner line connecting ends of the horizontal lines toward the vertical dividing line, the luminous flux incident area further includes an N region crossing over the vertical dividing line, a region at a side of the third partition line opposite from the optical axis being divided into an A5 region at a side toward the third partition line and a remaining A1 region by the first partition line, and a region at a side of the fourth partition line opposite from the optical axis being divided into a B5 region at a side toward the fourth partition line and a remaining B1 region by the second partition line, the A1 region and the B1 region are symmetrically arranged with respect to the vertical dividing line, the A5 region and the B5 region are symmetrically arranged with respect to the vertical dividing line, and a difference signal between a first difference signal, which is a difference signal between a signal obtained from the A1 region of the light sensing device and a signal obtained from the B1 region of the light sensing device, and a second difference signal, which is a difference signal between a signal obtained from the A5 region of the light sensing device and a signal obtained from the B5 region of the light sensing device, is generated after multiplying at least one of the first and second difference signals by a specified weight coefficient, and the tilt signal is derived in accordance with the generated difference signal.

42. An integrated circuit according to claim 41, wherein the weight coefficient is so set as to reduce an offset in a difference signal produced as the objective lens is displaced.

43. An integrated circuit for deriving a tilt signal corresponding to a relative tilt of an objective lens and an optical disk in accordance with a signal from a light sensing device of an optical head for concentrating a laser beam emitted from a light source onto information tracks of the optical disk by means of the objective lens and sensing a luminous flux reflected by the information tracks by means of the light sensing device, wherein:

the light sensing device includes a luminous flux incident area divided into a plurality of regions by a straight vertical dividing line passing an optical axis of the objective lens and parallel with a direction tangent to the information tracks, straight first and second horizontal dividing lines normal to the vertical dividing line and symmetrically arranged with respect to the optical axis, a third and a fourth horizontal dividing lines at a distance to and parallel with the horizontal dividing lines in one region partitioned by the vertical dividing line between the first and second horizontal dividing lines a fifth and a sixth horizontal dividing lines at a distance to and parallel with the horizontal dividing lines in the other region partitioned by the vertical dividing line between the first and second horizontal dividing lines, a seventh and an eighth horizontal dividing lines arranged at sides of the first and second horizontal dividing lines opposite from the optical axis, in parallel with the first and second horizontal dividing lines and symmetrically with respect to the optical axis, the luminous flux incident area further includes an N region crossing over the vertical dividing line between the first and second horizontal dividing lines, a region between the first and second horizontal dividing lines in the one region partitioned by the vertical dividing line is divided into an A1 region between the third and fourth horizontal dividing lines and remaining A7 regions, a region between the first and second horizontal dividing lines in the other region partitioned by the vertical dividing line is divided into a B1 region between the fifth and sixth horizontal dividing lines and remaining B7 regions, regions at sides of the seventh and eighth horizontal dividing lines opposite from the optical axis are defined as N2 regions, the A1 region and the B1 region are symmetrically arranged with respect to the vertical dividing line, the A7 region and the B7 region are symmetrically arranged with respect to the vertical dividing line, and a difference signal between a first difference signal, which is a difference signal between a signal obtained from the A1 region of the light sensing device and a signal obtained from the B1 region of the light sensing device, and a second difference signal, which is a difference signal between a signal obtained from the A7 region of the light sensing device and a signal obtained from the B7 region of the light sensing device, is generated after multiplying at least one of the first and second difference signals by a specified weight coefficient, and the tilt signal is derived in accordance with the generated difference signal.

44. An integrated circuit according to claim 43, wherein the weight coefficient is so set as to reduce an offset in a difference signal produced as the objective lens is displaced.

45. An integrated circuit for deriving a tilt signal corresponding to a relative tilt of an objective lens and an optical disk in accordance with a signal from a light sensing device of an optical head for concentrating a laser beam emitted from a light source onto information tracks of the optical disk by means of the objective lens and sensing a luminous flux reflected by the information tracks by means of the light sensing device, wherein:

the light sensing device includes a luminous flux incident area divided into a plurality of regions by a straight vertical dividing line passing an optical axis of the objective lens and parallel with a direction tangent to the information tracks; a pair of first horizontal dividing lines normal to the vertical dividing line and symmetrically arranged with respect to the vertical dividing line; a pair of second horizontal dividing lines parallel with the pair of first horizontal dividing lines and symmetrically arranged with respect to the vertical dividing line; a third and a fourth horizontal dividing lines at a distance to and parallel with the first and second horizontal dividing lines in one region partitioned by the vertical dividing line between the first and second horizontal dividing lines; a fifth and a sixth horizontal dividing lines at a distance to and parallel with the first and second horizontal dividing lines in the other region partitioned by the vertical dividing line between the first and second horizontal dividing lines; a first inner line extending in parallel with the vertical dividing line and connecting inner ends of the first horizontal dividing line at one side, the third horizontal dividing line, the fourth horizontal dividing line and the second horizontal dividing line at one side; a second inner line extending in parallel with the vertical dividing line and connecting inner ends the first horizontal dividing line at the other side, the fifth horizontal dividing line, the sixth horizontal dividing line and the second horizontal dividing line at the other side; and seventh and eighth horizontal dividing lines arranged at sides of the first and second horizontal dividing lines opposite from the optical axis, in parallel with the first and second horizontal dividing lines and symmetrically with respect to the optical axis, the luminous flux incident area further includes an N region crossing over the vertical dividing line between the first and second inner lines, a region defined by the first horizontal dividing line, the second horizontal dividing line and the first inner line in the one region partitioned by the vertical dividing line is divided into an A1 region between the third and fourth horizontal dividing lines and remaining A7 regions, a region defined by the first horizontal dividing line, the second horizontal dividing line and the second inner line in the other region partitioned by the vertical dividing line is divided into a B1 region between the fifth and sixth horizontal dividing lines and remaining B7 regions, regions at sides of the seventh and eighth horizontal dividing lines opposite from the optical axis are defined as N2 regions, the pair of first horizontal dividing lines and the pair of second horizontal dividing lines are symmetrically arranged with respect to the optical axis, the A1 region and the B1 region are symmetrically arranged with respect to the vertical dividing line, the A7 region and the B7 region are symmetrically arranged with respect to the vertical dividing line, and a difference signal between a first difference signal, which is a difference signal between a signal obtained from the A1 region of the light sensing device and a signal obtained from the B1 region of the light sensing device, and a second difference signal, which is a difference signal between a signal obtained from the A7 region of the light sensing device and a signal obtained from the B7 region of the light sensing device, is generated after multiplying at least one of the first and second difference signals by a specified weight coefficient, and the tilt signal is derived in accordance with the generated difference signal.

46. An integrated circuit according to claim 45, wherein the weight coefficient is so set as to reduce an offset in a difference signal produced as the objective lens is displaced.

* * * * *